US012108012B2

(12) United States Patent
Cerra et al.

(10) Patent No.: US 12,108,012 B2
(45) Date of Patent: Oct. 1, 2024

(54) SYSTEM AND METHOD OF MANAGING SPATIAL STATES AND DISPLAY MODES IN MULTI-USER COMMUNICATION SESSIONS

(71) Applicant: Apple Inc., Cupertino, CA (US)

(72) Inventors: Joseph P. Cerra, San Francisco, CA (US); Hayden J. Lee, Mountain View, CA (US); Willem Mattelaer, San Jose, CA (US); Miao Ren, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/423,187

(22) Filed: Jan. 25, 2024

(65) Prior Publication Data

US 2024/0291953 A1   Aug. 29, 2024

Related U.S. Application Data

(60) Provisional application No. 63/587,448, filed on Oct. 2, 2023, provisional application No. 63/515,080, filed
(Continued)

(51) Int. Cl.
*H04N 13/111* (2018.01)
*H04N 13/275* (2018.01)

(52) U.S. Cl.
CPC ......... *H04N 13/111* (2018.05); *H04N 13/275* (2018.05)

(58) Field of Classification Search
None
See application file for complete search history.

(56) References Cited

U.S. PATENT DOCUMENTS

| 5,515,488 A | 5/1996 | Hoppe et al. |
| 5,524,195 A | 6/1996 | Clanton et al. |

(Continued)

FOREIGN PATENT DOCUMENTS

| CA | 3033344 A1 | 2/2018 |
| CN | 105264461 A | 1/2016 |

(Continued)

OTHER PUBLICATIONS

Corrected Notice of Allowability received for U.S. Appl. No. 18/465,098, mailed on Mar. 13, 2024, 3 pages.

(Continued)

*Primary Examiner* — Talha M Nawaz
(74) *Attorney, Agent, or Firm* — Kubota & Basol LLP

(57) ABSTRACT

Some examples of the disclosure are directed to systems and methods for facilitating display of content and avatars in a multi-communication session including a first electronic device and a second electronic device. In some examples, the first electronic device presents a computer-generated environment including an avatar corresponding to a user of the second electronic device and a first object, wherein the computer-generated environment is presented based on a first set of display parameters satisfying a first set of criteria, including a spatial parameter for the user of the second electronic device, a spatial parameter for the first object, and a display mode parameter for the first object. In response to detecting a change in one or more of the first set of display parameters, the first electronic device updates presentation of the computer-generated environment in accordance with the one or more changes of the first set of display parameters.

30 Claims, 24 Drawing Sheets

Related U.S. Application Data on Jul. 21, 2023, provisional application No. 63/505,522, filed on Jun. 1, 2023, provisional application No. 63/487,244, filed on Feb. 27, 2023.

(56) References Cited

U.S. PATENT DOCUMENTS

| | | | |
|---|---|---|---|
| 5,610,828 | A | 3/1997 | Kodosky et al. |
| 5,737,553 | A | 4/1998 | Bartok |
| 5,740,440 | A | 4/1998 | West |
| 5,751,287 | A | 5/1998 | Hahn et al. |
| 5,758,122 | A | 5/1998 | Corda et al. |
| 5,794,178 | A | 8/1998 | Caid et al. |
| 5,877,766 | A | 3/1999 | Bates et al. |
| 5,900,849 | A | 5/1999 | Gallery |
| 5,933,143 | A | 8/1999 | Kobayashi |
| 5,990,886 | A | 11/1999 | Serdy et al. |
| 6,061,060 | A | 5/2000 | Berry et al. |
| 6,108,004 | A | 8/2000 | Medl |
| 6,112,015 | A | 8/2000 | Planas et al. |
| 6,456,296 | B1 | 9/2002 | Cataudella et al. |
| 6,584,465 | B1 | 6/2003 | Zhu et al. |
| 6,756,997 | B1 | 6/2004 | Ward et al. |
| 7,035,903 | B1 | 4/2006 | Baldonado |
| 7,137,074 | B1 | 11/2006 | Newton et al. |
| 7,230,629 | B2 | 6/2007 | Reynolds et al. |
| 8,803,873 | B2 | 8/2014 | Yoo et al. |
| 8,970,478 | B2 | 3/2015 | Johansson |
| 8,970,629 | B2 | 3/2015 | Kim et al. |
| 9,185,062 | B1 | 11/2015 | Yang et al. |
| 9,400,559 | B2 | 7/2016 | Latta et al. |
| 9,448,635 | B2 | 9/2016 | Macdougall et al. |
| 9,465,479 | B2 | 10/2016 | Cho et al. |
| 9,563,331 | B2 | 2/2017 | Poulos et al. |
| 9,681,112 | B2 | 6/2017 | Son |
| 9,684,372 | B2 | 6/2017 | Xun et al. |
| 9,778,814 | B2 | 10/2017 | Ambrus et al. |
| 9,851,866 | B2 | 12/2017 | Goossens et al. |
| 9,886,087 | B1 | 2/2018 | Wald et al. |
| 9,933,833 | B2 | 4/2018 | Tu et al. |
| 9,934,614 | B2 | 4/2018 | Ramsby et al. |
| 10,049,460 | B2 | 8/2018 | Romano et al. |
| 10,203,764 | B2 | 2/2019 | Katz et al. |
| 10,307,671 | B2 | 6/2019 | Barney et al. |
| 10,534,439 | B2 | 1/2020 | Raffa et al. |
| 10,664,048 | B2 | 5/2020 | Cieplinski et al. |
| 10,699,488 | B1 | 6/2020 | Terrano |
| 10,732,721 | B1 | 8/2020 | Clements |
| 10,754,434 | B2 | 8/2020 | Hall et al. |
| 10,768,693 | B2 | 9/2020 | Powderly et al. |
| 10,956,724 | B1 | 3/2021 | Terrano |
| 10,983,663 | B2 | 4/2021 | Iglesias |
| 11,055,920 | B1 | 7/2021 | Bramwell et al. |
| 11,200,742 | B1 | 12/2021 | Post et al. |
| 11,294,475 | B1 | 4/2022 | Pinchon et al. |
| 11,762,457 | B1 * | 9/2023 | Ikkai .................. G06V 40/174 345/156 |
| 2001/0047250 | A1 | 11/2001 | Schuller et al. |
| 2002/0044152 | A1 | 4/2002 | Abbott et al. |
| 2003/0151611 | A1 | 8/2003 | Turpin et al. |
| 2003/0222924 | A1 | 12/2003 | Baron |
| 2004/0059784 | A1 | 3/2004 | Caughey |
| 2004/0243926 | A1 | 12/2004 | Trenbeath et al. |
| 2005/0100210 | A1 | 5/2005 | Rice et al. |
| 2005/0138572 | A1 | 6/2005 | Good et al. |
| 2005/0144570 | A1 | 6/2005 | Loverin et al. |
| 2005/0144571 | A1 | 6/2005 | Loverin et al. |
| 2005/0198143 | A1 | 9/2005 | Moody et al. |
| 2006/0080702 | A1 | 4/2006 | Diez et al. |
| 2006/0283214 | A1 | 12/2006 | Donadon et al. |
| 2008/0211771 | A1 | 9/2008 | Richardson |
| 2009/0064035 | A1 | 3/2009 | Shibata et al. |
| 2009/0231356 | A1 | 9/2009 | Barnes et al. |
| 2010/0097375 | A1 | 4/2010 | Tadaishi et al. |
| 2011/0018895 | A1 | 1/2011 | Buzyn et al. |
| 2011/0018896 | A1 | 1/2011 | Buzyn et al. |
| 2011/0254865 | A1 | 10/2011 | Yee et al. |
| 2011/0310001 | A1 | 12/2011 | Madau et al. |
| 2012/0113223 | A1 | 5/2012 | Hilliges et al. |
| 2012/0170840 | A1 | 7/2012 | Caruso et al. |
| 2012/0218395 | A1 | 8/2012 | Andersen et al. |
| 2012/0257035 | A1 | 10/2012 | Larsen |
| 2013/0127850 | A1 | 5/2013 | Bindon |
| 2013/0211843 | A1 | 8/2013 | Clarkson |
| 2013/0229345 | A1 | 9/2013 | Day et al. |
| 2013/0271397 | A1 | 10/2013 | Hildreth et al. |
| 2013/0278501 | A1 | 10/2013 | Bulzacki |
| 2013/0286004 | A1 | 10/2013 | Mcculloch et al. |
| 2013/0326364 | A1 | 12/2013 | Latta et al. |
| 2013/0342564 | A1 | 12/2013 | Kinnebrew et al. |
| 2014/0002338 | A1 | 1/2014 | Raffa et al. |
| 2014/0028548 | A1 | 1/2014 | Bychkov et al. |
| 2014/0075361 | A1 | 3/2014 | Reynolds et al. |
| 2014/0108942 | A1 | 4/2014 | Freeman et al. |
| 2014/0125584 | A1 | 5/2014 | Xun et al. |
| 2014/0198017 | A1 | 7/2014 | Lamb et al. |
| 2014/0282272 | A1 | 9/2014 | Kies et al. |
| 2014/0347391 | A1 | 11/2014 | Keane et al. |
| 2015/0035822 | A1 | 2/2015 | Arsan et al. |
| 2015/0035832 | A1 | 2/2015 | Sugden et al. |
| 2015/0123890 | A1 | 5/2015 | Kapur et al. |
| 2015/0177937 | A1 | 6/2015 | Poletto et al. |
| 2015/0187093 | A1 | 7/2015 | Chu et al. |
| 2015/0242095 | A1 | 8/2015 | Sonnenberg |
| 2015/0317832 | A1 | 11/2015 | Ebstyne et al. |
| 2015/0332091 | A1 | 11/2015 | Kim et al. |
| 2015/0370323 | A1 | 12/2015 | Cieplinski et al. |
| 2016/0015470 | A1 | 1/2016 | Border |
| 2016/0018898 | A1 | 1/2016 | Tu et al. |
| 2016/0018900 | A1 | 1/2016 | Tu et al. |
| 2016/0062636 | A1 | 3/2016 | Jung et al. |
| 2016/0093108 | A1 | 3/2016 | Mao et al. |
| 2016/0098094 | A1 | 4/2016 | Minkkinen |
| 2016/0171304 | A1 | 6/2016 | Golding et al. |
| 2016/0253063 | A1 | 9/2016 | Critchlow |
| 2016/0253821 | A1 | 9/2016 | Romano et al. |
| 2016/0275702 | A1 | 9/2016 | Reynolds et al. |
| 2016/0306434 | A1 | 10/2016 | Ferrin |
| 2017/0038829 | A1 | 2/2017 | Lanier et al. |
| 2017/0038837 | A1 | 2/2017 | Faaborg et al. |
| 2017/0038849 | A1 | 2/2017 | Hwang |
| 2017/0123487 | A1 | 5/2017 | Hazra et al. |
| 2017/0132694 | A1 | 5/2017 | Damy |
| 2017/0132822 | A1 | 5/2017 | Marschke et al. |
| 2017/0206691 | A1 | 7/2017 | Harrises et al. |
| 2017/0315715 | A1 | 11/2017 | Fujita et al. |
| 2017/0344223 | A1 | 11/2017 | Holzer et al. |
| 2017/0358141 | A1 | 12/2017 | Stafford et al. |
| 2018/0045963 | A1 | 2/2018 | Hoover et al. |
| 2018/0075658 | A1 | 3/2018 | Lanier et al. |
| 2018/0081519 | A1 | 3/2018 | Kim |
| 2018/0095634 | A1 | 4/2018 | Alexander |
| 2018/0095635 | A1 | 4/2018 | Valdivia et al. |
| 2018/0101223 | A1 | 4/2018 | Ishihara et al. |
| 2018/0114364 | A1 | 4/2018 | Mcphee et al. |
| 2018/0158222 | A1 | 6/2018 | Hayashi |
| 2018/0181199 | A1 | 6/2018 | Harvey et al. |
| 2018/0188802 | A1 | 7/2018 | Okumura |
| 2018/0239144 | A1 | 8/2018 | Woods et al. |
| 2018/0300023 | A1 | 10/2018 | Hein |
| 2018/0348861 | A1 | 12/2018 | Uscinski et al. |
| 2019/0050062 | A1 | 2/2019 | Chen et al. |
| 2019/0080572 | A1 | 3/2019 | Kim et al. |
| 2019/0088149 | A1 | 3/2019 | Fink et al. |
| 2019/0094979 | A1 | 3/2019 | Hall et al. |
| 2019/0101991 | A1 | 4/2019 | Brennan |
| 2019/0146128 | A1 | 5/2019 | Cao et al. |
| 2019/0204906 | A1 | 7/2019 | Ross et al. |
| 2019/0227763 | A1 | 7/2019 | Kaufthal |
| 2019/0258365 | A1 | 8/2019 | Zurmoehle et al. |
| 2019/0310757 | A1 | 10/2019 | Lee et al. |
| 2019/0324529 | A1 | 10/2019 | Stellmach et al. |
| 2019/0371072 | A1 | 12/2019 | Lindberg et al. |
| 2019/0377487 | A1 | 12/2019 | Bailey et al. |
| 2020/0004401 | A1 | 1/2020 | Hwang et al. |

(56) References Cited

U.S. PATENT DOCUMENTS

| | | |
|---|---|---|
| 2020/0082602 A1 | 3/2020 | Jones |
| 2020/0089314 A1 | 3/2020 | Poupyrev et al. |
| 2020/0098140 A1 | 3/2020 | Jagnow et al. |
| 2020/0098173 A1 | 3/2020 | Mccall |
| 2020/0159017 A1 | 5/2020 | Lin et al. |
| 2020/0225747 A1 | 7/2020 | Bar-zeev et al. |
| 2020/0225830 A1 | 7/2020 | Tang et al. |
| 2020/0226814 A1 | 7/2020 | Tang et al. |
| 2020/0356221 A1 | 11/2020 | Behzadi et al. |
| 2020/0357374 A1 | 11/2020 | Verweij et al. |
| 2020/0387228 A1 | 12/2020 | Ravasz et al. |
| 2021/0074062 A1 | 3/2021 | Madonna et al. |
| 2021/0090337 A1 | 3/2021 | Ravasz et al. |
| 2021/0096726 A1 | 4/2021 | Faulkner et al. |
| 2021/0295602 A1* | 9/2021 | Scapel ................ G06F 3/04815 |
| 2021/0303074 A1 | 9/2021 | Vanblon et al. |
| 2021/0319617 A1 | 10/2021 | Ahn et al. |
| 2021/0327140 A1 | 10/2021 | Rothkopf et al. |
| 2021/0339134 A1 | 11/2021 | Knoppert |
| 2021/0350564 A1 | 11/2021 | Peuhkurinen et al. |
| 2021/0375022 A1 | 12/2021 | Lee et al. |
| 2022/0011855 A1 | 1/2022 | Hazra et al. |
| 2022/0030197 A1 | 1/2022 | Ishimoto |
| 2022/0083197 A1 | 3/2022 | Rockel et al. |
| 2022/0101593 A1 | 3/2022 | Rockel et al. |
| 2022/0101612 A1 | 3/2022 | Palangie et al. |
| 2022/0121344 A1 | 4/2022 | Pastrana Vicente et al. |
| 2022/0137705 A1 | 5/2022 | Hashimoto et al. |
| 2022/0155909 A1* | 5/2022 | Kawashima .......... G06F 3/0481 |
| 2022/0157083 A1 | 5/2022 | Jandhyala et al. |
| 2022/0191570 A1 | 6/2022 | Reid et al. |
| 2022/0229524 A1 | 7/2022 | Mckenzie et al. |
| 2022/0245888 A1 | 8/2022 | Singh et al. |
| 2022/0326837 A1 | 10/2022 | Dessero et al. |
| 2023/0008537 A1 | 1/2023 | Henderson et al. |
| 2023/0068660 A1 | 3/2023 | Brent et al. |
| 2023/0074080 A1 | 3/2023 | Miller et al. |
| 2023/0093979 A1 | 3/2023 | Stauber et al. |
| 2023/0152935 A1 | 5/2023 | Mckenzie et al. |
| 2023/0154122 A1 | 5/2023 | Dascola et al. |
| 2023/0163987 A1 | 5/2023 | Young et al. |
| 2023/0244857 A1 | 8/2023 | Weiss et al. |
| 2023/0273706 A1 | 8/2023 | Smith et al. |
| 2023/0274504 A1 | 8/2023 | Ren et al. |
| 2023/0315385 A1 | 10/2023 | Akmal et al. |
| 2023/0316634 A1 | 10/2023 | Chiu et al. |
| 2023/0325004 A1 | 10/2023 | Burns et al. |
| 2023/0350539 A1 | 11/2023 | Owen et al. |
| 2023/0384907 A1 | 11/2023 | Boesel et al. |
| 2024/0086031 A1 | 3/2024 | Palangie et al. |
| 2024/0086032 A1 | 3/2024 | Palangie et al. |
| 2024/0087256 A1 | 3/2024 | Hylak et al. |
| 2024/0094863 A1 | 3/2024 | Smith et al. |
| 2024/0095984 A1 | 3/2024 | Ren et al. |
| 2024/0103684 A1 | 3/2024 | Yu et al. |
| 2024/0103707 A1 | 3/2024 | Henderson et al. |
| 2024/0104836 A1 | 3/2024 | Dessero et al. |
| 2024/0104877 A1 | 3/2024 | Henderson et al. |
| 2024/0111479 A1 | 4/2024 | Paul |

FOREIGN PATENT DOCUMENTS

| | | |
|---|---|---|
| CN | 105264478 A | 1/2016 |
| CN | 108633307 A | 10/2018 |
| CN | 110476142 A | 11/2019 |
| CN | 110673718 A | 1/2020 |
| EP | 2741175 A2 | 6/2014 |
| EP | 2947545 A1 | 11/2015 |
| EP | 3503101 A1 | 6/2019 |
| EP | 3588255 A1 | 1/2020 |
| EP | 3654147 A1 | 5/2020 |
| JP | H10-51711 A | 2/1998 |
| JP | 2005-215144 A | 8/2005 |
| JP | 2012-234550 A | 11/2012 |
| JP | 2013-196158 A | 9/2013 |
| JP | 2013-257716 A | 12/2013 |
| JP | 2014-514652 A | 6/2014 |
| JP | 2015-515040 A | 5/2015 |
| JP | 2015-118332 A | 6/2015 |
| JP | 2016-194744 A | 11/2016 |
| JP | 2017-27206 A | 2/2017 |
| JP | 2018-5516 A | 1/2018 |
| JP | 2019-169154 A | 10/2019 |
| JP | 2022-53334 A | 4/2022 |
| KR | 10-2016-0012139 A | 2/2016 |
| KR | 10-2019-0100957 A | 8/2019 |
| WO | 2019/142560 A1 | 7/2019 |
| WO | 2020/066682 A1 | 4/2020 |
| WO | 2021/202783 A1 | 10/2021 |
| WO | 2022/066399 A1 | 3/2022 |
| WO | 2023/141535 A1 | 7/2023 |

OTHER PUBLICATIONS

European Search Report received for European Patent Application No. 21791153.6, mailed on Mar. 22, 2024, 5 pages.
Final Office Action received for U.S. Appl. No. 18/182,300, mailed on Feb. 16, 2024, 32 pages.
Notice of Allowance received for U.S. Appl. No. 18/465,098, mailed on Mar. 4, 2024, 6 pages.
Notice of Allowance received for U.S. Appl. No. 18/465,098, mailed on Nov. 17, 2023, 8 pages.
International Search Report received for PCT Patent Application No. PCT/US2023/074257, mailed on Nov. 21, 2023, 5 pages.
International Search Report received for PCT Patent Application No. PCT/US2023/074950, mailed on Jan. 3, 2024, 9 pages.
International Search Report received for PCT Patent Application No. PCT/US2023/074979, mailed on Feb. 26, 2024, 6 pages.
Search Report received for Chinese Patent Application No. 202310873465.7, mailed on Feb. 1, 2024, 5 pages (2 pages of English Translation and 3 pages of Official).
Non-Final Office Action received for U.S. Appl. No. 17/932,999, mailed on Feb. 23, 2024, 22 pages.
Notice of Allowance received for U.S. Appl. No. 17/448,875, mailed on Apr. 17, 2024, 8 pages.
Notice of Allowance received for U.S. Appl. No. 18/421,675, mailed on Apr. 11, 2024, 9 pages.
Notice of Allowance received for U.S. Appl. No. 18/463,739, mailed on Feb. 1, 2024, 10 pages.
Notice of Allowance received for U.S. Appl. No. 18/463,739, mailed on Oct. 30, 2023, 11 pages.
AquaSnap Window Manager: dock, snap, tile, organize [online], Nurgo Software, Available online at: <https://www.nurgo-software.com/products/aquasnap>, [retrieved on Jun. 27, 2023], 5 pages.
Corrected Notice of Allowability received for U.S. Appl. No. 17/659,147, mailed on Feb. 14, 2024, 6 pages.
Corrected Notice of Allowability received for U.S. Appl. No. 17/932,655, mailed on Oct. 12, 2023, 2 pages.
Corrected Notice of Allowance received for U.S. Appl. No. 17/478,593, mailed on Dec. 21, 2022, 2 pages.
Extended European Search Report received for European Patent Application No. 23158818.7, mailed on Jul. 3, 2023, 12 pages.
Extended European Search Report received for European Patent Application No. 23158929.2, mailed on Jun. 27, 2023, 12 pages.
Final Office Action received for U.S. Appl. No. 17/448,875, mailed on Mar. 16, 2023, 24 pages.
Final Office Action received for U.S. Appl. No. 17/659,147, mailed on Oct. 4, 2023, 17 pages.
Home | Virtual Desktop [online], Virtual Desktop, Available online at: <https://www.vrdesktop.net>, [retrieved on Jun. 29, 2023], 4 pages.
International Search Report received for PCT Application No. PCT/US2022/076603, mailed on Jan. 9, 2023, 4 pages.
International Search Report received for PCT Application No. PCT/US2023/017335, mailed on Aug. 22, 2023, 6 pages.
International Search Report received for PCT Application No. PCT/US2023/018213, mailed on Jul. 26, 2023, 6 pages.

(56) References Cited

OTHER PUBLICATIONS

International Search Report received for PCT Application No. PCT/US2023/019458, mailed on Aug. 8, 2023, 7 pages.
International Search Report received for PCT Application No. PCT/US2023/060943, mailed on Jun. 6, 2023, 7 pages.
Pfeuffer et al., "Gaze + Pinch Interaction in Virtual Reality", In Proceedings of SUI '17, Brighton, United Kingdom, Oct. 16-17, 2017, pp. 99-108.
International Search Report received for PCT Patent Application No. PCT/US2021/050948, mailed on Mar. 4, 2022, 6 pages.
McGill et al., "Expanding The Bounds Of Seated Virtual Workspaces", University of Glasgow, Available online at: <https://core.ac.uk/download/pdf/323988271.pdf>, [retrieved on Jun. 27, 2023], Jun. 5, 2020, 44 pages.
International Search Report received for PCT Patent Application No. PCT/US2021/071595, mailed on Mar. 17, 2022, 7 pages.
International Search Report received for PCT Patent Application No. PCT/US2021/071596, mailed on Apr. 8, 2022, 7 pages.
International Search Report received for PCT Patent Application No. PCT/US2022/013208, mailed on Apr. 26, 2022, 7 pages.
International Search Report received for PCT Patent Application No. PCT/US2022/071704, mailed on Aug. 26, 2022, 6 pages.
Lin et al., "Towards Naturally Grabbing and Moving Objects in VR", IS&T International Symposium on Electronic Imaging and The Engineering Reality of Virtual Reality, 2016, 6 pages.
Non-Final Office Action received for U.S. Appl. No. 17/448,875, mailed on Oct. 6, 2022, 25 pages.
Non-Final Office Action received for U.S. Appl. No. 17/448,875, mailed on Sep. 29, 2023, 30 pages.
Non-Final Office Action received for U.S. Appl. No. 17/580,495, mailed on Dec. 11, 2023, 27 pages.
Non-Final Office Action received for U.S. Appl. No. 18/182,300, mailed on Oct. 26, 2023, 29 pages.
Non-Final Office Action received for U.S. Appl. No. 17/659,147, mailed on Mar. 16, 2023, 19 pages.
Non-Final Office Action received for U.S. Appl. No. 17/932,655, mailed on Apr. 20, 2023, 10 pages.
Notice of Allowance received for U.S. Appl. No. 17/448,876, mailed on Apr. 7, 2022, 9 pages.
Notice of Allowance received for U.S. Appl. No. 17/448,876, mailed on Jul. 20, 2022, 8 pages.
Notice of Allowance received for U.S. Appl. No. 17/478,593, mailed on Aug. 31, 2022, 10 pages.
Notice of Allowance received for U.S. Appl. No. 17/580,495, mailed on Jun. 6, 2023, 6 pages.
Notice of Allowance received for U.S. Appl. No. 17/580,495, mailed on Nov. 30, 2022, 12 pages.
Notice of Allowance received for U.S. Appl. No. 17/659,147, mailed on Jan. 26, 2024, 13 pages.
Notice of Allowance received for U.S. Appl. No. 17/932,655, mailed on Jan. 24, 2024, 7 pages.
Notice of Allowance received for U.S. Appl. No. 17/932,655, mailed on Sep. 29, 2023, 7 pages.
Notice of Allowance received for U.S. Appl. No. 18/154,757, mailed on Jan. 23, 2024, 10 pages.
Restriction Requirement received for U.S. Appl. No. 17/932,999, mailed on Oct. 3, 2023, 6 pages.
Bhowmick, Shimmila, "Explorations on Body-Gesture Based Object Selection on HMD Based VR Interfaces for Dense and Occluded Dense Virtual Environments", Report: State of the Art Seminar, Department of Design Indian Institute of Technology, Guwahati, Nov. 2018, 25 pages.
Bolt et al., "Two-Handed Gesture in Multi-Modal Natural Dialog", Uist '92, 5th Annual Symposium on User Interface Software And Technology. Proceedings Of the ACM Symposium on User Interface Software And Technology, Monterey, Nov. 15-18, 1992, pp. 7-14.
Brennan, Dominic, "4 Virtual Reality Desktops for Vive, Rift, and Windows VR Compared", [online]. Road to VR, Available online at: <https://www.roadtovr.com/virtual-reality-desktop-compared-oculus-rift-htc-vive/>, [retrieved on Jun. 29, 2023], Jan. 3, 2018, 4 pages.
Camalich, Sergio, "CSS Buttons with Pseudo-elements", Available online at: <https://tympanus.net/codrops/2012/01/11/css-buttons-with-pseudo-elements/>, [retrieved on Jul. 12, 2017], Jan. 11, 2012, 8 pages.
Chatterjee et al., "Gaze+Gesture: Expressive, Precise and Targeted Free-Space Interactions", ICMI '15, Nov. 9-13, 2015, 8 pages.

* cited by examiner

700

702 While in a communication session with a second electronic device, present, via a display, a computer-generated environment including an avatar corresponding to a user of the second electronic device and a first object, wherein the computer-generated environment is presented based on a first set of display parameters satisfying a first set of criteria, the first set of display parameters including:

704 A spatial parameter for the user of the second electronic device

706 A spatial parameter for the first object

708 A display mode parameter for the first object

710 While displaying the computer-generated environment including the avatar corresponding to the user of the second electronic device and the first object, detect a change in one or more of the first set of display parameters

712 In response to detecting the change in the one or more first set of display parameters:

714 In accordance with a determination that the change in the one or more of the first set of display parameters causes the first set of display parameters to satisfy a second set of criteria, different from the first set of criteria, update, via the display, presentation of the computer-generated environment in accordance with the one or more changes of the first set of display parameters, including:

716 Update display of the first object in the computer-generated environment

718 Update display of the avatar corresponding to the user of the second electronic device in the computer-generated environment (A)

FIG. 7A

SYSTEM AND METHOD OF MANAGING SPATIAL STATES AND DISPLAY MODES IN MULTI-USER COMMUNICATION SESSIONS

CROSS-REFERENCE TO RELATED APPLICATIONS

This application claims the benefit of U.S. Provisional Application No. 63/487,244, filed Feb. 27, 2023, U.S. Provisional Application No. 63/505,522, filed Jun. 1, 2023, U.S. Provisional Application No. 63/515,080, filed Jul. 21, 2023, and U.S. Provisional Application No. 63/587,448, filed Oct. 2, 2023, the contents of which are herein incorporated by reference in their entireties for all purposes.

FIELD OF THE DISCLOSURE

This relates generally to systems and methods of managing spatial states and display modes for avatars within multi-user communication sessions.

BACKGROUND OF THE DISCLOSURE

Some computer graphical environments provide two-dimensional and/or three-dimensional environments where at least some objects displayed for a user's viewing are virtual and generated by a computer. In some examples, the three-dimensional environments are presented by multiple devices communicating in a multi-user communication session. In some examples, an avatar (e.g., a representation) of each user participating in the multi-user communication session (e.g., via the computing devices) is displayed in the three-dimensional environment of the multi-user communication session. In some examples, content can be shared in the three-dimensional environment for viewing and interaction by multiple users participating in the multi-user communication session.

SUMMARY OF THE DISCLOSURE

Some examples of the disclosure are directed to systems and methods for facilitating display of content and avatars in a multi-communication session. In some examples, a first electronic device is in a communication session with a second electronic device, wherein the first electronic device and the second electronic device are configured to present a computer-generated environment. In some examples, the first electronic device presents a computer-generated environment including an avatar corresponding to a user of the second electronic device and a first object, wherein the computer-generated environment is presented based on a first set of display parameters satisfying a first set of criteria. In some examples, the first set of display parameters includes a spatial parameter for the user of the second electronic device, a spatial parameter for the first object, and a display mode parameter for the first object. In some examples, while displaying the computer-generated environment including the avatar corresponding to the user of the second electronic device and the first object, the first electronic device detects a change in one or more of the first set of display parameters. In some embodiments, in response to detecting the change, in accordance with a determination that the change in the one or more of the first set of display parameters causes the first set of display parameters to satisfy a second set of criteria, different from the first set of criteria, the first electronic device updates presentation of the computer-generated environment in accordance with the one or more changes of the first set of display parameters. In some examples, the first electronic device moves the first object or changes a display state of the first object in the computer-generated environment. In some examples, the first electronic device moves the avatar corresponding to the user of the second electronic device or ceases display of the avatar in the computer-generated environment. In some examples, in accordance with a determination that the change in the one or more of the first set of display parameters does not cause the first set of display parameters to satisfy the second set of criteria, the first electronic device maintains presentation of the computer-generated environment based on the first set of display parameters satisfying the first set of criteria.

In some examples, the first set of display parameters satisfies the first set of criteria if spatial truth is enabled, the spatial parameter for the first object defines the spatial template for the first object as being a first spatial template, and/or the first object is displayed in a non-exclusive mode in the computer-generated environment in the communication session. In some examples, the first set of display parameters satisfies the second set of criteria if spatial truth is disabled, the spatial parameter for the first object defines the spatial template as being a second spatial template, and/or the first object is displayed in an exclusive mode in the computer-generated environment in the communication session.

The full descriptions of these examples are provided in the Drawings and the Detailed Description, and it is understood that this Summary does not limit the scope of the disclosure in any way.

BRIEF DESCRIPTION OF THE DRAWINGS

For improved understanding of the various examples described herein, reference should be made to the Detailed Description below along with the following drawings. Like reference numerals often refer to corresponding parts throughout the drawings.

FIGS. 7A-7B illustrate a flow diagram illustrating an example process for displaying content within a multi-user communication session based on one or more display parameters according to some examples of the disclosure.

DETAILED DESCRIPTION

Figure 1:
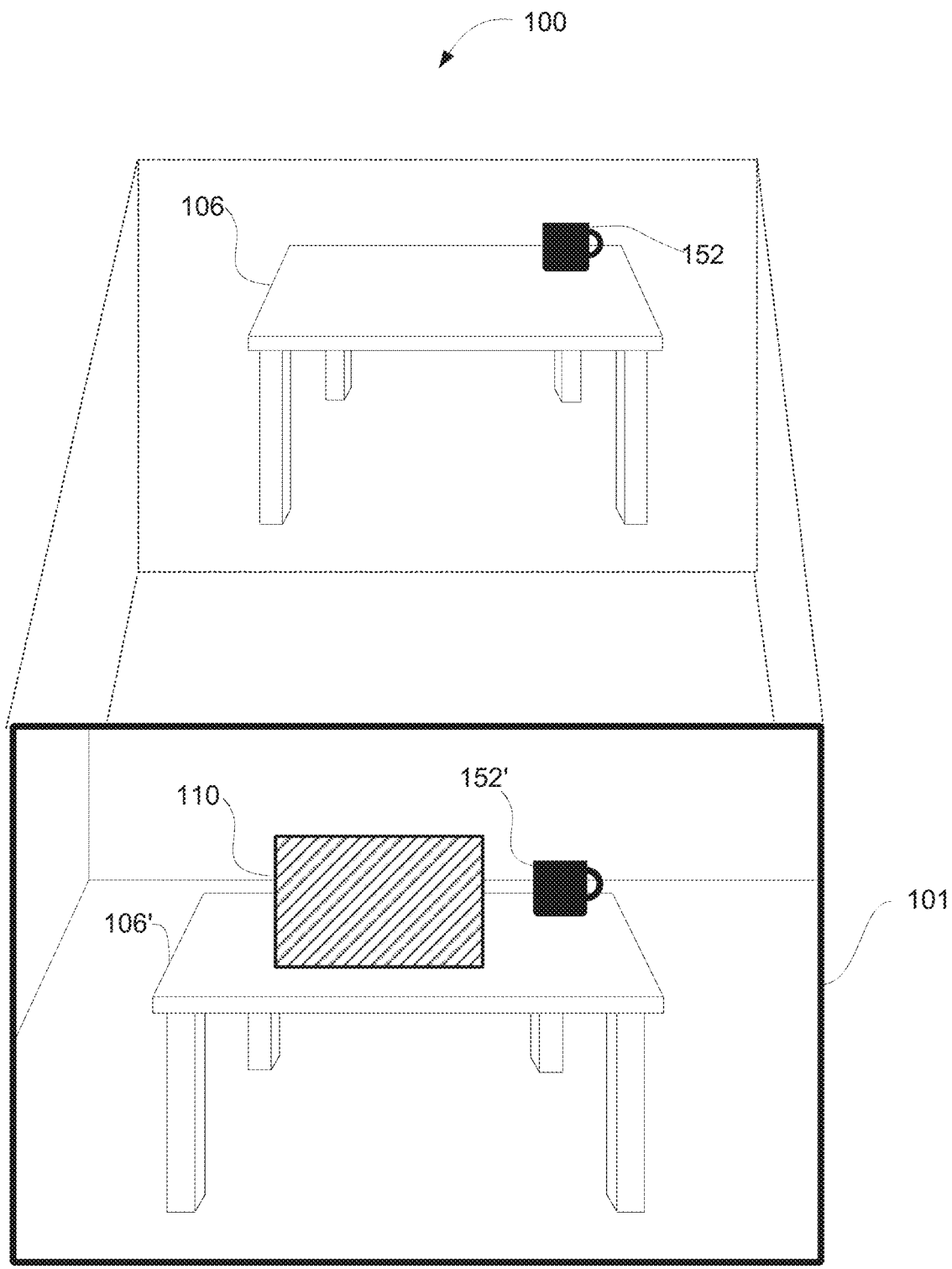
FIG. 1 illustrates an electronic device presenting an extended reality environment according to some examples of the disclosure.

Some examples of the disclosure are directed to systems and methods for facilitating display of content and avatars in a multi-communication session. In some examples, a first electronic device is in a communication session with a second electronic device, wherein the first electronic device and the second electronic device are configured to present a computer-generated environment. In some examples, the first electronic device presents a computer-generated environment including an avatar corresponding to a user of the second electronic device and a first object, wherein the computer-generated environment is presented based on a first set of display parameters satisfying a first set of criteria. In some examples, the first set of display parameters includes a spatial parameter for the user of the second electronic device, a spatial parameter for the first object, and a display mode parameter for the first object. In some examples, while displaying the computer-generated environment including the avatar corresponding to the user of the second electronic device and the first object, the first electronic device detects a change in one or more of the first set of display parameters. In some embodiments, in response to detecting the change, in accordance with a determination that the change in the one or more of the first set of display parameters causes the first set of display parameters to satisfy a second set of criteria, different from the first set of criteria, the first electronic device updates presentation of the computer-generated environment in accordance with the one or more changes of the first set of display parameters. In some examples, the first electronic device moves the first object or changes a display state of the first object in the computer-generated environment. In some examples, the first electronic device moves the avatar corresponding to the user of the second electronic device or ceases display of the avatar in the computer-generated environment. In some examples, in accordance with a determination that the change in the one or more of the first set of display parameters does not cause the first set of display parameters to satisfy the second set of criteria, the first electronic device maintains presentation of the computer-generated environment based on the first set of display parameters satisfying the first set of criteria.

In some examples, the first set of display parameters satisfies the first set of criteria if spatial truth is enabled, the spatial parameter for the first object defines the spatial template for the first object as being a first spatial template, and/or the first object is displayed in a non-exclusive mode in the computer-generated environment in the communication session. In some examples, the first set of display parameters satisfies the second set of criteria if spatial truth is disabled, the spatial parameter for the first object defines the spatial template as being a second spatial template, and/or the first object is displayed in an exclusive mode in the computer-generated environment in the communication session.

In some examples, a spatial group or state in the multi-user communication session denotes a spatial arrangement/template that dictates locations of users and content that are located in the spatial group. In some examples, users in the same spatial group within the multi-user communication session experience spatial truth according to the spatial arrangement of the spatial group. In some examples, when the user of the first electronic device is in a first spatial group and the user of the second electronic device is in a second spatial group in the multi-user communication session, the users experience spatial truth that is localized to their respective spatial groups. In some examples, while the user of the first electronic device and the user of the second electronic device are grouped into separate spatial groups or states within the multi-user communication session, if the first electronic device and the second electronic device return to the same operating state, the user of the first electronic device and the user of the second electronic device are regrouped into the same spatial group within the multi-user communication session.

In some examples, displaying content in the three-dimensional environment while in the multi-user communication session may include interaction with one or more user interface elements. In some examples, a user's gaze may be tracked by the electronic device as an input for targeting a selectable option/affordance within a respective user interface element that is displayed in the three-dimensional environment. For example, gaze can be used to identify one or more options/affordances targeted for selection using another selection input. In some examples, a respective option/affordance may be selected using hand-tracking input detected via an input device in communication with the electronic device. In some examples, objects displayed in the three-dimensional environment may be moved and/or reoriented in the three-dimensional environment in accordance with movement input detected via the input device.

FIG. 1 illustrates an electronic device 101 presenting an extended reality (XR) environment (e.g., a computer-generated environment) according to some examples of the disclosure. In some examples, electronic device 101 is a hand-held or mobile device, such as a tablet computer, laptop computer, smartphone, or head-mounted display. Examples of device 101 are described below with reference to the architecture block diagram of FIG. 2. As shown in FIG. 1, electronic device 101, table 106, and coffee mug 152 are located in the physical environment 100. The physical environment may include physical features such as a physical surface (e.g., floor, walls) or a physical object (e.g., table, lamp, etc.). In some examples, electronic device 101 may be configured to capture images of physical environment 100 including table 106 and coffee mug 152 (illustrated in the field of view of electronic device 101). In some examples, in response to a trigger, the electronic device 101 may be configured to display a virtual object 110 (e.g., two-dimensional virtual content) in the computer-generated environment (e.g., represented by a rectangle illustrated in FIG. 1) that is not present in the physical environment 100, but is displayed in the computer-generated environment positioned on (e.g., anchored to) the top of a computer-generated representation 106' of real-world table 106. For example, virtual object 110 can be displayed on the surface of the computer-generated representation 106' of the table in the computer-generated environment next to the computer-generated representation 152' of real-world coffee mug 152 displayed via device 101 in response to detecting the planar surface of table 106 in the physical environment 100.

It should be understood that virtual object 110 is a representative virtual object and one or more different virtual objects (e.g., of various dimensionality such as two-dimensional or three-dimensional virtual objects) can be included and rendered in a three-dimensional computer-generated environment. For example, the virtual object can represent an application, or a user interface displayed in the computer-generated environment. In some examples, the virtual object can represent content corresponding to the application and/or displayed via the user interface in the computer-generated environment. In some examples, the virtual object 110 is optionally configured to be interactive and responsive to user input, such that a user may virtually touch, tap, move, rotate, or otherwise interact with, the virtual object. In some examples, the virtual object 110 may be displayed in a three-dimensional computer-generated environment within a multi-user communication session ("multi-user communication session," "communication session"). In some such examples, as described in more detail below, the virtual object 110 may be viewable and/or configured to be interactive and responsive to multiple users and/or user input provided by multiple users, respectively. Additionally, it should be understood, that the 3D environment (or 3D virtual object) described herein may be a representation of a 3D environment (or three-dimensional virtual object) projected or presented at an electronic device.

In the discussion that follows, an electronic device that is in communication with a display generation component and one or more input devices is described. It should be understood that the electronic device optionally is in communication with one or more other physical user-interface devices, such as a touch-sensitive surface, a physical keyboard, a mouse, a joystick, a hand tracking device, an eye tracking device, a stylus, etc. Further, as described above, it should be understood that the described electronic device, display, and touch-sensitive surface are optionally distributed amongst two or more devices. Therefore, as used in this disclosure, information displayed on the electronic device or by the electronic device is optionally used to describe information outputted by the electronic device for display on a separate display device (touch-sensitive or not). Similarly, as used in this disclosure, input received on the electronic device (e.g., touch input received on a touch-sensitive surface of the electronic device, or touch input received on the surface of a stylus) is optionally used to describe input received on a separate input device, from which the electronic device receives input information.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, a television channel browsing application, and/or a digital video player application.

Figure 2:
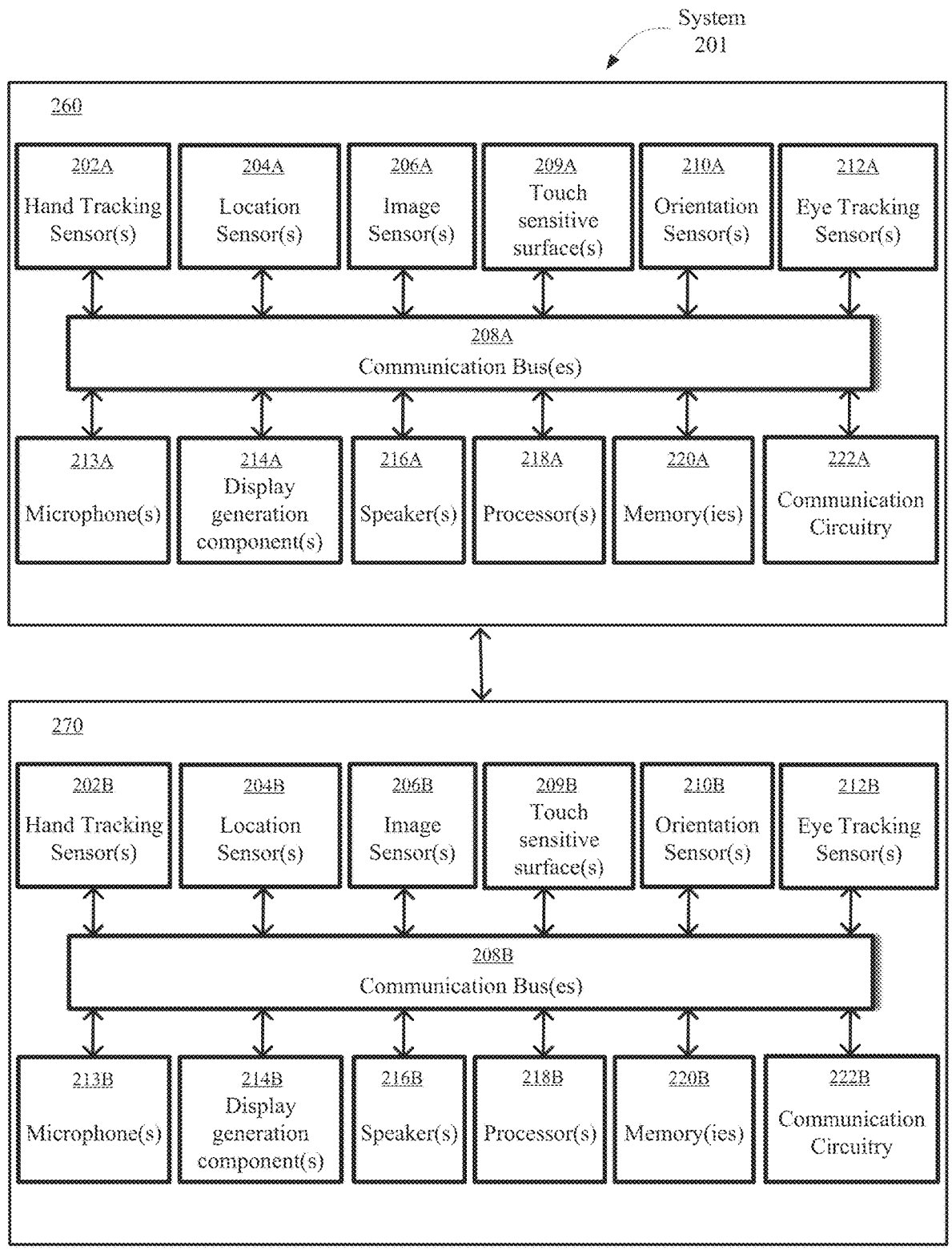
FIG. 2 illustrates a block diagram of an exemplary architecture for a system according to some examples of the disclosure.

FIG. 2 illustrates a block diagram of an exemplary architecture for a system 201 according to some examples of the disclosure. In some examples, system 201 includes multiple devices. For example, the system 201 includes a first electronic device 260 and a second electronic device 270, wherein the first electronic device 260 and the second electronic device 270 are in communication with each other. In some examples, the first electronic device 260 and the second electronic device 270 are a portable device, such as a mobile phone, smart phone, a tablet computer, a laptop computer, an auxiliary device in communication with another device, etc., respectively.

As illustrated in FIG. 2, the first electronic device 260 optionally includes various sensors (e.g., one or more hand tracking sensor(s) 202A, one or more location sensor(s) 204A, one or more image sensor(s) 206A, one or more touch-sensitive surface(s) 209A, one or more motion and/or orientation sensor(s) 210A, one or more eye tracking sensor(s) 212A, one or more microphone(s) 213A or other audio sensors, etc.), one or more display generation component(s) 214A, one or more speaker(s) 216A, one or more processor(s) 218A, one or more memories 220A, and/or communication circuitry 222A. In some examples, the second device 270 optionally includes various sensors (e.g., one or more hand tracking sensor(s) 202B, one or more location sensor(s) 204B, one or more image sensor(s) 206B, one or more touch-sensitive surface(s) 209B, one or more motion and/or orientation sensor(s) 210B, one or more eye tracking sensor(s) 212B, one or more microphone(s) 213B or other audio sensors, etc.), one or more display generation component(s) 214B, one or more speaker(s) 216, one or more processor(s) 218B, one or more memories 220B, and/or communication circuitry 222B. One or more communication buses 208A and 208B are optionally used for communication between the above-mentioned components of devices 260 and 270, respectively. First electronic device 260 and second electronic device 270 optionally communicate via a wired or wireless connection (e.g., via communication circuitry 222A-222B) between the two devices.

Communication circuitry 222A, 222B optionally includes circuitry for communicating with electronic devices, networks, such as the Internet, intranets, a wired network and/or a wireless network, cellular networks, and wireless local area networks (LANs). Communication circuitry 222A, 222B optionally includes circuitry for communicating using near-field communication (NFC) and/or short-range communication, such as Bluetooth®.

Processor(s) 218A, 218B include one or more general processors, one or more graphics processors, and/or one or more digital signal processors. In some examples, memory 220A, 220B is a non-transitory computer-readable storage medium (e.g., flash memory, random access memory, or other volatile or non-volatile memory or storage) that stores computer-readable instructions configured to be executed by processor(s) 218A, 218B to perform the techniques, processes, and/or methods described below. In some examples, memory 220A, 220B can include more than one non-transitory computer-readable storage medium. A non-transitory computer-readable storage medium can be any medium (e.g., excluding a signal) that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like.

In some examples, display generation component(s) 214A, 214B include a single display (e.g., a liquid-crystal display (LCD), organic light-emitting diode (OLED), or other types of display). In some examples, display generation component(s) 214A, 214B includes multiple displays. In some examples, display generation component(s) 214A, 214B can include a display with touch capability (e.g., a touch screen), a projector, a holographic projector, a retinal projector, a transparent or translucent display, etc. In some examples, devices 260 and 270 include touch-sensitive surface(s) 209A and 209B, respectively, for receiving user inputs, such as tap inputs and swipe inputs or other gestures. In some examples, display generation component(s) 214A, 214B and touch-sensitive surface(s) 209A, 209B form touch-sensitive display(s) (e.g., a touch screen integrated with devices 260 and 270, respectively, or external to devices 260 and 270, respectively, that is in communication with devices 260 and 270).

Devices 260 and 270 optionally include image sensor(s) 206A and 206B, respectively. Image sensors(s) 206A/206B optionally include one or more visible light image sensors, such as charged coupled device (CCD) sensors, and/or complementary metal-oxide-semiconductor (CMOS) sensors operable to obtain images of physical objects from the real-world environment. Image sensor(s) 206A/206B also optionally include one or more infrared (IR) sensors, such as a passive or an active IR sensor, for detecting infrared light from the real-world environment. For example, an active IR sensor includes an IR emitter for emitting infrared light into the real-world environment. Image sensor(s) 206A/206B also optionally include one or more cameras configured to capture movement of physical objects in the real-world environment. Image sensor(s) 206A/206B also optionally include one or more depth sensors configured to detect the distance of physical objects from device 260/270. In some examples, information from one or more depth sensors can allow the device to identify and differentiate objects in the real-world environment from other objects in the real-world environment. In some examples, one or more depth sensors can allow the device to determine the texture and/or topography of objects in the real-world environment.

In some examples, devices 260 and 270 use CCD sensors, event cameras, and depth sensors in combination to detect the physical environment around devices 260 and 270. In some examples, image sensor(s) 206A/206B include a first image sensor and a second image sensor. The first image sensor and the second image sensor work in tandem and are optionally configured to capture different information of physical objects in the real-world environment. In some examples, the first image sensor is a visible light image sensor and the second image sensor is a depth sensor. In some examples, device 260/270 uses image sensor(s) 206A/206B to detect the position and orientation of device 260/270 and/or display generation component(s) 214A/214B in the real-world environment. For example, device 260/270 uses image sensor(s) 206A/206B to track the position and orientation of display generation component(s) 214A/214B relative to one or more fixed objects in the real-world environment.

In some examples, device 260/270 includes microphone(s) 213A/213B or other audio sensors. Device 260/270 uses microphone(s) 213A/213B to detect sound from the user and/or the real-world environment of the user. In some examples, microphone(s) 213A/213B includes an array of microphones (a plurality of microphones) that optionally operate in tandem, such as to identify ambient noise or to locate the source of sound in space of the real-world environment.

In some examples, device 260/270 includes location sensor(s) 204A/204B for detecting a location of device 260/270 and/or display generation component(s) 214A/214B. For example, location sensor(s) 204A/204B can include a GPS receiver that receives data from one or more satellites and allows device 260/270 to determine the device's absolute position in the physical world.

In some examples, device 260/270 includes orientation sensor(s) 210A/210B for detecting orientation and/or movement of device 260/270 and/or display generation component(s) 214A/214B. For example, device 260/270 uses orientation sensor(s) 210A/210B to track changes in the position and/or orientation of device 260/270 and/or display generation component(s) 214A/214B, such as with respect to physical objects in the real-world environment. Orientation sensor(s) 210A/210B optionally include one or more gyroscopes and/or one or more accelerometers.

Device 260/270 includes hand tracking sensor(s) 202A/202B and/or eye tracking sensor(s) 212A/212B, in some examples. Hand tracking sensor(s) 202A/202B are configured to track the position/location of one or more portions of the user's hands, and/or motions of one or more portions of the user's hands with respect to the extended reality environment, relative to the display generation component(s) 214A/214B, and/or relative to another defined coordinate system. Eye tracking sensor(s) 212A/212B are configured to track the position and movement of a user's gaze (eyes, face, or head, more generally) with respect to the real-world or extended reality environment and/or relative to the display generation component(s) 214A/214B. In some examples, hand tracking sensor(s) 202A/202B and/or eye tracking sensor(s) 212A/212B are implemented together with the display generation component(s) 214A/214B. In some examples, the hand tracking sensor(s) 202A/202B and/or eye tracking sensor(s) 212A/212B are implemented separate from the display generation component(s) 214A/214B.

In some examples, the hand tracking sensor(s) 202A/202B can use image sensor(s) 206A/206B (e.g., one or more IR cameras, 3D cameras, depth cameras, etc.) that capture three-dimensional information from the real-world including one or more hands (e.g., of a human user). In some examples, the hands can be resolved with sufficient resolution to distinguish fingers and their respective positions. In some examples, one or more image sensor(s) 206A/206B are positioned relative to the user to define a field of view of the image sensor(s) 206A/206B and an interaction space in which finger/hand position, orientation and/or movement captured by the image sensors are used as inputs (e.g., to distinguish from a user's resting hand or other hands of other persons in the real-world environment). Tracking the fingers/hands for input (e.g., gestures, touch, tap, etc.) can be advantageous in that it does not require the user to touch, hold or wear any sort of beacon, sensor, or other marker.

In some examples, eye tracking sensor(s) 212A/212B includes at least one eye tracking camera (e.g., infrared (IR) cameras) and/or illumination sources (e.g., IR light sources, such as LEDs) that emit light towards a user's eyes. The eye tracking cameras may be pointed towards a user's eyes to receive reflected IR light from the light sources directly or indirectly from the eyes. In some examples, both eyes are tracked separately by respective eye tracking cameras and illumination sources, and a focus/gaze can be determined from tracking both eyes. In some examples, one eye (e.g., a dominant eye) is tracked by a respective eye tracking camera/illumination source(s).

Device 260/270 and system 201 are not limited to the components and configuration of FIG. 2, but can include fewer, other, or additional components in multiple configurations. In some examples, system 201 can be implemented in a single device. A person or persons using system 201, is optionally referred to herein as a user or users of the device(s). Attention is now directed towards exemplary concurrent displays of a three-dimensional environment on a first electronic device (e.g., corresponding to device 260) and a second electronic device (e.g., corresponding to device 270). As discussed below, the first electronic device may be in communication with the second electronic device in a multi-user communication session. In some examples, an avatar (e.g., a representation of) a user of the first electronic device may be displayed in the three-dimensional environment at the second electronic device, and an avatar of a user of the second electronic device may be displayed in the three-dimensional environment at the first electronic device. In some examples, the user of the first electronic device and the user of the second electronic device may be associated with a same spatial state in the multi-user communication session. In some examples, interactions with content (or other types of interactions) in the three-dimensional environment while the first electronic device and the second electronic device are in the multi-user communication session may cause the user of the first electronic device and the user of the second electronic device to become associated with different spatial states in the multi-user communication session.

Figure 3:
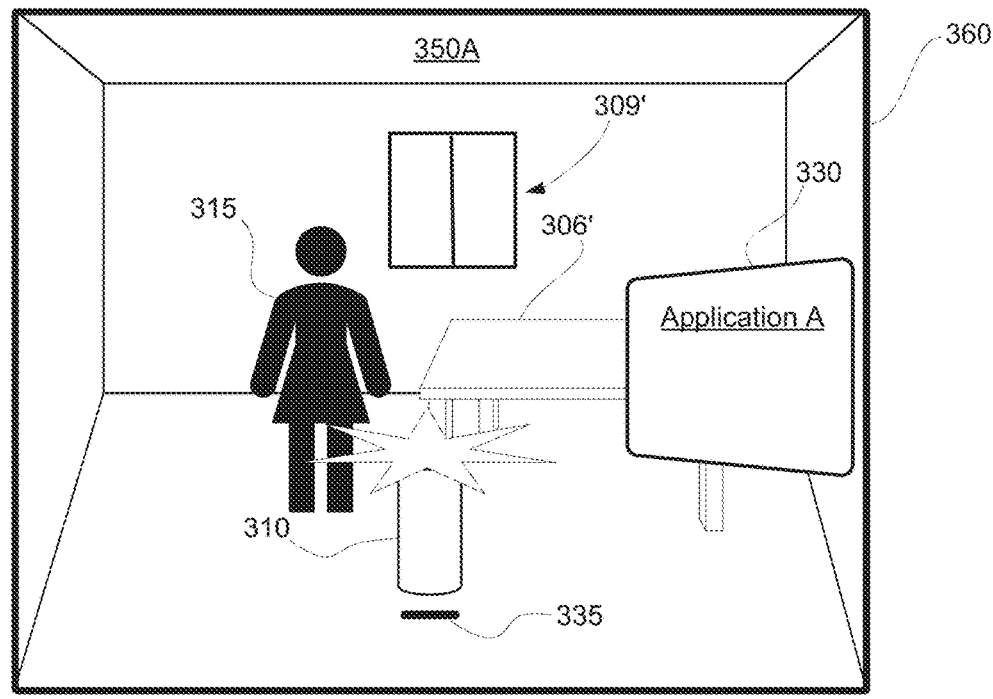
FIG. 3 illustrates an example of a multi-user communication session that includes a first electronic device and a second electronic device according to some examples of the disclosure.
Figure 3:
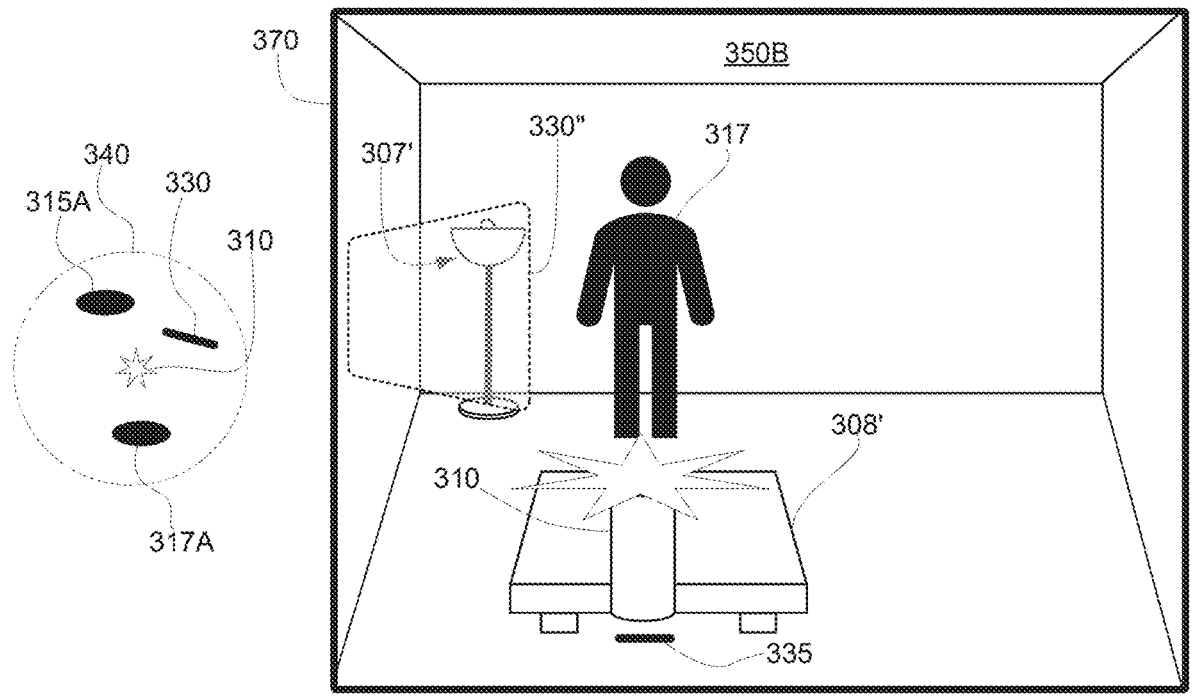

FIG. 3 illustrates an example of a multi-user communication session that includes a first electronic device 360 and a second electronic device 370 according to some examples of the disclosure. In some examples, the first electronic device 360 may present a three-dimensional environment 350A, and the second electronic device 370 may present a three-dimensional environment 350B. The first electronic device 360 and the second electronic device 370 may be similar to device 101 or 260/270, and/or may be a head mountable system/device and/or projection-based system/device (including a hologram-based system/device) configured to generate and present a three-dimensional environment, such as, for example, heads-up displays (HUDs), head mounted displays (HMDs), windows having integrated display capability, displays formed as lenses designed to be placed on a person's eyes (e.g., similar to contact lenses), respectively. In the example of FIG. 3, a first user is optionally wearing the first electronic device 360 and a second user is optionally wearing the second electronic device 370, such that the three-dimensional environment 350A/350B can be defined by X, Y and Z axes as viewed from a perspective of the electronic devices (e.g., a viewpoint associated with the electronic device 360/370, which may be a head-mounted display, for example).

As shown in FIG. 3, the first electronic device 360 may be in a first physical environment that includes a table 306 and a window 309. Thus, the three-dimensional environment 350A presented using the first electronic device 360 optionally includes captured portions of the physical environment surrounding the first electronic device 360, such as a representation of the table 306' and a representation of the window 309'. Similarly, the second electronic device 370 may be in a second physical environment, different from the first physical environment (e.g., separate from the first physical environment), that includes a floor lamp 307 and a coffee table 308. Thus, the three-dimensional environment 350B presented using the second electronic device 370 optionally includes captured portions of the physical environment surrounding the second electronic device 370, such as a representation of the floor lamp 307' and a representation of the coffee table 308'. Additionally, the three-dimensional environments 350A and 350B may include representations of the floor, ceiling, and walls of the room in which the first electronic device 360 and the second electronic device 370, respectively, are located.

As mentioned above, in some examples, the first electronic device 360 is optionally in a multi-user communication session with the second electronic device 370. For example, the first electronic device 360 and the second electronic device 370 (e.g., via communication circuitry 222A/222B) are configured to present a shared three-dimensional environment 350A/350B that includes one or more shared virtual objects (e.g., content such as images, video, audio and the like, representations of user interfaces of applications, etc.). As used herein, the term "shared three-dimensional environment" refers to a three-dimensional environment that is independently presented, displayed, and/or visible at two or more electronic devices via which content, applications, data, and the like may be shared and/or presented to users of the two or more electronic devices. In some examples, while the first electronic device 360 is in the multi-user communication session with the second electronic device 370, an avatar corresponding to the user of one electronic device is optionally displayed in the three-dimensional environment that is displayed via the other electronic device. For example, as shown in FIG. 3, at the first electronic device 360, an avatar 315 corresponding to the user of the second electronic device 370 is displayed in the three-dimensional environment 350A. Similarly, at the second electronic device 370, an avatar 317 corresponding to the user of the first electronic device 360 is displayed in the three-dimensional environment 350B.

In some examples, the presentation of avatars 315/317 as part of a shared three-dimensional environment is optionally accompanied by an audio effect corresponding to a voice of the users of the electronic devices 370/360. For example, the avatar 315 displayed in the three-dimensional environment 350A using the first electronic device 360 is optionally accompanied by an audio effect corresponding to the voice of the user of the second electronic device 370. In some such examples, when the user of the second electronic device 370 speaks, the voice of the user may be detected by the second electronic device 370 (e.g., via the microphone(s) 213B) and transmitted to the first electronic device 360 (e.g., via the communication circuitry 222B/222A), such that the detected voice of the user of the second electronic device 370 may be presented as audio (e.g., using speaker(s) 216A) to the user of the first electronic device 360 in three-dimensional environment 350A. In some examples, the audio effect corresponding to the voice of the user of the second electronic device 370 may be spatialized such that it appears to the user of the first electronic device 360 to emanate from the location of avatar 315 in the shared three-dimensional environment 350A (e.g., despite being outputted from the speakers of the first electronic device 360). Similarly, the avatar 317 displayed in the three-dimensional environment 350B using the second electronic device 370 is optionally accompanied by an audio effect corresponding to the voice of the user of the first electronic device 360. In some such examples, when the user of the first electronic device 360 speaks, the voice of the user may be detected by the first electronic device 360 (e.g., via the microphone(s) 213A) and transmitted to the second electronic device 370 (e.g., via the communication circuitry 222A/222B), such that the detected voice of the user of the first electronic device 360 may be presented as audio (e.g., using speaker(s) 216B) to the user of the second electronic device 370 in three-dimensional environment 350B. In some examples, the audio effect corresponding to the voice of the user of the first electronic device 360 may be spatialized such that it appears to the user of the second electronic device 370 to emanate from the location of avatar 317 in the shared three-dimensional environment 350B (e.g., despite being outputted from the speakers of the first electronic device 360).

In some examples, while in the multi-user communication session, the avatars 315/317 are displayed in the three-dimensional environments 350A/350B with respective orientations that correspond to and/or are based on orientations of the electronic devices 360/370 (and/or the users of electronic devices 360/370) in the physical environments surrounding the electronic devices 360/370. For example, as shown in FIG. 3, in the three-dimensional environment 350A, the avatar 315 is optionally facing toward the viewpoint of the user of the first electronic device 360, and in the three-dimensional environment 350B, the avatar 317 is optionally facing toward the viewpoint of the user of the second electronic device 370. As a particular user moves the electronic device (and/or themself) in the physical environment, the viewpoint of the user changes in accordance with the movement, which may thus also change an orientation of the user's avatar in the three-dimensional environment. For example, with reference to FIG. 3, if the user of the first electronic device 360 were to look leftward in the three-dimensional environment 350A such that the first electronic device 360 is rotated (e.g., a corresponding amount) to the left (e.g., counterclockwise), the user of the second electronic device 370 would see the avatar 317 corresponding to the user of the first electronic device 360 rotate to the right (e.g., clockwise) relative to the viewpoint of the user of the second electronic device 370 in accordance with the movement of the first electronic device 360.

Additionally, in some examples, while in the multi-user communication session, a viewpoint of the three-dimensional environments 350A/350B and/or a location of the viewpoint of the three-dimensional environments 350A/350B optionally changes in accordance with movement of the electronic devices 360/370 (e.g., by the users of the electronic devices 360/370). For example, while in the communication session, if the first electronic device 360 is moved closer toward the representation of the table 306' and/or the avatar 315 (e.g., because the user of the first electronic device 360 moved forward in the physical environment surrounding the first electronic device 360), the viewpoint of the three-dimensional environment 350A would change accordingly, such that the representation of the table 306', the representation of the window 309' and the avatar 315 appear larger in the field of view. In some examples, each user may independently interact with the three-dimensional environment 350A/350B, such that changes in viewpoints of the three-dimensional environment 350A and/or interactions with virtual objects in the three-dimensional environment 350A by the first electronic device 360 optionally do not affect what is shown in the three-dimensional environment 350B at the second electronic device 370, and vice versa.

In some examples, the avatars 315/317 are a representation (e.g., a full-body rendering) of the users of the electronic devices 370/360. In some examples, the avatar 315/317 is a representation of a portion (e.g., a rendering of a head, face, head and torso, etc.) of the users of the electronic devices 370/360. In some examples, the avatars 315/317 are a user-personalized, user-selected, and/or user-created representation displayed in the three-dimensional environments 350A/350B that is representative of the users of the electronic devices 370/360. It should be understood that, while the avatars 315/317 illustrated in FIG. 3 correspond to full-body representations of the users of the electronic devices 370/360, respectively, alternative avatars may be provided, such as those described above.

As mentioned above, while the first electronic device 360 and the second electronic device 370 are in the multi-user communication session, the three-dimensional environments 350A/350B may be a shared three-dimensional environment that is presented using the electronic devices 360/370. In some examples, content that is viewed by one user at one electronic device may be shared with another user at another electronic device in the multi-user communication session. In some such examples, the content may be experienced (e.g., viewed and/or interacted with) by both users (e.g., via their respective electronic devices) in the shared three-dimensional environment (e.g., the content is shared content in the three-dimensional environment). For example, as shown in FIG. 3, the three-dimensional environments 350A/350B include a shared virtual object 310 (e.g., which is optionally a three-dimensional virtual sculpture) associated with a respective application (e.g., a content creation application) and that is viewable by and interactive to both users. As shown in FIG. 3, the shared virtual object 310 may be displayed with a grabber affordance (e.g., a handlebar) 335 that is selectable to initiate movement of the shared virtual object 310 within the three-dimensional environments 350A/350B.

In some examples, the three-dimensional environments 350A/350B include unshared content that is private to one user in the multi-user communication session. For example, in FIG. 3, the first electronic device 360 is displaying a private application window 330 (e.g., a private object) in the three-dimensional environment 350A, which is optionally an object that is not shared between the first electronic device 360 and the second electronic device 370 in the multi-user communication session. In some examples, the private application window 330 may be associated with a respective application that is operating on the first electronic device 360 (e.g., such as a media player application, a web browsing application, a messaging application, etc.). Because the private application window 330 is not shared with the second electronic device 370, the second electronic device 370 optionally displays a representation of the private application window 330" in three-dimensional environment 350B. As shown in FIG. 3, in some examples, the representation of the private application window 330" may be a faded, occluded, discolored, and/or translucent representation of the private application window 330 that prevents the user of the second electronic device 370 from viewing contents of the private application window 330.

Additionally, in some examples, the virtual object 310 corresponds to a first type of object and the private application window 330 corresponds to a second type of object, different from the first type of object. In some examples, the object type is determined based on an orientation of the shared object in the shared three-dimensional environment. For example, an object of the first type is an object that has a horizontal orientation in the shared three-dimensional environment relative to the viewpoint of the user of the electronic device. As shown in FIG. 3, the shared virtual object 310, as similarly discussed above, is optionally a virtual sculpture having a volume and/or horizontal orientation in the three-dimensional environment 350A/350B relative to the viewpoints of the users of the first electronic device 360 and the second electronic device 370. Accordingly, as discussed above, the shared virtual object 310 is an object of the first type. On the other hand, an object of the second type is an object that has a vertical orientation in the shared three-dimensional environment relative to the viewpoint of the user of the electronic device. For example, in FIG. 3D, the shared virtual object 310 (e.g., private application window), as similarly discussed above, is a two-dimensional object having a vertical orientation in the three-dimensional environment 350A/350B relative to the viewpoints of the users of the first electronic device 360 and the second electronic device 370. Accordingly, as outlined above, the private application window 330 (and thus the representation of the private application window 330") is an object of the second type. In some examples, as described in more detail later, the object type dictates a spatial template for the users in the shared three-dimensional environment that determines where the avatars 315/317 are positioned spatially relative to the object in the shared three-dimensional environment.

In some examples, the user of the first electronic device 360 and the user of the second electronic device 370 share a same spatial state 340 within the multi-user communication session. In some examples, the spatial state 340 may be a baseline (e.g., a first or default) spatial state within the multi-user communication session. For example, when the user of the first electronic device 360 and the user of the second electronic device 370 initially join the multi-user communication session, the user of the first electronic device 360 and the user of the second electronic device 370 are automatically (and initially, as discussed in more detail below) associated with (e.g., grouped into) the spatial state 340 within the multi-user communication session. In some examples, while the users are in the spatial state 340 as shown in FIG. 3, the user of the first electronic device 360 and the user of the second electronic device 370 have a first spatial arrangement (e.g., first spatial template) within the shared three-dimensional environment, as represented by locations of ovals 315A (e.g., corresponding to the user of the second electronic device 370) and 317A (e.g., corresponding to the user of the first electronic device 360). For example, the user of the first electronic device 360 and the user of the second electronic device 370, including objects that are displayed in the shared three-dimensional environment, have spatial truth within the spatial state 340. In some examples, spatial truth requires a consistent spatial arrangement between users (or representations thereof) and virtual objects. For example, a distance between the viewpoint of the user of the first electronic device 360 and the avatar 315 corresponding to the user of the second electronic device 370 may be the same as a distance between the viewpoint of the user of the second electronic device 370 and the avatar 317 corresponding to the user of the first electronic device 360. As described herein, if the location of the viewpoint of the user of the first electronic device 360 moves, the avatar 317 corresponding to the user of the first electronic device 360 moves in the three-dimensional environment 350B in accordance with the movement of the location of the viewpoint of the user relative to the viewpoint of the user of the second electronic device 370. Additionally, if the user of the first electronic device 360 performs an interaction on the shared virtual object 310 (e.g., moves the virtual object 310 in the three-dimensional environment 350A), the second electronic device 370 alters display of the shared virtual object 310 in the three-dimensional environment 350B in accordance with the interaction (e.g., moves the virtual object 310 in the three-dimensional environment 350B).

It should be understood that, in some examples, more than two electronic devices may be communicatively linked in a multi-user communication session. For example, in a situation in which three electronic devices are communicatively linked in a multi-user communication session, a first electronic device would display two avatars, rather than just one avatar, corresponding to the users of the other two electronic devices. It should therefore be understood that the various processes and exemplary interactions described herein with reference to the first electronic device 360 and the second electronic device 370 in the multi-user communication session optionally apply to situations in which more than two electronic devices are communicatively linked in a multi-user communication session.

In some examples, it may be advantageous to selectively control the display of content and avatars corresponding to the users of electronic devices that are communicatively linked in a multi-user communication session. As mentioned above, content that is displayed and/or shared in the three-dimensional environment while multiple users are in a multi-user communication session may be associated with respective applications that provide data for displaying the content in the three-dimensional environment. In some examples, a communication application may be provided (e.g., locally on each electronic device or remotely via a server (e.g., wireless communications terminal) in communication with each electronic device) for facilitating the multi-user communication session. In some such examples, the communication application receives the data from the respective applications and sets/defines one or more display parameters based on the data that control the display of the content in the three-dimensional environment. Additionally, in some examples, the one or more display parameters control the display of the avatars corresponding to the users of the electronic devices in the three-dimensional environment within the multi-user communication session. For example, data corresponding to a spatial state of each user in the multi-user communication session and/or data indicative of user interactions in the multi-user communication session also sets/defines the one or more display parameters for the multi-user communication session, as discussed herein. Example architecture for the communication application is provided in FIG. 4, as discussed in more detail below.

Figure 4:
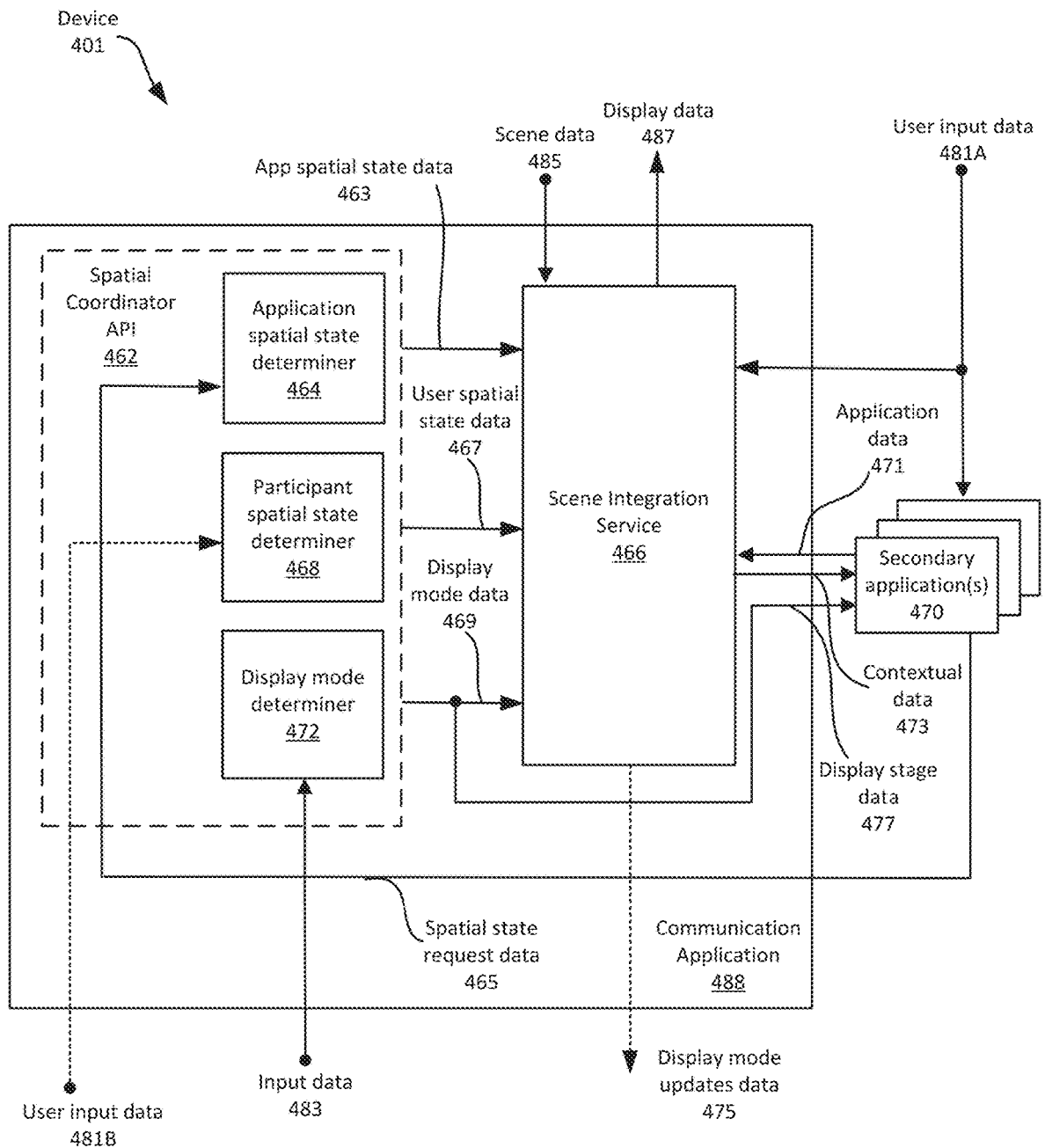
FIG. 4 illustrates a block diagram of an exemplary architecture for a communication application configured to facilitate a multi-user communication session according to some examples of the disclosure.

FIG. 4 illustrates a block diagram of an exemplary architecture for a communication application configured to facilitate a multi-user communication session according to some examples of the disclosure. In some examples, as shown in FIG. 4, the communication application 488 may be configured to operate on electronic device 401 (e.g., corresponding to electronic device 101 in FIG. 1). In some examples, the communication application 488 may be configured to operate at a server (e.g., a wireless communications terminal) in communication with the electronic device 401. In some examples, as discussed below, the communication application 488 may facilitate a multi-user communication session that includes a plurality of electronic devices (e.g., including the electronic device 401), such as the first electronic device 360 and the second electronic device 370 described above with reference to FIG. 3.

In some examples, as shown in FIG. 4, the communication application 488 is configured to communicate with one or more secondary applications 470. In some examples, as discussed in more detail below, the communication application 488 and the one or more secondary applications 470 transmit and exchange data and other high-level information via a spatial coordinator Application Program Interface (API) 462. An API, as used herein, can define one or more parameters that are passed between a calling application and other software code (e.g., an operating system, library routine, function) that provides a service, that provides data, or that performs an operation or a computation. The API can be implemented as one or more calls in program code that send or receive one or more parameters through a parameter list or other structure based on a call convention defined in an API specification document. A parameter can be a constant, a key, a data structure, an object, an object class, a variable, a data type, a pointer, an array, a list, or another call. API calls and parameters can be implemented in any programming language. The programming language can define the vocabulary and calling convention that a programmer will employ to access functions supporting the API. In some examples, an API call can report to an application the capabilities of a device running the application, such as input capability, output capability, processing capability, power capability, communications capability, etc.

In some examples, as shown in FIG. 4, scene integration service 466 is configured to receive application data 471 from the one or more secondary applications 470. For example, as discussed previously with reference to FIG. 3, virtual objects (e.g., including content) may be displayed in a shared three-dimensional environment within a multi-user communication session. In some examples, the virtual objects may be associated with one or more respective applications, such as the one or more secondary applications 470. In some examples, the application data 471 includes information corresponding to an appearance of a virtual object, interactive features of the virtual object (e.g., whether the object can be moved, selected, etc.), positional information of the virtual object (e.g., placement of the virtual object within the shared three-dimensional environment), etc. In some examples, as discussed in more detail below, the application data 471 is utilized by the scene integration service 466 to generate and define one or more display parameters for one or more virtual objects that are associated with the one or more secondary applications 470, wherein the one or more display parameters control the display of the one or more virtual objects in the shared three-dimensional environment. In some examples, as shown in FIG. 4, the application data 471 is received via scene integration service 466.

Additionally, in some examples, as shown in FIG. 4, the scene integration service 466 is configured to utilize scene data 485. In some examples, the scene data 485 includes information corresponding to a physical environment (e.g., a real-world environment), such as the real-world environment discussed above with reference to FIG. 3, that is captured via one or more sensors of the electronic device 401 (e.g., via image sensors 206A/206B in FIG. 2). For example, the scene data 485 includes information corresponding to one or more features of the physical environment, such as an appearance of the physical environment, including locations of objects within the physical environment (e.g., objects that form a part of the physical environment, optionally non-inclusive of virtual objects), a size of the physical environment, behaviors of objects within the computer-generated environment (e.g., background objects, such as background users, pets, vehicles, etc.), etc. In some examples, the scene integration service 466 receives the scene data 485 externally (e.g., from an operating system of the electronic device 401). In some examples, the scene data 485 may be provided to the one or more secondary applications in the form of contextual data 473. For example, the contextual data 473 enables the one or more secondary applications 470 to interpret the physical environment surrounding the virtual objects described above, which is optionally included in the shared three-dimensional environment as passthrough.

In some examples, the communication application 488 and/or the one or more secondary applications 470 are configured to receive user input data 481A (e.g., from an operating system of the electronic device 401). For example, the user input data 481A may correspond to user input detected via one or more input devices in communication with the electronic device 401, such as contact-based input detected via a physical input device (e.g., touch sensitive surfaces 209A/209B in FIG. 2) or hand gesture-based and/or gaze-based input detected via sensor devices (e.g., hand tracking sensors 202A/202B, orientation sensors 210A/210B, and/or eye tracking sensors 212A/212B). In some examples, the user input data 481A includes information corresponding to input that is directed to one or more virtual objects that are displayed in the shared three-dimensional environment and that are associated with the one or more secondary applications 470. For example, the user input data 481A includes information corresponding to input to directly interact with a virtual object, such as moving the virtual object in the shared three-dimensional environment, or information corresponding to input for causing display of a virtual object (e.g., launching the one or more secondary applications 470). In some examples, the user input data 481A includes information corresponding to input that is directed to the shared three-dimensional environment that is displayed at the electronic device 401. For example, the user input data 481A includes information corresponding to input for moving (e.g., rotating and/or shifting) a viewpoint of a user of the electronic device 401 in the shared three-dimensional environment.

In some examples, as mentioned above, the spatial coordinator API 462 is configured to define one or more display parameters according to which the shared three-dimensional environment (e.g., including virtual objects and avatars) is displayed at the electronic device 401. In some examples, as shown in FIG. 4, the spatial coordinator API 462 includes an application spatial state determiner 464 (e.g., optionally a sub-API and/or a first function, such as a spatial template preference API/function) that provides (e.g., defines) a spatial state parameter for the one or more secondary applications 470. In some examples, the spatial state parameter for the one or more secondary applications is provided via application spatial state data 463, as discussed in more detail below. In some examples, the spatial state parameter for the one or more secondary applications 470 defines a spatial template for the one or more secondary applications 470. For example, the spatial state parameter for a respective application defines a spatial arrangement of one or more participants in the multi-user communication session relative to a virtual object (e.g., such as virtual object 310 or private application window 330 in FIG. 3) that is displayed in the shared three-dimensional environment, as discussed in more detail below with reference to FIGS. 5A-5F. In some examples, as shown in FIG. 4, the application spatial state determiner 464 defines the spatial state parameter for the one or more secondary applications 470 based on spatial state request data 465 received from the one or more secondary applications 470. In some examples, the spatial state request data 465 includes information corresponding to a request to display a virtual object associated with the one or more secondary applications 470 in a particular spatial state (e.g., spatial arrangement) in the shared three-dimensional environment within the multi-user communication session. In some examples, the spatial state request data 465 includes information indicating a default (e.g., a baseline) spatial template according to which content (e.g., including one or more virtual objects) associated with the one or more secondary applications 470 and one or more avatars corresponding to one or more users in a multi-user communication session are arranged. For example, as discussed below with reference to FIGS. 5A-5F, the content that is shared in the three-dimensional environment as "primary" content (e.g., media-based content, such as video, music, podcast, and/or image-based content that is presented for users' viewing/consumption) may default to being displayed in a side-by-side spatial template, and other types of content (e.g., private windows or two-dimensional representations of users) may default to being displayed in a circular (e.g., conversational) spatial template. Additionally, in some examples, defining a spatial template for the one or more secondary applications 470 includes establishing a spatial separation between one or more virtual objects associated with the one or more secondary applications 470 and one or more participants in the multi-user communication session. For example, the application spatial state determiner 464 is configured to define a distance between adjacent avatars corresponding to users in the multi-user communication session and/or a distance between one or more avatars and a virtual object (e.g., an application window) within a respective spatial template (e.g., where such distances may the different values or the same value), as described in more detail below with reference to FIGS. 5A-5F. In some examples, the separation spacing is determined automatically (e.g., set as a predefined value) by the communication application 488 (e.g., via the application spatial state determiner 464). Alternatively, in some examples, the separation spacing is determined based on information provided by the one or more secondary applications 470. For example, the spatial state request data 465 provided to the application spatial state determiner 464 includes information indicating a specified or requested value for the spatial separation discussed above.

In some examples, as discussed below with reference to FIGS. 5A-5F, the determined spatial state parameter for the one or more secondary applications 470 may or may not correspond to the spatial state requested by the one or more secondary applications 470. In some examples, as described with more detail with reference to FIGS. 5A-5F, changes to the spatial state parameter for the one or more secondary applications 470 may cause a change in the spatial template within the multi-user communication session. For example, the application spatial state determiner 464 may change the spatial state parameter for the one or more secondary applications 470 in response to a change in display state of a virtual object that is associated with the one or more secondary applications 470 (e.g., transmitted from the one or more secondary applications 470 via the spatial state request data 465). In some examples, the spatial state parameter for the one or more secondary applications 470 may also denote whether a particular application of the one or more secondary applications 470 supports (e.g., is compatible with the rules of) spatial truth. For example, if an application is an audio-based application (e.g., a phone calling application), the application spatial state determiner 464 optionally does not define a spatial template for a virtual object associated with the application.

In some examples, as shown in FIG. 4, the spatial coordinator API 462 includes a participant spatial state determiner 468 (e.g., optionally a sub-API and/or a second function, such as a participant spatial state API/function) that provides (e.g., defines) a spatial state parameter for a user of the electronic device 401. In some examples, the spatial state parameter for the user is provided via user spatial state data 467, as discussed in more detail below. In some examples, the spatial state parameter for the user defines enablement of spatial truth within the multi-user communication session. For example, the spatial state parameter for the user of the electronic device 401 defines whether an avatar corresponding to the user of the electronic device maintains spatial truth with an avatar corresponding to a second user of a second electronic device (e.g., and/or virtual objects) within the multi-user communication session, as similarly described above with reference to FIG. 3. In some examples, spatial truth is enabled for the multi-user communication session if a number of participants (e.g., users) within the multi-user communication session is below a threshold number of participants (e.g., less than four, five, six, eight, or ten participants). In some examples, spatial truth is therefore not enabled for the multi-user communication session of the number of participants within the multi-user communication session is or reaches a number that is greater than the threshold number. In some examples, as discussed in more detail below with reference to FIGS. 5A-5F, if the spatial parameter for the user defines spatial truth as being enabled, the electronic device 401 displays avatars corresponding to the users within the multi-user communication session in the shared three-dimensional environment. In some examples, if the spatial parameter for the user defines spatial truth as being disabled, the electronic device 401 forgoes displaying avatars corresponding to the users (e.g., an instead displays two-dimensional representations) in the shared three-dimensional environment, as discussed below with reference to FIGS. 5A-5F. In some examples, as shown in FIG. 4, the participant spatial state determiner 468 defines the spatial state parameter for the user optionally based on user input data 481B. In some examples, the user input data 481B may include information corresponding to user input that explicitly disables or enables spatial truth within the multi-user communication session. For example, as described in more detail below with reference to FIGS. 5A-5F, the user input data 481B includes information corresponding to user input for activating an audio-only mode (e.g., which disables spatial truth).

In some examples, as shown in FIG. 4, the spatial coordinator API 462 includes a display mode determiner 472 (e.g., optionally a sub-API and/or a third function, such as a supports stage spatial truth API/function) that provides (e.g., defines) a display mode parameter. In some examples, the display mode parameter is provided via display mode data 469, as discussed in more detail below. In some examples, the display mode parameter controls whether a particular experience in the multi-user communication session is exclusive or non-exclusive (e.g., windowed). For example, the display mode parameter defines whether users who are viewing/experiencing content in the shared three-dimensional environment within the multi-user communication session share a same spatial state (e.g., an exclusive state or a non-exclusive state) while viewing/experiencing the content, as similarly described above with reference to FIG. 3. In some examples, as similarly described above with reference to FIG. 3, spatial truth is enabled for participants in the multi-user communication session who share a same spatial state. In some examples, as shown in FIG. 4, the display mode determiner 472 may define the display mode parameter based on input data 483. In some examples, the input data 483 includes information corresponding to user input corresponding to a request to change a display mode of a virtual object that is displayed in the shared three-dimensional environment. For example, as described below with reference to FIGS. 6A-6I, the input data 483 may include information indicating that the user has provided input for causing the virtual object to be displayed in an exclusive state in the multi-user communication session, which causes the display mode determiner 472 to define the display mode parameter as being exclusive. As described in more detail with reference to FIGS. 6A-6I, in some examples, the one or more secondary applications 470 can provide an indication of a change in a level of exclusivity, which optionally disables spatial truth until all users in the multi-user communication session are within a same spatial state once again.

In some examples, as shown in FIG. 4, the spatial coordinator API 462 transmits (e.g., via the display mode determiner 472) display stage data 477 to the one or more secondary applications 470. In some examples, the display stage data 477 includes information corresponding to whether a stage or setting is applied to the spatial template/arrangement (e.g., described above) according to which a virtual object associated with the one or more secondary applications 470 (e.g., and avatars) is displayed in the shared three-dimensional environment in the multi-user communication session. For example, applying the stage or setting to the spatial template/arrangement of the virtual object denotes whether participants viewing/experiencing the virtual object maintain spatial truth (and thus whether avatars corresponding to the participants are displayed), as similarly described above. In some examples, the stage is aligned to the determined spatial template/arrangement for the virtual object, as described in more detail below with reference to FIGS. 6A-6I. For example, the spatial template/arrangement defined by the participant spatial state determiner 468 may denote particular locations within the stage at which the avatars are displayed. In some examples, as described herein, the stage may provide for In some examples, a given virtual object that is associated with the one or more secondary applications 470 may be displayed in either an experience-centric display mode (e.g., such as displaying content at a predefined location within the stage), which denotes a non-exclusive stage or setting, and an exclusive display mode (e.g., such as displaying the content at a location that is offset from the predefined location), both of which denote an exclusive stage or setting, as described in more detail below with reference to FIGS. 6A-6I.

Additionally, in some examples, the display stage data 477 includes information corresponding to a stage offset value for a given virtual object that is associated with the one or more secondary applications 470. For example, as described with more detail below with reference to FIGS. 6A-6I, a location at which the virtual object is displayed in the shared three-dimensional environment may be different from a predetermined placement location within the stage of the virtual object (e.g., based on the stage offset value). In some examples, the one or more secondary applications 470 utilizes the display stage data 477 as context for the generation of the application data 471 and/or the spatial state request data 465 discussed above. Particularly, as discussed by way of example in FIGS. 6A-6I, transmitting the display stage data 477 to the one or more secondary applications 470 provides the one or more secondary applications 470 with information regarding whether one or more users in the multi-user communication session are viewing content in an exclusive display mode (e.g., which determines where and/or how content is displayed in the three-dimensional environment relative to a particular spatial template/arrangement) and/or whether spatial truth is enabled in the multi-user communication session (e.g., whether avatars are displayed).

In some examples, as shown in FIG. 4, the spatial coordinator API 462 transmits (e.g., optionally via the scene integration service 466 or directly via the display mode determiner 472) display mode updates data 475 to one or more secondary electronic devices (e.g., to a communication application 488 running locally on the one or more secondary electronic devices). In some examples, as described in more detail with reference to FIGS. 6A-6I, electronic devices that are communicatively linked in a multi-user communication session may implement an "auto-follow" behavior to maintain the users in the multi-user communication session within the same spatial state (and thus to maintain spatial truth within the multi-user communication session). In some such examples, the display mode updates data 475 may function as a command or other instruction that causes the one or more secondary electronic devices to auto-follow the electronic device 401 if the electronic device 401 enters an exclusive display mode in the multi-user communication session (e.g., in accordance with the display mode parameter discussed above).

In some examples, as shown in FIG. 4, the application spatial state data 463, the user spatial state data 467, and the display mode data 469 may be received by the scene integration service 466 of the spatial coordinator API 462. In some examples, the scene integration service 466 generates display data 487 in accordance with the one or more display parameters discussed above included in the application spatial state data 463, the user spatial state data 467, and/or the display mode data 469. In some examples, the display data 487 that is generated by the scene integration service 466 includes commands/instructions for displaying one or more virtual objects and/or avatars in the shared three-dimensional environment within the multi-user communication session. For example, the display data 487 includes information regarding an appearance of virtual objects displayed in the shared three-dimensional environment (e.g., generated based on the application data 471), locations at which virtual objects are displayed in the shared three-dimensional environment, locations at which avatars (or two-dimensional representations of users) are displayed in the shared three-dimensional environment, and/or other features/characteristics of the shared three-dimensional environment. In some examples, the display data 487 is transmitted from the communication application 488 to the operating system of the electronic device 401 for display at a display in communication with the electronic device 401, as similarly shown in FIG. 3.

Communication application 488 is not limited to the components and configuration of FIG. 4, but can include fewer, other, or additional components in multiple configurations. Additionally, the processes described above are exemplary and it should therefore be understood that more, fewer, or different operations can be performed using the above components and/or using fewer, other, or additional components in multiple configurations. Attention is now directed to exemplary interactions illustrating the above-described operations of the communication application 488 within a multi-user communication session.

FIGS. 5A-5F illustrate example interactions within a multi-user communication session according to some examples of the disclosure. In some examples, while a first electronic device 560 is in the multi-user communication session with a second electronic device 570 (and a third electronic device (not shown for ease of illustration)), three-dimensional environment 550A is presented using the first electronic device 560 and three-dimensional environment 550B is presented using the second electronic device 570. In some examples, the electronic devices 560/570 optionally correspond to electronic devices 360/370 discussed above. In some examples, the three-dimensional environments 550A/550B include captured portions of the physical environment in which the electronic devices 560/570 are located. For example, the three-dimensional environment 550A includes a table (e.g., a representation of table 506') and a window (e.g., representation of window 509'), and the three-dimensional environment 550B includes a coffee table (e.g., representation of coffee table 508') and a floor lamp (e.g., representation of floor lamp 507'). In some examples, the three-dimensional environments 550A/550B optionally correspond to the three-dimensional environments 350A/350B described above with reference to FIG. 3. As described above, the three-dimensional environments also include avatars 517/515/519 corresponding to the users of the first electronic device 360, the second electronic device 370, and the third electronic device, respectively. In some examples, the avatars 515/517 optionally corresponds to avatars 315/317 described above with reference to FIG. 3.

Figure 5A:
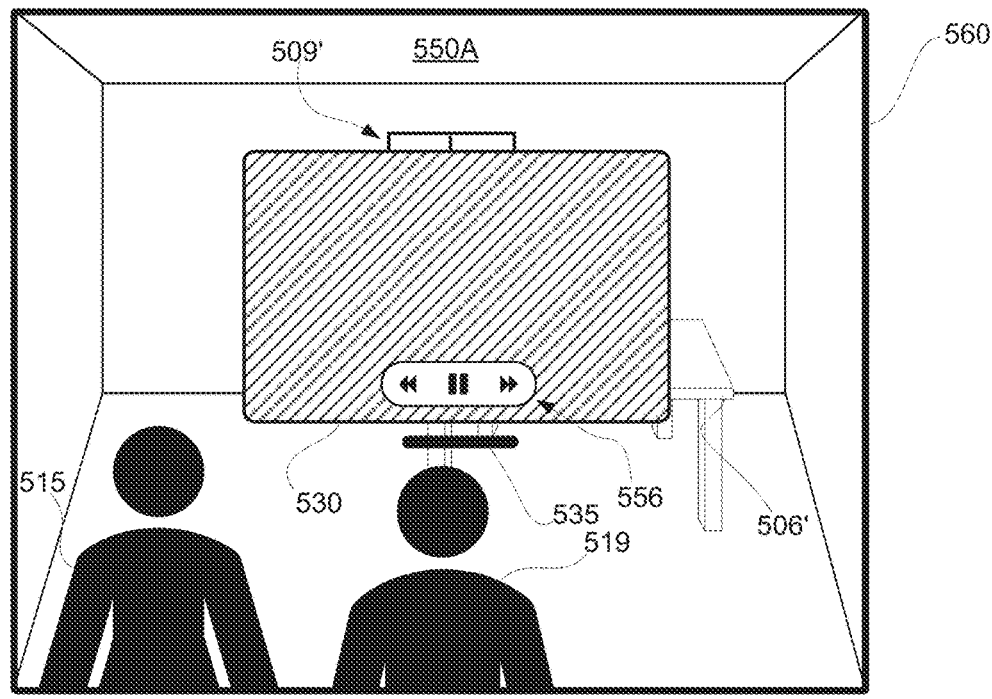
FIGS. 5A-5F illustrate example interactions within a multi-user communication session according to some examples of the disclosure.
Figure 5A:
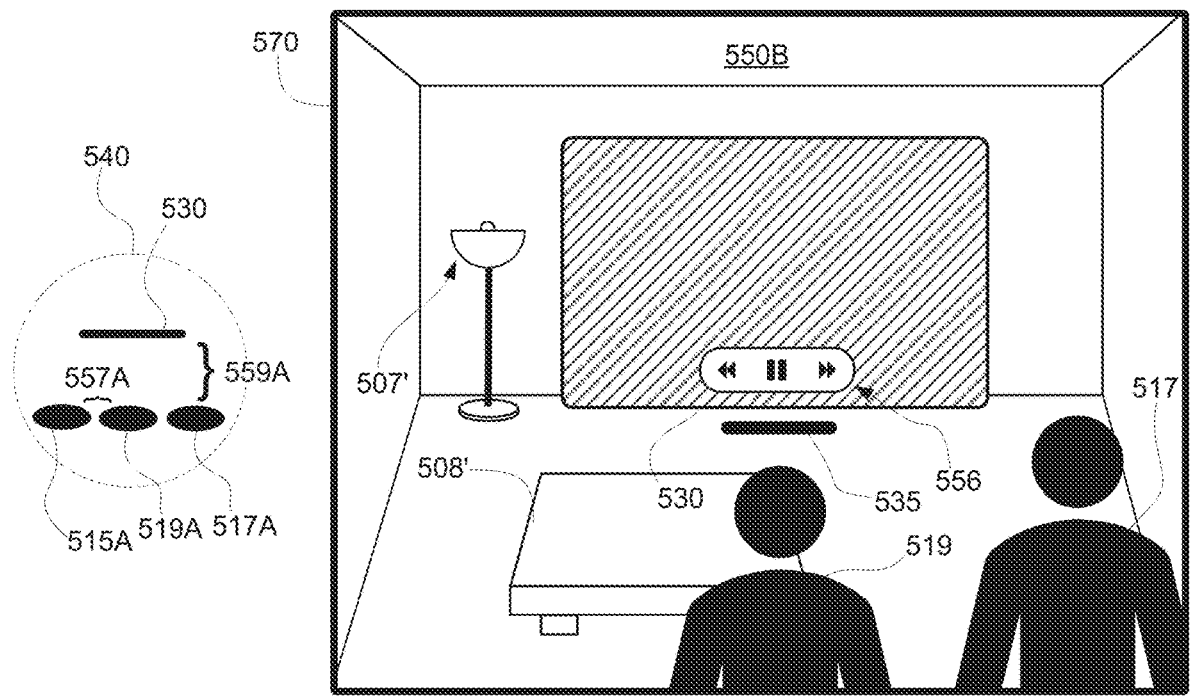

As similarly described above with reference to FIG. 3, the user of the first electronic device 560, the user of the second electronic device 570, and the user of the third electronic device may share a spatial state 540 (e.g., a baseline spatial state) within the multi-user communication session (e.g., represented by the placement of ovals 515A, 517A, and 519A within circle representing spatial state 540 in FIG. 5A). In some examples, the spatial state 540 optionally corresponds to spatial state 340 discussed above with reference to FIG. 3. As similarly described above, while the user of the first electronic device 560, the user of the second electronic device 570, and the user of the third electronic device are in the spatial state 540 within the multi-user communication session, the users have a first (e.g., predefined) spatial arrangement in the shared three-dimensional environment (e.g., represented by the locations of and/or distance between the ovals 515A, 517A, and 519A in the circle representing spatial state 540 in FIG. 5A), such that the first electronic device 560, the second electronic device 570, and the third electronic device maintain consistent spatial relationships (e.g., spatial truth) between locations of the viewpoints of the users (e.g., which correspond to the locations of the ovals 517A/515A/519A in the circle representing spatial state 540) and shared virtual content at each electronic device.

As shown in FIG. 5A, the first electronic device 560 is optionally displaying an application window 530 associated with a respective application running on the first electronic device 560 (e.g., an application configurable to display content in the three-dimensional environment 550A, such as a video player application). For example, as shown in FIG. 5A, the application window 530 is optionally displaying video content (e.g., corresponding to a movie, television episode, or other video clip) that is visible to the user of the first electronic device 560. In some examples, the application window 530 is displayed with a grabber bar affordance 535 (e.g., a handlebar) that is selectable to initiate movement of the application window 530 within the three-dimensional environment 550A. Additionally, as shown in FIG. 5A, the application window may include playback controls 556 that are selectable to control playback of the video content displayed in the application window 530 (e.g., rewind the video content, pause the video content, fast-forward through the video content, etc.).

In some examples, the application window 530 may be a shared virtual object in the shared three-dimensional environment. For example, as shown in FIG. 5A, the application window 530 may also be displayed in the three-dimensional environment 550B at the second electronic device 570. As shown in FIG. 5A, the application window 530 may be displayed with the grabber bar affordance 535 and the playback controls 556 discussed above. In some examples, because the application window 530 is a shared virtual object, the application window 530 (and the video content of the application window 530) may also be visible to the user of the third electronic device (not shown). As previously discussed above, in FIG. 5A, the user of the first electronic device 560, the user of the second electronic device 570, and the user of the third electronic device (not shown) may share the spatial state 540 (e.g., a baseline spatial state) within the multi-user communication session. Accordingly, as shown in FIG. 5A, while sharing the first spatial state 540, the users (e.g., represented by ovals 515A, 519A, and 517A) maintain spatial truth with the application window 530, represented by a line in the circle representing spatial state 540, within the shared three-dimensional environment.

As discussed previously above with reference to FIG. 3, objects that are displayed in the shared three-dimensional environment may have an orientation that defines the object type. For example, an object may be a vertically oriented object (e.g., a first type of object) or a horizontally oriented object (e.g., a second type of object). As shown in FIG. 5A, the application window 530 is optionally a vertically oriented object in the three-dimensional environment 550A/550B (e.g., relative to the viewpoints of the user of the first electronic device 560, the user of the second electronic device 570, and the user of the third electronic device). As discussed above with reference to FIG. 4, the application window 530 is displayed in the three-dimensional environment 550A/550B with a spatial state (e.g., a default spatial state) that is based on the object type (e.g., the object orientation) of the application window 530 (e.g., determined by application spatial state determiner 464). Alternatively, as discussed above, in some examples, the application window 530 is displayed in the three-dimensional environment 550A/550B with a spatial state that corresponds to a selected (e.g., specified) spatial state (e.g., one that is not necessarily based on the object type but that is flagged as a preferred spatial state by the application with which the application window 530 is associated). As shown in FIG. 5A, in some examples, because the application window 530 is a vertically oriented object in the three-dimensional environment 550A/550B, the avatars are arranged in a first spatial arrangement/template relative to the application window 530. For example, as shown, the avatars are arranged in a side-by-side spatial arrangement/template, as reflected in the first spatial state 540, such that, at the first electronic device 560, the avatar 515 and the avatar 519 are located next to/beside a viewpoint (e.g., to the left) of the user of the first electronic device 560, and at the second electronic device 570, the avatar 519 and the avatar 517 are located next to/beside a viewpoint (e.g., to the right) of the user of the second electronic device 570.

Additionally, in some examples, as shown in FIG. 5A, while the avatars are arranged in the first spatial template discussed above, adjacent avatars may be separated by a first distance 557A (e.g., measured from a center of one avatar to a center of an adjacent avatar or corresponding to a gap between adjacent avatars). For example, as shown in FIG. 5A, the avatar 515, represented by the oval 515A is separated from the avatar 519, represented by the oval 519A, by a first spatial separation corresponding to the first distance 557A. Additionally, in some examples, as shown in FIG. 5A, the avatars may be separated from the application window 530 by a second distance 559A (e.g., measured from each avatar to a center of the application window 530). In some examples, the first distance 557A is different from (e.g., smaller than) the second distance 559A. As described above with reference to FIG. 4, the separation spacing (e.g., the values of the first distance 557A and/or the second distance 559A) in the first spatial template is determined automatically by the first electronic device 560 and the second electronic device 570 (together or determined individually (e.g., selected automatically by communication application 488 in FIG. 4 that is running on the electronic devices)). Alternatively, as described above with reference to FIG. 4, the separation spacing in the first spatial template is selected by the application with which the application window 530 is associated (e.g., via spatial state request data 465 in FIG. 4).

Figure 5B:
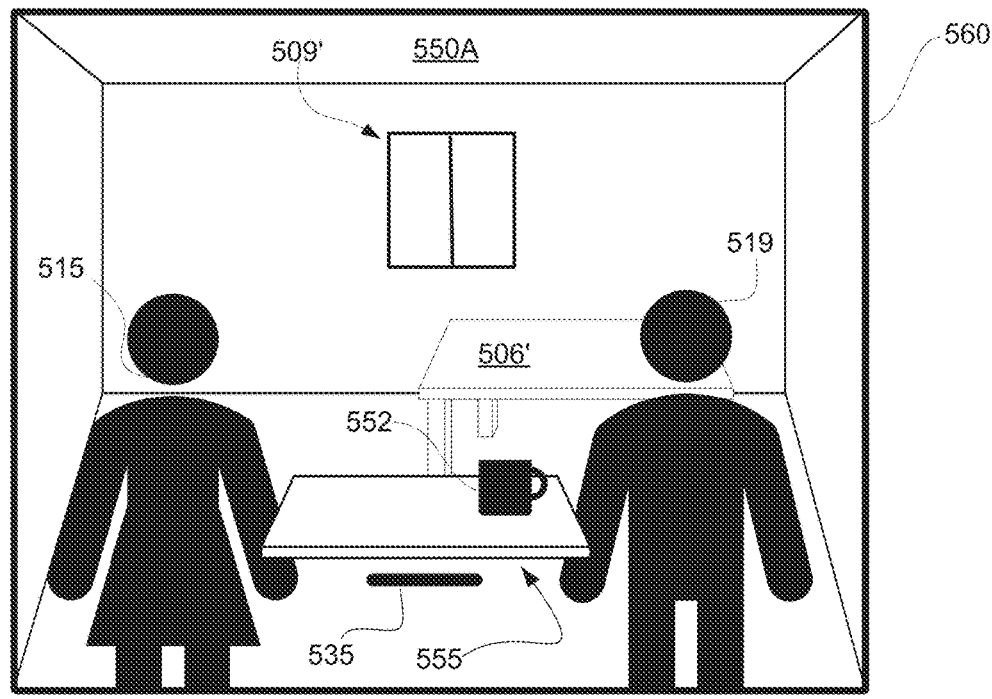
Figure 5B:
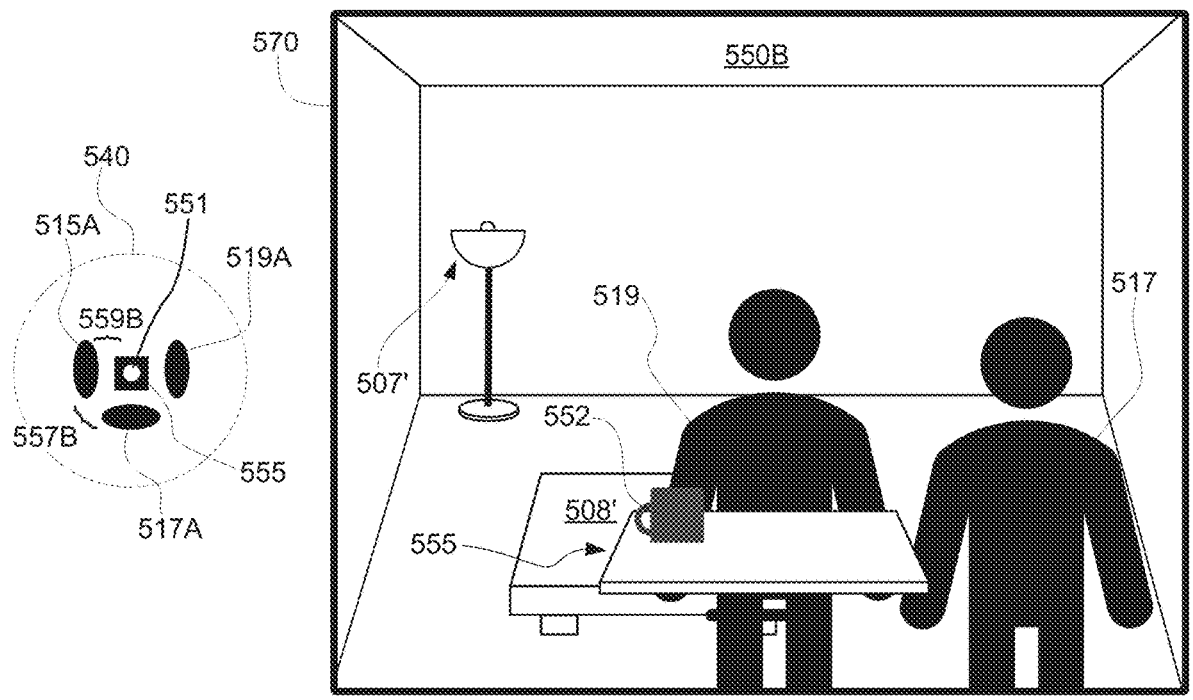

Accordingly, if a shared object that is horizontally oriented is displayed in the three-dimensional environment 550A/550B, the avatars may be arranged in a second spatial arrangement/template, different from the first spatial arrangement/template discussed above, relative to the object. For example, as shown in FIG. 5B, a shared virtual tray 555 having a horizontal orientation may be displayed in the shared three-dimensional environment. In some examples, as shown in FIG. 5B, the virtual tray 555 may be displayed with a virtual mug 552 (e.g., disposed atop the virtual tray 555) and a grabber bar affordance 535 that is selectable to initiate movement of the virtual tray 555 in the three-dimensional environment 550A/550B. In some examples, as shown in FIG. 5B, when an object of the second type (e.g., a horizontally oriented object) is displayed in the shared three-dimensional environment, the avatars are displayed in a second spatial arrangement/template relative to the object. For example, as shown in FIG. 5B, because the virtual tray 555 is a horizontally oriented object (e.g., and optionally a volumetric object), the avatars are arranged in a circular arrangement relative to the virtual tray 555, as indicated in the spatial state 540, such that, at the first electronic device 560, the avatar 515 is located to the left of the virtual tray 555 and the avatar 519 is located to the right of the virtual tray 555 from the viewpoint of the user of the first electronic device 560, and at the second electronic device 570, the avatar 519 is located behind the virtual tray 555 and the avatar 517 is located to the right of the virtual tray 555 from the viewpoint of the user of the second electronic device 570. Additionally, in some examples, as shown in FIG. 5B, while the avatars are arranged in the second spatial template, adjacent avatars may be separated by a third distance 557B. For example, as shown in FIG. 5B, the avatar 515, represented by the oval 515A is separated from the avatar 517, represented by the oval 517A, by a second spatial separation corresponding to the third distance 557B. Additionally, in some examples, as shown in FIG. 5B, the avatars may be separated from the virtual tray 555 by a fourth distance 559B. In some examples, the third distance 557B is different from (e.g., smaller than) or is equal to the fourth distance 559B. Further, in some examples, the spatial separation provided in the first spatial template discussed above with reference to FIG. 5A may be different from the spatial separation provided in the second spatial template shown in FIG. 5B (e.g., due to differences in object type and/or differences in applications).

Figure 5C:
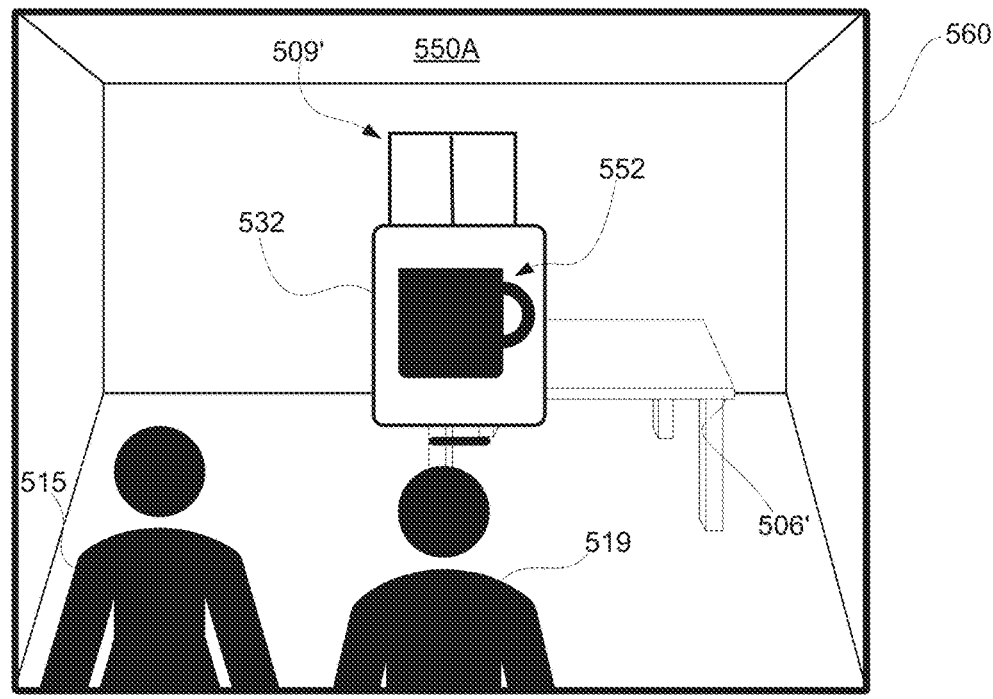
Figure 5C:
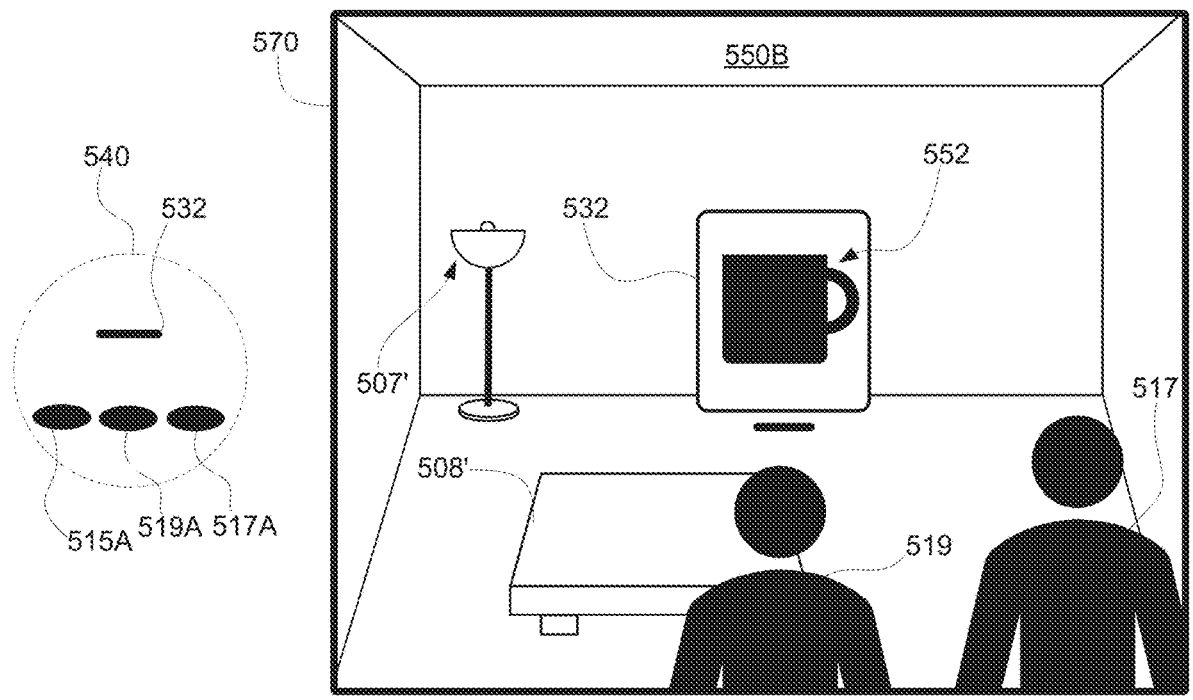

In some examples, referring back to FIG. 4, the spatial coordinator API 462 determines the spatial template/arrangement for virtual objects in the shared three-dimensional environment based on spatial state request data 465 received from the one or more secondary applications 470. In some examples, the spatial state request data 465 includes information corresponding to a requested spatial template/arrangement, as well as optionally changes in application state of the one or more secondary applications 470. For examples, as mentioned above and as shown in FIG. 5B, the virtual tray 555 may include the virtual mug 552 that is situated atop the virtual tray 555. In some examples, a respective application with which the virtual tray 555 is associated may change state (e.g., automatically or in response to user input), such that, as shown in FIG. 5C, the display of the virtual tray 555 changes in the three-dimensional environment 550A/550B. For example, as shown in FIG. 5C, the first electronic device 560 and the second electronic device 570 transition from displaying the virtual mug 552 atop the virtual tray 555 to displaying a representation (e.g., an enlarged two-dimensional representation) of the virtual mug 552 in window 532 in the three-dimensional environment 550A/550B. In some examples, as shown in FIG. 5C, when the display state of the respective application changes, the spatial arrangement of the avatars relative to the virtual objects optionally changes as well. For example, in FIG. 5C, the display of the virtual mug 552 within the window 532 results in a change of object type (e.g., from horizontally oriented to vertically oriented) in the three-dimensional environment 550A/550B, which causes the spatial arrangement/template to change as well, such that the avatars 515/519/517 in the spatial state 540 in FIG. 5B transition from being in the circular spatial arrangement to being in the side-by-side spatial arrangement as shown in FIG. 5C.

Figure 5D:
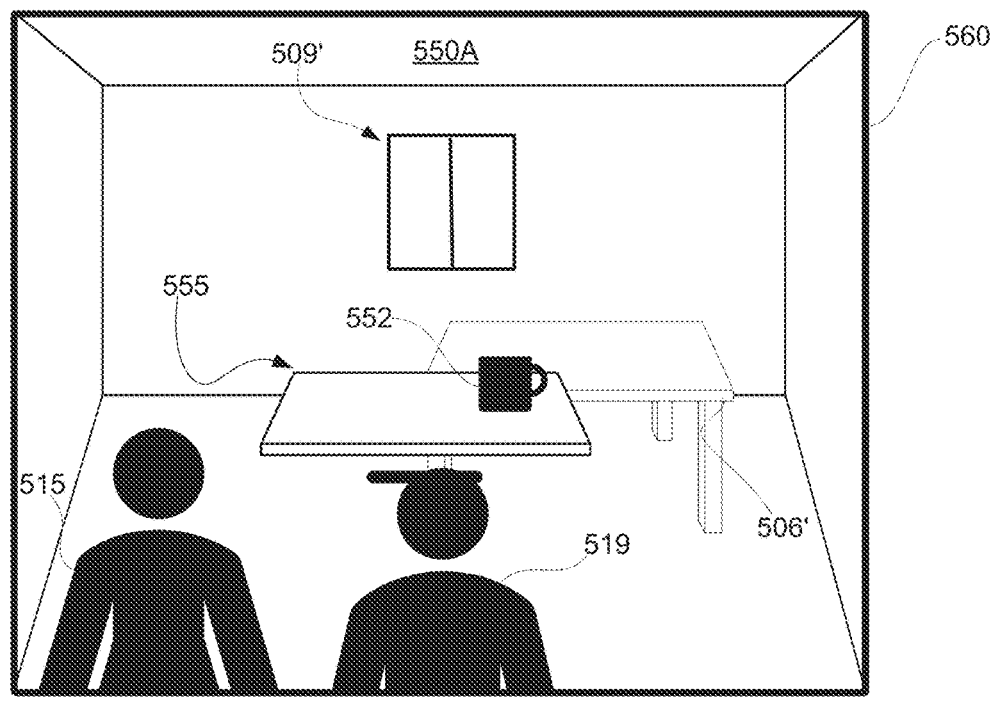
Figure 5D:
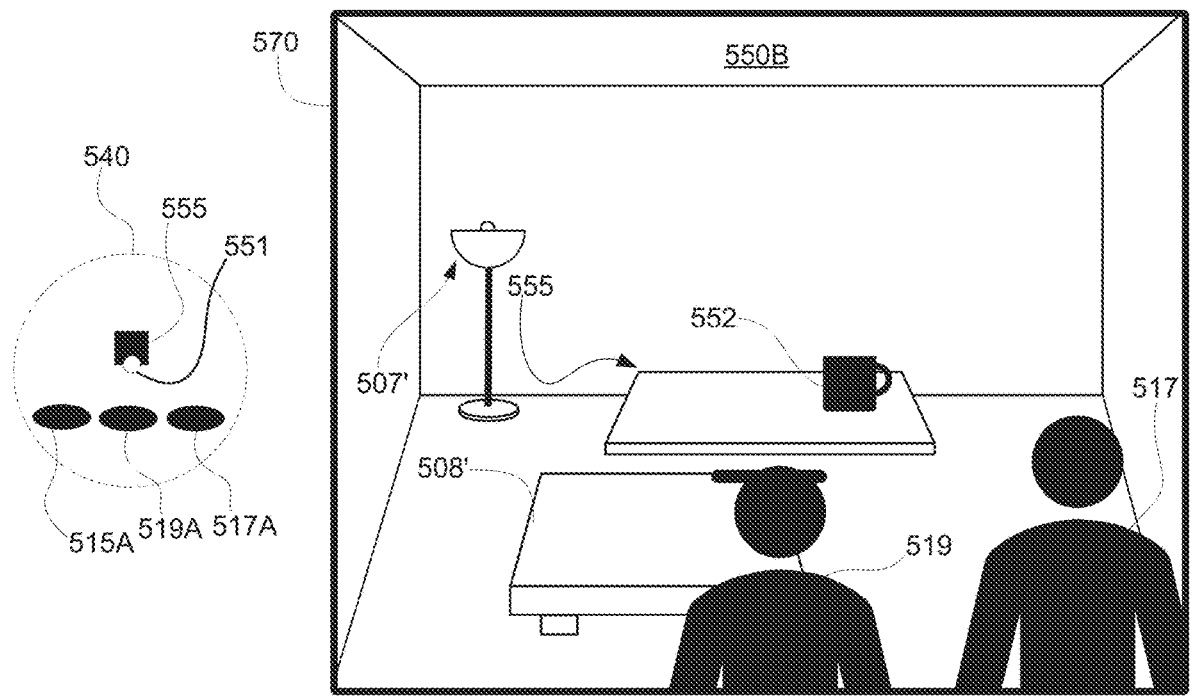

In some examples, the spatial arrangement of the avatars 515/519/517 may not necessarily be based on the object type of virtual objects displayed in the shared three-dimensional environment. For example, as discussed above, when a vertically oriented object, such as the application window 530, is displayed in the three-dimensional environment 550A/550B, the avatars 515/519/517 may be displayed in the side-by-side spatial arrangement, and when a horizontally oriented object, such as the virtual tray 555, is displayed, the avatars 515/519/517 may be displayed in the circular spatial arrangement. However, in some instances, a respective application may request (e.g., via spatial state request data 465 in FIG. 4), that the spatial arrangement for an object be different from the norms discussed above. For example, as shown in FIG. 5D, in some examples, though a horizontally oriented object (e.g., the virtual tray 555) is displayed in the three-dimensional environment 550A/550B, the avatars 515/519/517 are arranged in the side-by-side spatial arrangement/template relative to the horizontally oriented object. Accordingly, as discussed above, the application spatial state determiner 464 of FIG. 4 may define a spatial state parameter for a virtual object that controls the spatial template/arrangement of the avatars (e.g., avatars 515/519/517) relative to the virtual object based on the requested spatial template/arrangement (provided via the spatial state request data 465).

In some examples, when arranging the avatars 515/519/517 in the side-by-side spatial arrangement shown in FIG. 5D (e.g., or other spatial arrangements, such as the circular spatial arrangement in FIG. 5B) relative to the virtual tray 555 (e.g., a horizontally oriented object), a center point of the virtual tray 555 (e.g., or other horizontally oriented object) may be positioned at (e.g., aligned to) a center location in the spatial state 540. For example, as indicated in the spatial state 540 in FIG. 5D, a center location in the spatial state 540 is indicated by circle 551. However, in some examples, as shown in FIG. 5D, the virtual tray 555 may be positioned relative to the center location, represented by the circle 551, at a front-facing surface or side of the virtual tray 555, rather than at a center of the virtual tray 555. For example, as shown previously in FIG. 5B, when the virtual tray 555 is displayed in the shared three-dimensional environment while the avatars 515/519/517 are arranged in the circular spatial arrangement, the virtual tray 555 is aligned/anchored to the center location, represented by the circle 551, at the center of the virtual tray 555 (e.g., a center point in a horizontal body of the virtual tray 555). As shown in FIG. 5D, in some examples, when the virtual tray 555 is presented in the shared three-dimensional environment while the avatars 515/519/517 are arranged in the side-by-side spatial arrangement as discussed above, the virtual tray 555 (e.g., or other horizontally oriented object) is aligned to the center location, represented by the circle 551, at a front-facing side of the virtual tray 555, as shown in the spatial state 540 in FIG. 5D, such that the front-facing surface of the virtual tray 555 lies centrally ahead of the viewpoint of the user of the third electronic device (not shown), corresponding to the avatar 519. For example, one advantage of anchoring the virtual tray 555 (e.g., or other horizontally oriented objects) to the center location of the spatial state 540 at the front-facing side of the virtual tray 555 is to avoid presenting the virtual tray 555 in a manner that causes a front-facing side of the virtual tray 555 to intersect with the viewpoint of the users and/or the avatars 515/519/517 (e.g., when the size of the virtual tray 555 is large enough to traverse the distance between the center of the template and the position of the avatars). Instead, as discussed above, the front-facing side of the virtual tray 555 is positioned at the center location, represented by the circle 551, such that the virtual tray 555 visually appears to extend backwards in space in the shared three-dimensional environment (e.g., rather than visually appearing to extend forwards in space toward the viewpoints of the users). It should be noted that, in some examples, anchoring the virtual tray 555 (or, more generally, horizontally oriented objects) to the center location in the spatial state 540 at the front-facing side of the virtual tray 555 is optionally applied only to the side-by-side spatial arrangement of the avatars 515/519/517 (e.g., and not for circular spatial arrangement discussed above and illustrated in FIG. 5B).

In some examples, though the side-by-side spatial arrangement is allowed for vertically oriented objects and horizontally oriented objects in the three-dimensional environment 550A/550B within the multi-user communication session, the same may not be necessarily true for the circular spatial arrangement. For example, the communication application (e.g., 488 in FIG. 4) facilitating the multi-user communication session may restrict/prevent utilization of the circular spatial arrangement for vertically oriented objects, such as the application window 530. Specifically, the circular spatial arrangement of the avatars 515/517/519 may be prevented when displaying vertically oriented objects because vertically oriented objects are optionally two-dimensional objects (e.g., flat objects) in which content is displayed on a front-facing surface of the vertically oriented objects. Enabling the circular spatial arrangement in such an instance may cause a viewpoint of one or more users in the multi-user communication session to be positioned in such a way (e.g., behind the vertically oriented object) that the content displayed in the front-facing surface of the vertically oriented object is obstructed or completely out of view, which would diminish user experience. In some such examples, with reference to FIG. 4, if display of a vertically oriented object is initiated (e.g., via the application data 471) and the one or more secondary applications 470 transmit a request to display the vertically oriented object with a circular spatial arrangement (e.g., via the spatial state request data 465), the spatial coordinator API 462 overrides the request for displaying the vertically oriented object with the circular spatial arrangement (e.g., via the application spatial state determiner 464) and causes the vertically oriented object to be displayed with the side-by-side spatial arrangement discussed above.

Figure 5E:
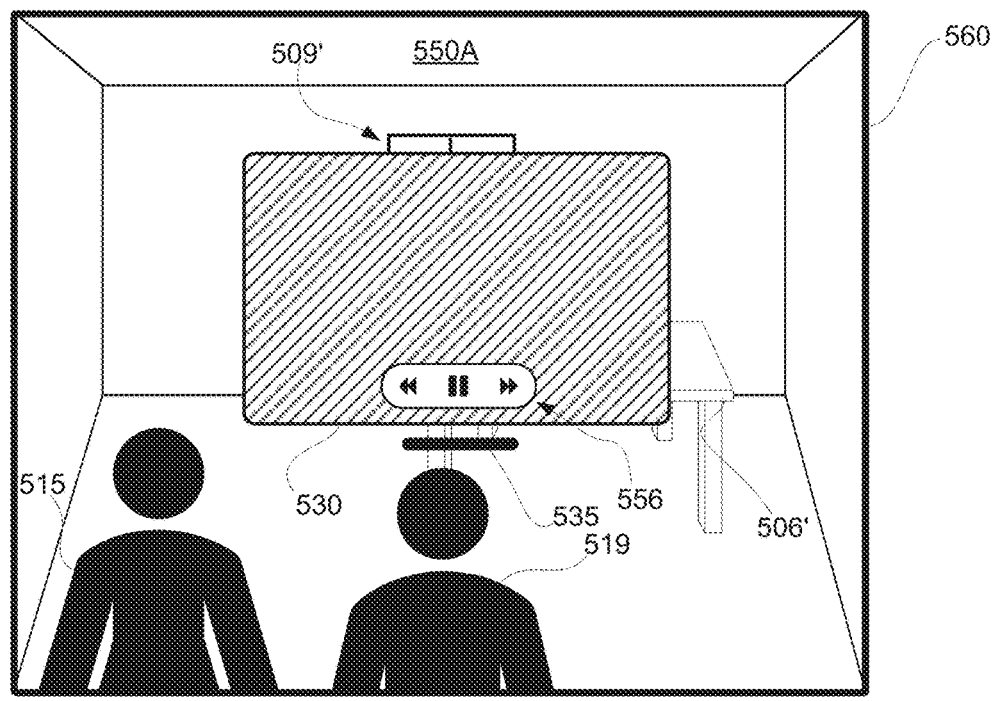
Figure 5E:
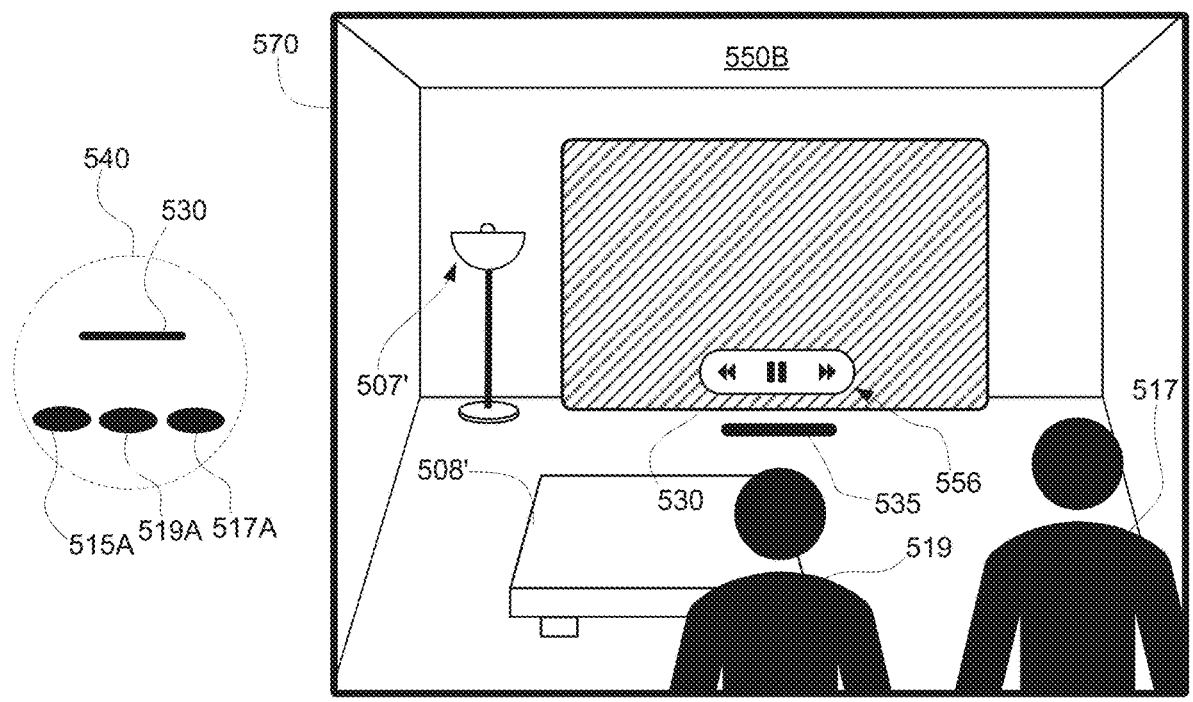

As previously described herein and as shown in FIGS. 5A-5E, in some examples, while users within the multi-user communication session are experiencing spatial truth (e.g., because spatial truth is enabled), the avatars corresponding to the users are displayed in the shared three-dimensional environment. For example, as shown in FIG. 5E and as previously discussed above, because spatial truth is enabled in the multi-user communication session, while the shared application window 530 is displayed in the three-dimensional environment 550A/550B, the avatars 515/519/517 corresponding to the users participating in the multi-user communication session are displayed in the three-dimensional environment 550A/550B. Referring back to FIG. 4, as previously discussed, the determination of whether spatial truth is enabled in the multi-user communication session is performed by the participant spatial state determiner 468 of the spatial coordinator API 462. In some examples, the participant spatial state determiner 468 determines whether spatial truth is enabled based on the number of participants in the multi-user communication session. In some examples, spatial truth is enabled if the number of participants is within a threshold number of participants, such as 3, 4, 5, 6, or 8 participants, and is not enabled if the number of participants is greater than the threshold number of participants. As shown in FIG. 5E, there are currently three participants in the multi-user communication session, which is within the threshold number discussed above. Accordingly, in FIG. 5E, spatial truth is enabled in the multi-user communication session and the avatars 515/519/517 are displayed in the shared three-dimensional environment, as shown.

Figure 5F:
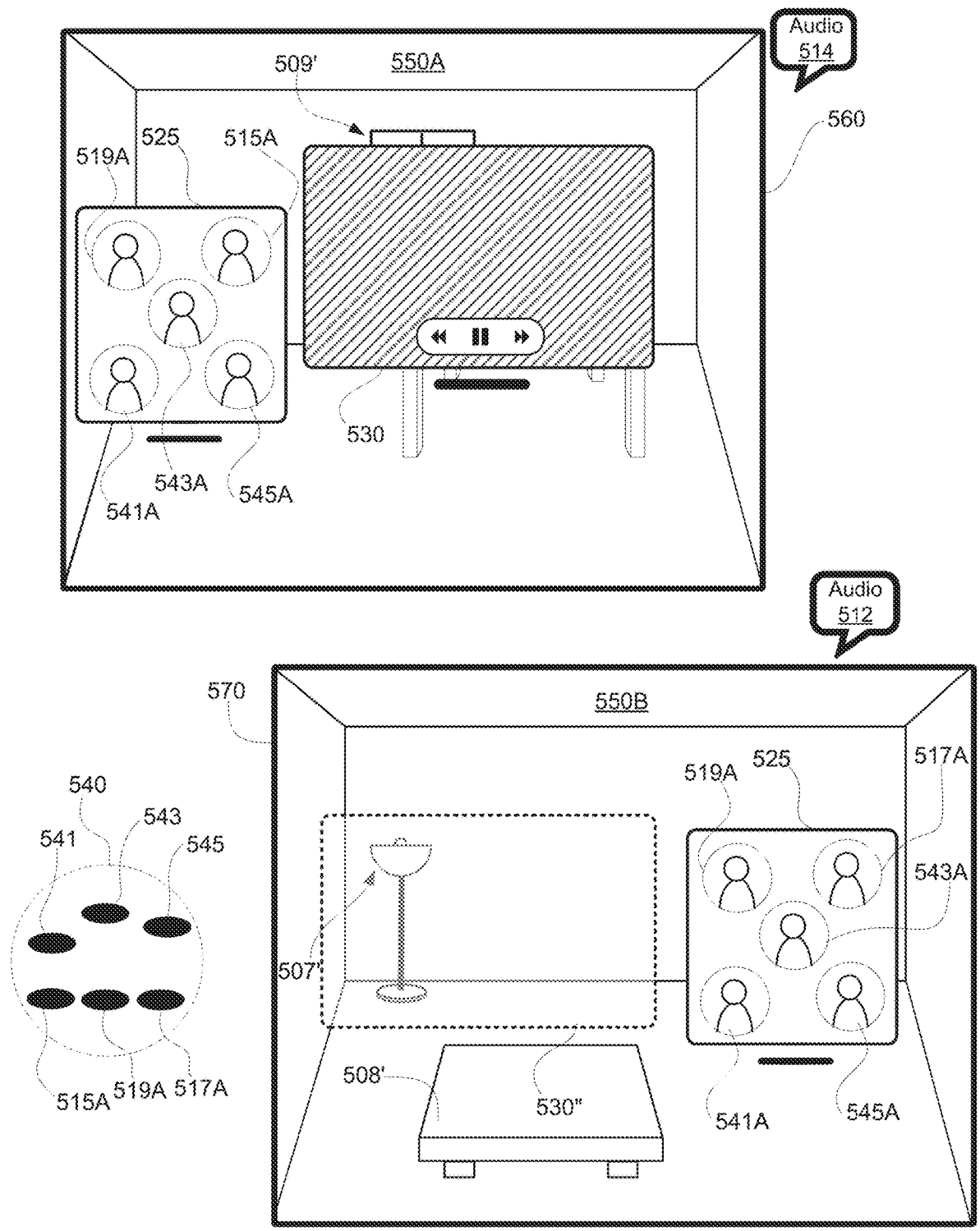

In some examples, if the number of participants within the multi-user communication session increases to a number that is greater than the threshold number of participants discussed above, spatial truth is optionally disabled in the multi-user communication session. For example, in FIG. 5F, three additional users have joined the multi-user communication session (e.g., three additional electronic devices are in communication with the first electronic device 560, the second electronic device 570, and the third electronic device), such that there are now six total participants, as indicated in the spatial state 540. In some examples, because the number of participants is greater than the threshold number discussed above, the communication application facilitating the multi-user communication session disables spatial truth for the multi-user communication session. Particularly, with reference to FIG. 4, the participant spatial state determiner 468 determines that, when the three additional users (e.g., represented by ovals 541, 543, and 545 in FIG. 5F) join the multi-user communication session, which is optionally communicated via user input data 481B, the total number of participants exceeds the threshold number of participants, and thus disables spatial truth (e.g., communicated via the user spatial state data 467). Accordingly, because spatial truth is disabled in the multi-user communication session, the avatars corresponding to the users in the multi-user communication session are no longer displayed in the shared three-dimensional environment 550A/550B. For example, as shown in FIG. 5F, the first electronic device 560 ceases display of the avatars 515/519 and displays canvas 525 that includes representations (e.g., two-dimensional images, video streams, or other graphic) of the users in the multi-communication session (e.g., other than the user of the first electronic device 560), including a representation 515A of the user of the second electronic device 570, a representation 519A of the user of the third electronic device, and representations 541A/543A/545A of the additional users. Similarly, as shown in FIG. 5F, the second electronic device 570 optionally ceases display of the avatars 517/519 and displays the canvas 525 that includes the representations of the users in the multi-communication session (e.g., other than the user of the second electronic device 570). In some examples, while spatial truth is disabled in the multi-user communication session in FIG. 5F, the first electronic device 560 presents audio of the other users (e.g., speech or other audio detected via a microphone of the users' respective electronic devices) in the multi-user communication session, as indicated by audio bubble 514, and the second electronic device 570 presents audio of the user of the other users in the multi-communication session, as indicated by audio bubble 512. In some examples, the audio of the users of the electronic devices may be spatialized, presented in mono, or presented in stereo.

Additionally, in FIG. 5F, when spatial truth is disabled in the multi-user communication session, the three-dimensional environments 550A/550B are no longer a true shared environment. For example, referring back to FIG. 4, when the participant spatial state determiner 468 defines spatial truth as being disabled (e.g., via the user spatial state data 467), the spatial coordinator API 462 no longer displays the application window 530 according to the spatial arrangement/template defined by the application spatial state determiner 464. Accordingly, as shown in FIG. 5F, the application window 530 optionally is no longer displayed in both three-dimensional environments 550A/550B, such that the application window 530 is no longer a shared experience within the multi-user communication session. In some such examples, as shown in FIG. 5F, the application window 530 is redisplayed as a window that is private to the user of the first electronic device 560 (e.g., because the user of the first electronic device 560 optionally initially launched and shared the application window 530). Accordingly, as similarly discussed above with reference to FIG. 3, at the second electronic device 570, the three-dimensional environment 550B includes a representation of the application window 530" that no longer includes the content of the application window 530 (e.g., does not include the video content discussed previously).

Thus, as outlined above, providing an API (e.g., the spatial coordinator API 462 of FIG. 4) that facilitates communication between the communication application and one or more respective applications enables virtual objects (e.g., such as the application window 530 or the virtual tray 555) to be displayed in the shared three-dimensional environment in such a way that conforms to the rules of spatial truth and enables the virtual objects to be displayed clearly for all users in the multi-user communication session, as an advantage. Attention is now directed to further example interactions within a multi-user communication session.

Figure 6A:
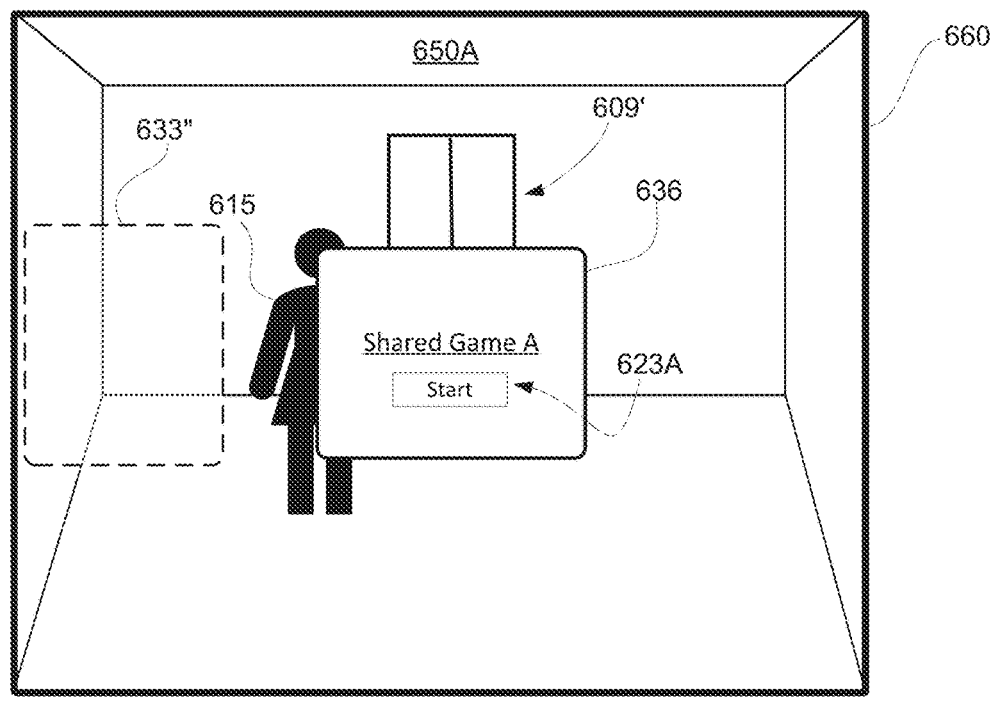
FIGS. 6A-6L illustrate example interactions within a multi-user communication session according to some examples of the disclosure.
Figure 6A:
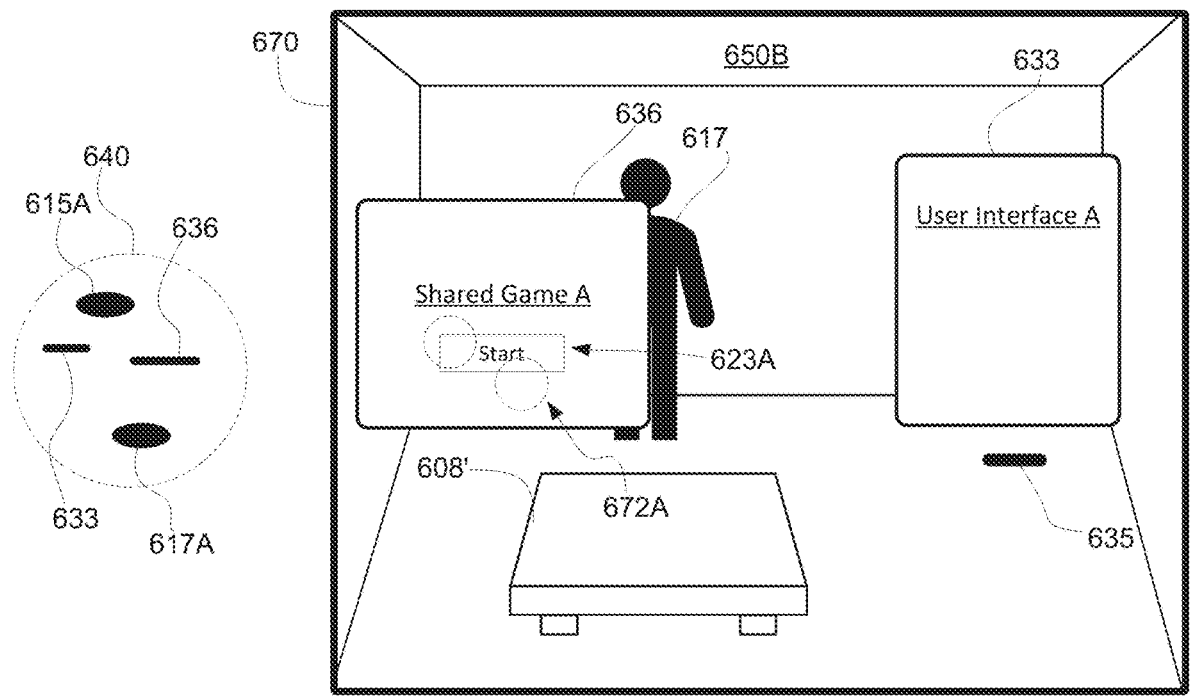

FIGS. 6A-6L illustrate example interactions within a multi-user communication session according to some examples of the disclosure. In some examples, a first electronic device 660 and a second electronic device 670 may be communicatively linked in a multi-user communication session, as shown in FIG. 6A. In some examples, while the first electronic device 660 is in the multi-user communication session with the second electronic device 670, the three-dimensional environment 650A is presented using the first electronic device 660 and the three-dimensional environment 650B is presented using the second electronic device 670. In some examples, the electronic devices 660/670 optionally correspond to electronic devices 560/570 discussed above and/or electronic devices 360/370 in FIG. 3. In some examples, the three-dimensional environments 650A/650B include captured portions of the physical environment in which electronic devices 660/670 are located. For example, the three-dimensional environment 650A includes a window (e.g., representation of window 609'), and the three-dimensional environment 650B includes a coffee table (e.g., representation of coffee table 608') and a floor lamp (e.g., representation of floor lamp 607'). In some examples, the three-dimensional environments 650A/650B optionally correspond to three-dimensional environments 550A/550B described above and/or three-dimensional environments 350A/350B in FIG. 3. As described above, the three-dimensional environments also include avatars 615/617 corresponding to users of the electronic devices 670/660. In some examples, the avatars 615/617 optionally correspond to avatars 515/517 described above and/or avatars 315/317 in FIG. 3.

As shown in FIG. 6A, the first electronic device 660 and the second electronic device 670 are optionally displaying a user interface object 636 associated with a respective application running on the electronic devices 660/670 (e.g., an application configurable to display content corresponding to a game ("Game A") in the three-dimensional environment 650A/650B, such as a video game application). In some examples, as shown in FIG. 6A, the user interface object 636 may include selectable option 623A that is selectable to initiate display of shared exclusive content (e.g., immersive interactive content) that is associated with Game A. In some examples, as shown in FIG. 6A, the user interface object 636 is shared between the user of the first electronic device 660 and the user of the second electronic device 670. Additionally, as shown in FIG. 6A, the second electronic device 670 is displaying virtual object 633, which includes User Interface A, that is private to the user of the second electronic device 670, as previously discussed herein. For example, only the user of the second electronic device 670 may view and/or interact with the user interface of the virtual object 633. Accordingly, as similarly described herein above, the three-dimensional environment 650A displayed at the first electronic device 660 includes a representation of the virtual object 633" that does not include the user interface (e.g., User Interface A) of the virtual object 633 displayed at the second electronic device 670. Further, as shown in FIG. 6A, the virtual object 633 is optionally displayed with grabber bar affordance 635 that is selectable to initiate movement of the virtual object 633 within the three-dimensional environment 650B.

As previously discussed herein, in FIG. 6A, the user of the first electronic device 660 and the user of the second electronic device 670 may share a same first spatial state (e.g., a baseline spatial state) 640 within the multi-user communication session. In some examples, the first spatial state 640 optionally corresponds to spatial state 540 discussed above and/or spatial state 340 discussed above with reference to FIG. 3. As similarly described above, while the user of the first electronic device 660 and the user of the second electronic device 670 are sharing the first spatial state 640 within the multi-user communication session, the users experience spatial truth in the shared three-dimensional environment (e.g., represented by the locations of and/or distance between the ovals 615A and 617A in the circle representing spatial state 640 in FIG. 6A), such that the first electronic device 660 and the second electronic device 670 maintain consistent spatial relationships between locations of the viewpoints of the users (e.g., which correspond to the locations of the avatars 617/615 in the three-dimensional environments 650A/650B) and virtual content at each electronic device (e.g., the virtual object 633).

In FIG. 6A, while the virtual object 633 is displayed in the three-dimensional environment 650B, the second electronic device 670 detects a selection input 672A directed to the selectable option 623A. For example, the second electronic device 670 detects a pinch input (e.g., one in which the index finger and thumb of a hand of the user come into contact), a tap or touch input (e.g., provided by the index finger of the hand), a verbal command, or some other direct or indirect input while the gaze of the user of the second electronic device 670 is directed to the selectable option 623A.

Figure 6B:
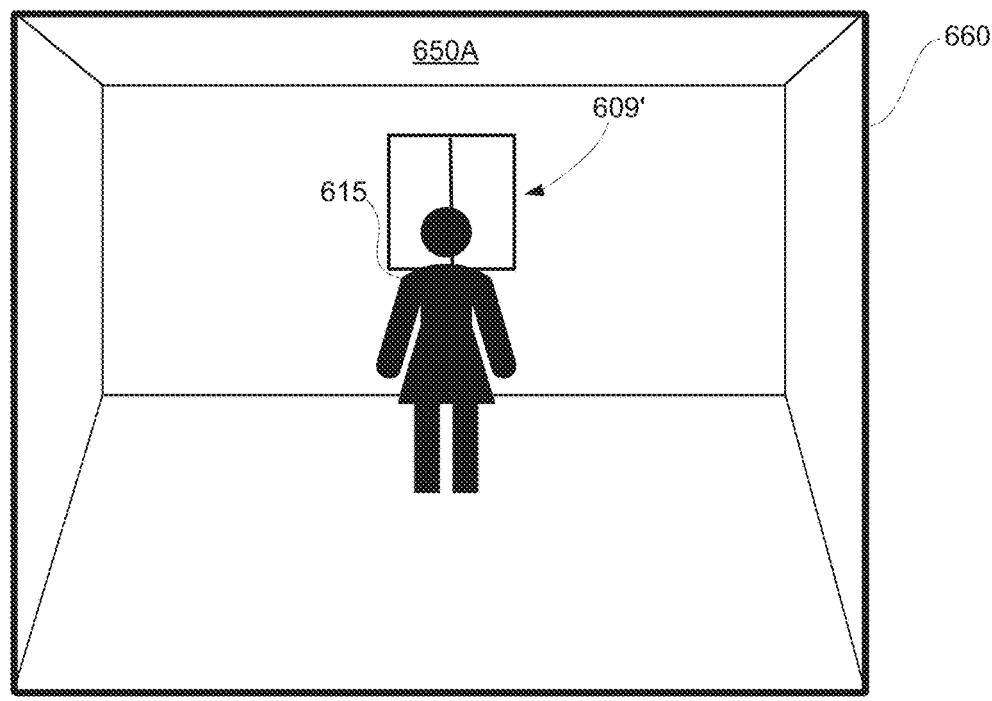
Figure 6B:
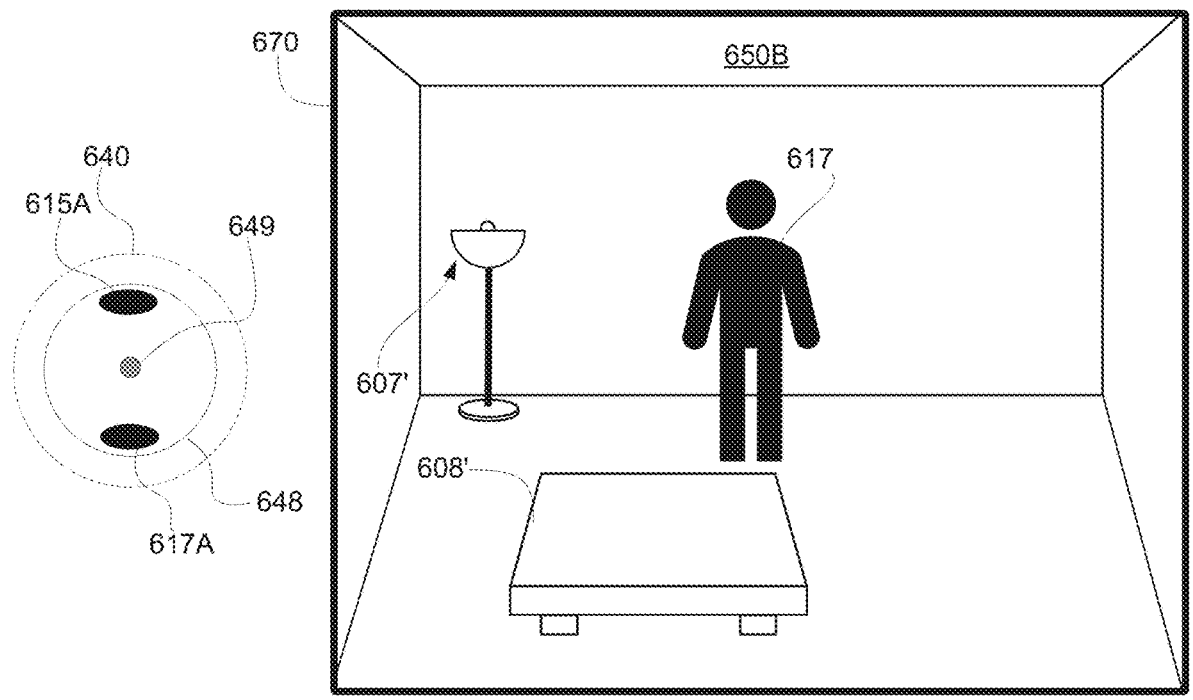

In some examples, as shown in FIG. 6B, in response to detecting the selection of the selectable option 623A, the second electronic device 670 initiates a process for displaying shared content (e.g., a shared immersive experience) in the shared three-dimensional environment within the multi-user communication session. In some examples, as shown in FIG. 6B, initiating the process for displaying the shared content includes transitioning to exclusive display of the three-dimensional environment 650B. For example, in response to detecting the selection of the selectable option 623A, which causes the display of exclusive content, the second electronic device 670 ceases display of all other content in the three-dimensional environment 650B, such as the virtual object 633 in FIG. 6A.

In some examples, as shown in FIG. 6B, the electronic devices in the multi-user communication session may implement an "auto-follow" behavior to maintain the users in the multi-user communication session within the same spatial state (and thus to maintain spatial truth within the multi-user communication session). For example, when the user of the second electronic device 670 selects the selectable option 623A to display exclusive content associated with Game A in FIG. 6A, the second electronic device 670 may transmit (e.g., directly or indirectly) to the first electronic device 660 one or more commands for causing the first electronic device 660 to auto-follow the second electronic device 670. Particularly, with reference to FIG. 4, the selection of the selectable option 623A that causes the second electronic device 670 to transition to the exclusive display mode is optionally transmitted to the spatial coordinator API 462 in the form of the input data 483, and the one or more commands that are transmitted to the first electronic device 660 are optionally in the form of display mode updates data 475, as similarly discussed previously above. As shown in FIG. 6B, in response to receiving the one or more commands transmitted by the second electronic device 670, the first electronic device 660 also transitions to the exclusive display mode and ceases displaying other content (e.g., such as the representation 633" in FIG. 6A). Accordingly, the user of the first electronic device 660 and the user of the second electronic device 670 remain associated with the same spatial state and spatial truth remains enabled within the multi-user communication session.

In some examples, the content of the video game application discussed above that is being displayed in the shared three-dimensional environment may be associated with a spatial template/arrangement. For example, as previously discussed herein, with reference to FIG. 4, the application spatial state determiner 464 of the spatial coordinator API 462 defines an application spatial state parameter that defines the spatial template for the content associated with the video game application to be displayed. Accordingly, in some examples, as shown in FIG. 6B, when the first electronic device 660 and the second electronic device 670 enter the exclusive display mode, the locations of the avatars 615/617 are rearranged/shifted in the shared three-dimensional environment in accordance with the determined spatial template/arrangement, as similarly discussed above. Additionally, because the content associated with the video game application is exclusive content (e.g., such as immersive interactive content), a stage 648 is associated with the determined spatial template/arrangement for the content in the shared three-dimensional environment within the multi-user communication session. In some examples, as shown in FIG. 6B, the stage 648 is aligned with the spatial arrangement/template that is defined for the avatars 615/617 (e.g., according to the application spatial state parameter described previously above). Particularly, in FIG. 6B, the defined spatial arrangement/template assigns positions or "seats" within the stage 648 at which the avatars 615/617 are displayed (and where the viewpoints of the users of the electronic devices 660/670 are spatially located within the multi-user communication session). In some examples, as similarly discussed above, the stage 648 may be an exclusive stage, such that the display of the shared content that is associated with Game A is visible and interactive only to those users who share the same spatial state (e.g., the first spatial state 640).

Figure 6C:
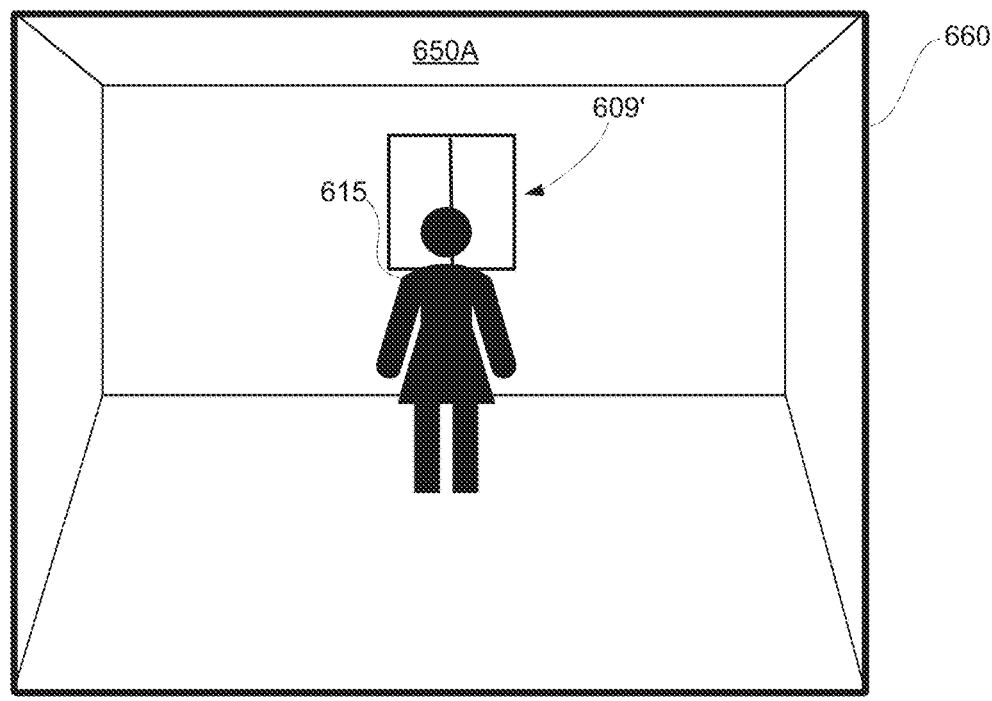
Figure 6C:
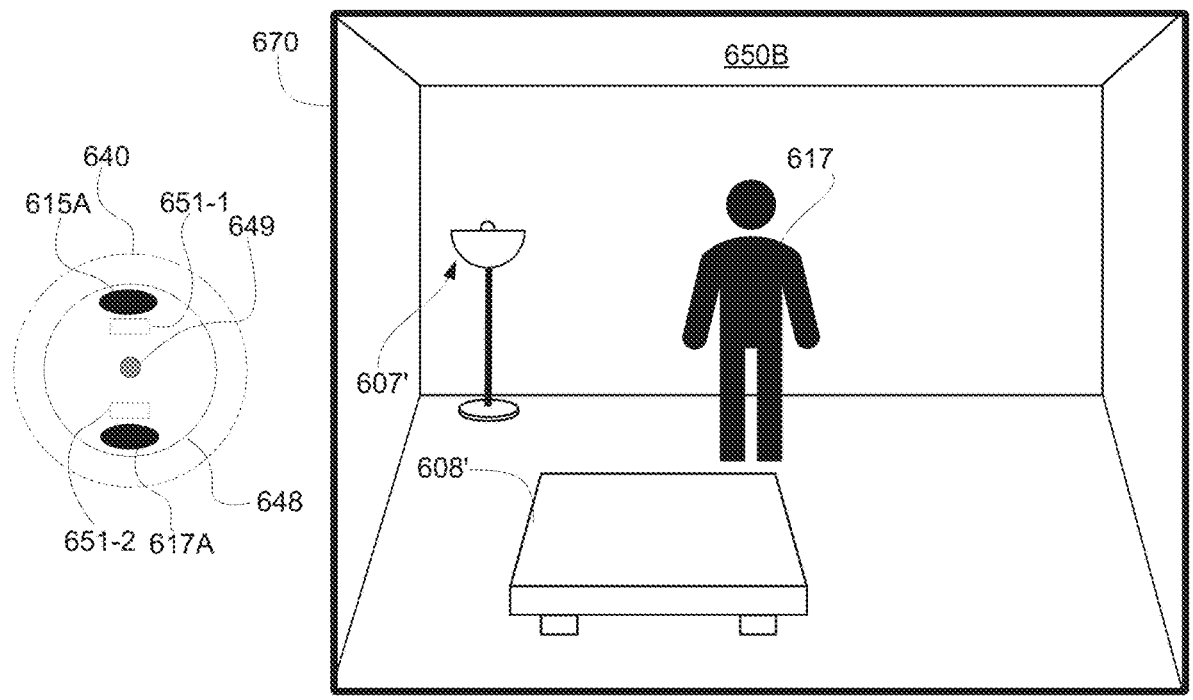

In some examples, as previously mentioned herein, the display of the shared content within the stage 648 may be user-centric or experience-centric within the multi-user communication session. In some examples, an experience-centric display of shared content within the stage 648 would cause the shared content to be displayed at a predefined location within the stage 648, such as at a center of the stage 648 (e.g., and/or at a location that is an average of the seats of the users within the stage 648). In some examples, as shown in FIG. 6C, a user-centric display of the shared content within the stage causes the shared content to be displayed at positions that are offset from the predefined location 649 (e.g., the center) of the stage 648. In some examples, the user-centric display of the shared content enables individual versions of the shared content (e.g., individual user interfaces or objects) to be displayed for each user within the multi-user communication session, rather than a singular shared content that is visible to all users within the multi-user communication session. For example, as shown in FIG. 6C, a first placement location 651-1 is determined for the user of the second electronic device 670 (e.g., in front of the avatar 615) and a second placement location 651-2 is determined for the user of the first electronic device 660 (e.g., in front of the avatar 617) within the stage 648. In some examples, referring back to FIG. 4, the stage offset value from which the first and second placement locations 651-1 and 651-2 are calculated is based on the display stage data 477 discussed previously.

Figure 6D:
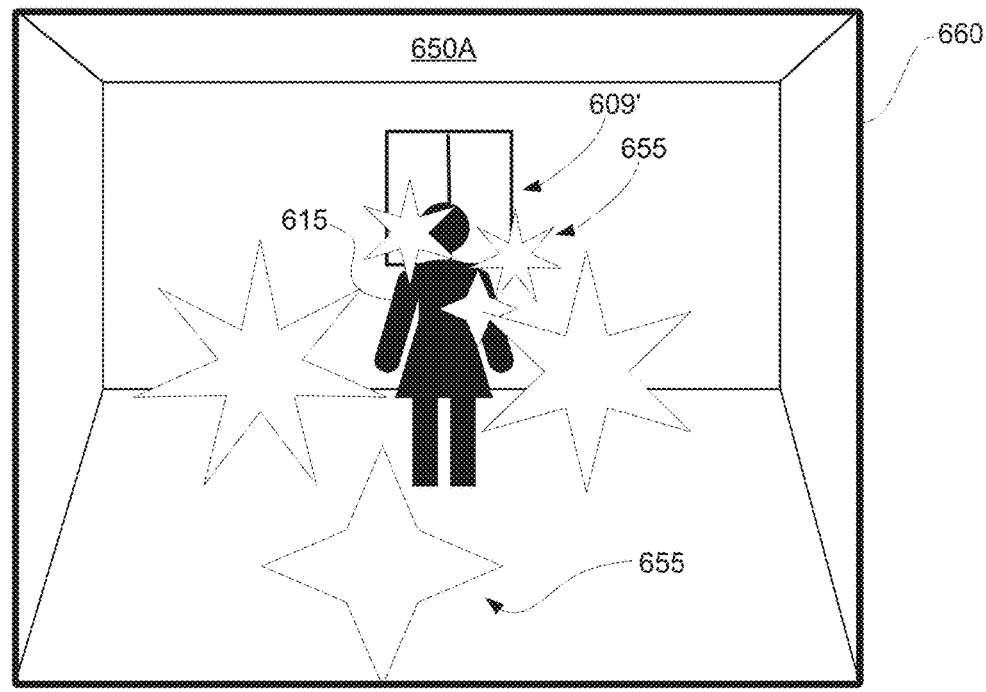
Figure 6D:
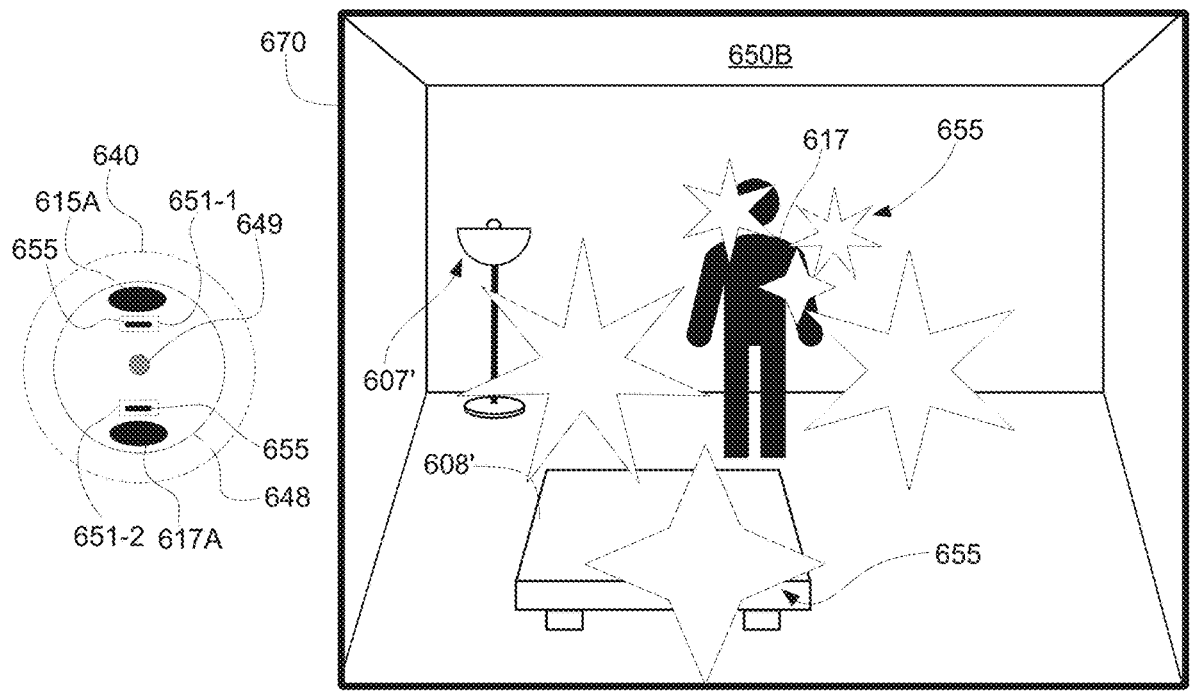

In some examples, as shown in FIG. 6D, displaying the shared content that is associated with the video game application discussed above includes displaying a game user interface that includes a plurality of interactive objects 655. As mentioned above and as shown in FIG. 6D, the plurality of interactive objects 655 are optionally displayed at the first and second placement locations 651-1 and 651-2 within the stage 648. In some examples, as shown in FIG. 6D, because the display of the plurality of interactive objects 655 is user-centric, as discussed above, each user in the multi-user communication session is provided with an individual version of the plurality of interactive objects 655.

Figure 6E:
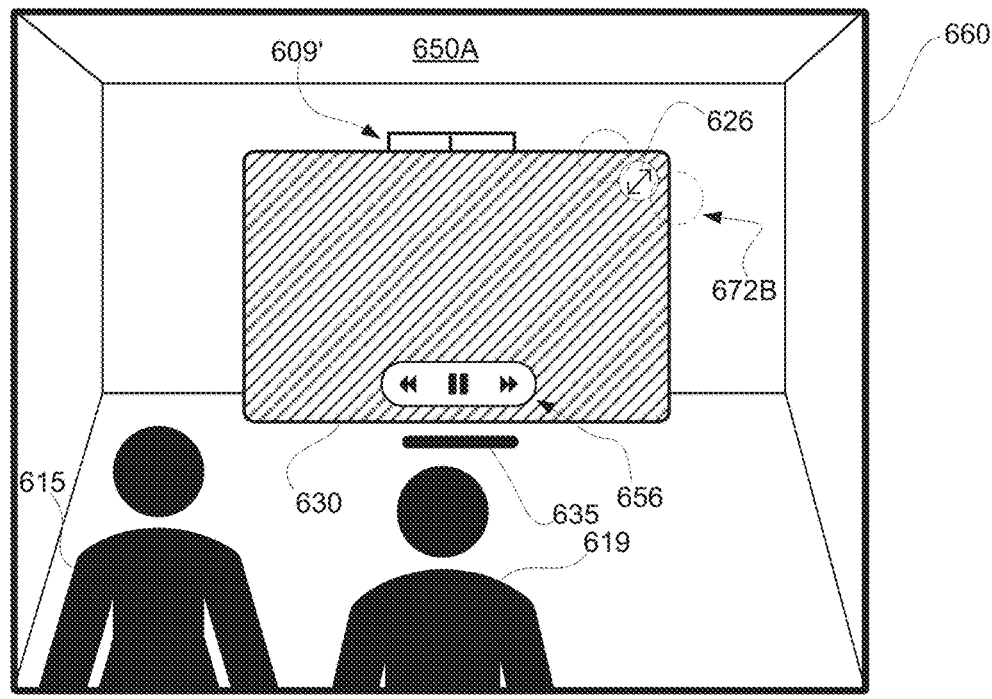
Figure 6E:
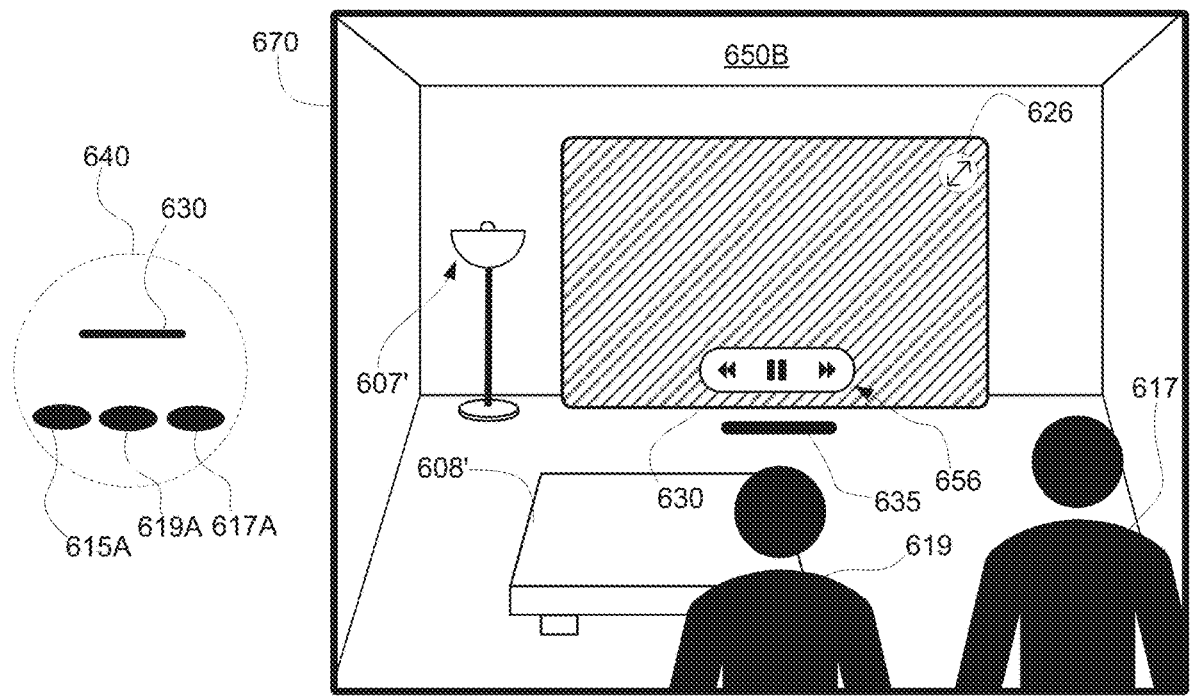

Alternatively, as mentioned above, in some examples, shared content may be displayed as experience-centric while in the exclusive display mode. For example, in FIG. 6E, the shared three-dimensional environment may alternatively include application window 630 that is shared among the user of the first electronic device 660, the user of the second electronic device 670, and a user of a third electronic device (not shown) that are communicatively linked within the multi-user communication session. In some examples, as shown in FIG. 6E, the application window 630 is optionally displaying video content (e.g., corresponding to a movie, television episode, or other video clip) that is visible to the user of the first electronic device 660, the user of the second electronic device 670, and the user of the third electronic device. In some examples, the application window 630 is displayed with a grabber bar affordance 635 (e.g., a handle-bar) that is selectable to initiate movement of the application window 630 within the three-dimensional environment 650A/650B. Additionally, as shown in FIG. 6E, the application window may include playback controls 656 that are selectable to control playback of the video content displayed in the application window 630 (e.g., rewind the video content, pause the video content, fast-forward through the video content, etc.).

As previously discussed herein, in FIG. 6E, the user of the first electronic device 660, the user of the second electronic device 670, and the user of the third electronic device (not shown) may share the same first spatial state (e.g., a baseline spatial state) 640 within the multi-user communication session. As similarly described above, while the user of the first electronic device 660, the user of the second electronic device 670, and the user of the third electronic device (not shown) share the first spatial state 640 within the multi-user communication session, the users experience spatial truth in the shared three-dimensional environment (e.g., represented by the locations of and/or distance between the ovals 615A, 617A, and 619A in the circle representing spatial state 640 in FIG. 6E), such that the first electronic device 660, the second electronic device 670, and the third electronic device (not shown) maintain consistent spatial relationships between locations of the viewpoints of the users (e.g., which correspond to the locations of the avatars 617/615/619 within the circle representing spatial state 640) and virtual content at each electronic device (e.g., the application window 630). As shown in FIG. 6E, while in the first spatial state 640, the users (e.g., represented by their avatars 615, 619, and 617) are positioned side-by-side with a front-facing surface of the application window 630 facing toward the users.

In some examples, the video content of the application window 630 is being displayed in a window mode in the shared three-dimensional environment. For example, the video content displayed in the three-dimensional environment is bounded/limited by a size of the application window 630, as shown in FIG. 6E. In some examples, the video content of the application window 630 can alternatively be displayed in a full-screen mode in the three-dimensional environment. As used herein, display of video content in a "full-screen mode" in the three-dimensional environments 650A/650B optionally refers to display of the video content at a respective size and/or with a respective visual emphasis in the three-dimensional environments 650A/650B. For example, the electronic devices 660/670 may display the video content at a size that is larger than (e.g., 1.2×, 1.4×, 1.5×, 2×, 2.5×, or 3×) the size of the application window 630 displaying the video content in three-dimensional environments 650A/650B. Additionally, for example, the video content may be displayed with a greater visual emphasis than other virtual objects and/or representations of physical objects displayed in three-dimensional environments 650A/650B. As described in more detail below, while the video content is displayed in the full-screen mode, the captured portions of the physical environment surrounding the electronic devices may become faded and/or darkened in the three-dimensional environment. As shown in FIG. 6E, the application window 630 in the three-dimensional environment 650A/650B may include a selectable option 626 that is selectable to cause the video content of the application window 630 to be displayed in the full-screen mode.

As shown in FIG. 6E, the user of the first electronic device 660 is optionally providing a selection input 672B directed to the selectable option 626 in the application window 630. For example, the first electronic device 660 detects a pinch input (e.g., one in which the index finger and thumb of the user come into contact), a tap or touch input (e.g., provided by the index finger of the user), a verbal command, or some other direct or indirect input while the gaze of the user of the first electronic device 660 is directed to the selectable option 626.

Figure 6F:
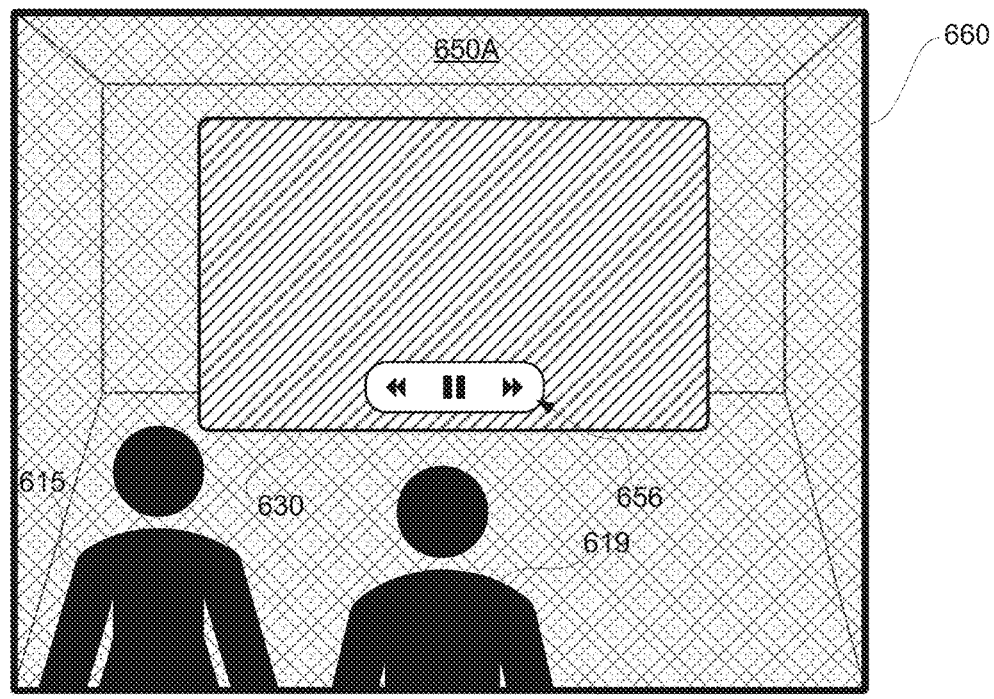
Figure 6F:
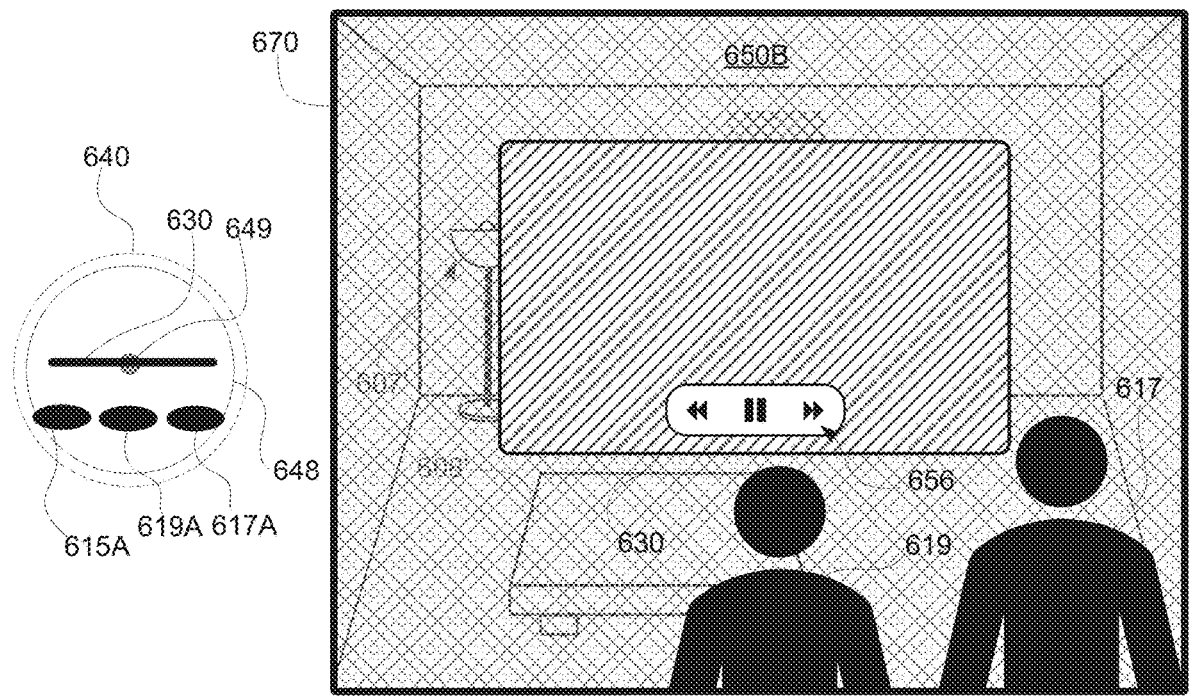

In some examples, in response to receiving the selection input 672B, the first electronic device 660 displays the video content in three-dimensional environment 650A in the full-screen mode, as shown in FIG. 6F, which includes transitioning display of the application window into an exclusive display mode, as similarly discussed above. For example, as shown in FIG. 6F, when the first electronic device 660 displays the video content in the full-screen mode, the first electronic device 660 increases the size of the application window 630 that is displaying the video content. Additionally, in some examples, as shown in FIG. 6F, the electronic devices in the multi-user communication session may implement the auto-follow behavior discussed above to maintain the users in the multi-user communication session within the same spatial state. For example, when the user of the first electronic device 660 activates the full-screen mode in FIG. 6E, the first electronic device 660 may transmit (e.g., directly or indirectly) to the second electronic device 670 and the third electronic device (not shown) one or more commands for causing the second electronic device 670 and the third electronic device to auto-follow the first electronic device 660. As shown in FIG. 6F, in some examples, in response to receiving the one or more commands transmitted by the first electronic device 660, the second electronic device 670 and the third electronic device display the video content of the application window 630 in the full-screen mode, as discussed above.

Additionally, in some examples, when the electronic devices 660/670 transition to displaying the video content of the application window 630 in the exclusive full-screen mode, a stage 648 is applied to the side-by-side spatial template defined for the avatars 615/617/619, as shown in FIG. 6F. In some examples, as similarly discussed above, the stage 648 may be an experience-centric stage. As shown in FIG. 6F, the application window 630 is docked (e.g., positioned) at a predetermined location 649 (e.g., a central location) within the stage 648 in the multi-user communication session (e.g., such that the application window 630 is no longer movable in the three-dimensional environment 650A/650B while the full-screen mode is active). Additionally, in some examples, when presenting the video content in the full-screen mode, the first electronic device 660 and the second electronic device 670 visually deemphasize display of the representations of the captured portions of the physical environment surrounding the first electronic device 660 and the second electronic device 670. For example, as shown in FIG. 6F, the representation of the window 609' and the representations of the floor, ceiling, and walls surrounding the first electronic device 660 may be visually deemphasized (e.g., faded, darkened, or adjusted to be translucent or transparent) in the three-dimensional environment 650A and the representation of the floor lamp 607', the representation of the coffee table 608', and the representations of the floor, ceiling, and walls surrounding the second electronic device 670 may be visually deemphasized in the three-dimensional environment 650B, such that attention of the users are drawn predominantly to the video content in the enlarged application window 630.

Figure 6G:
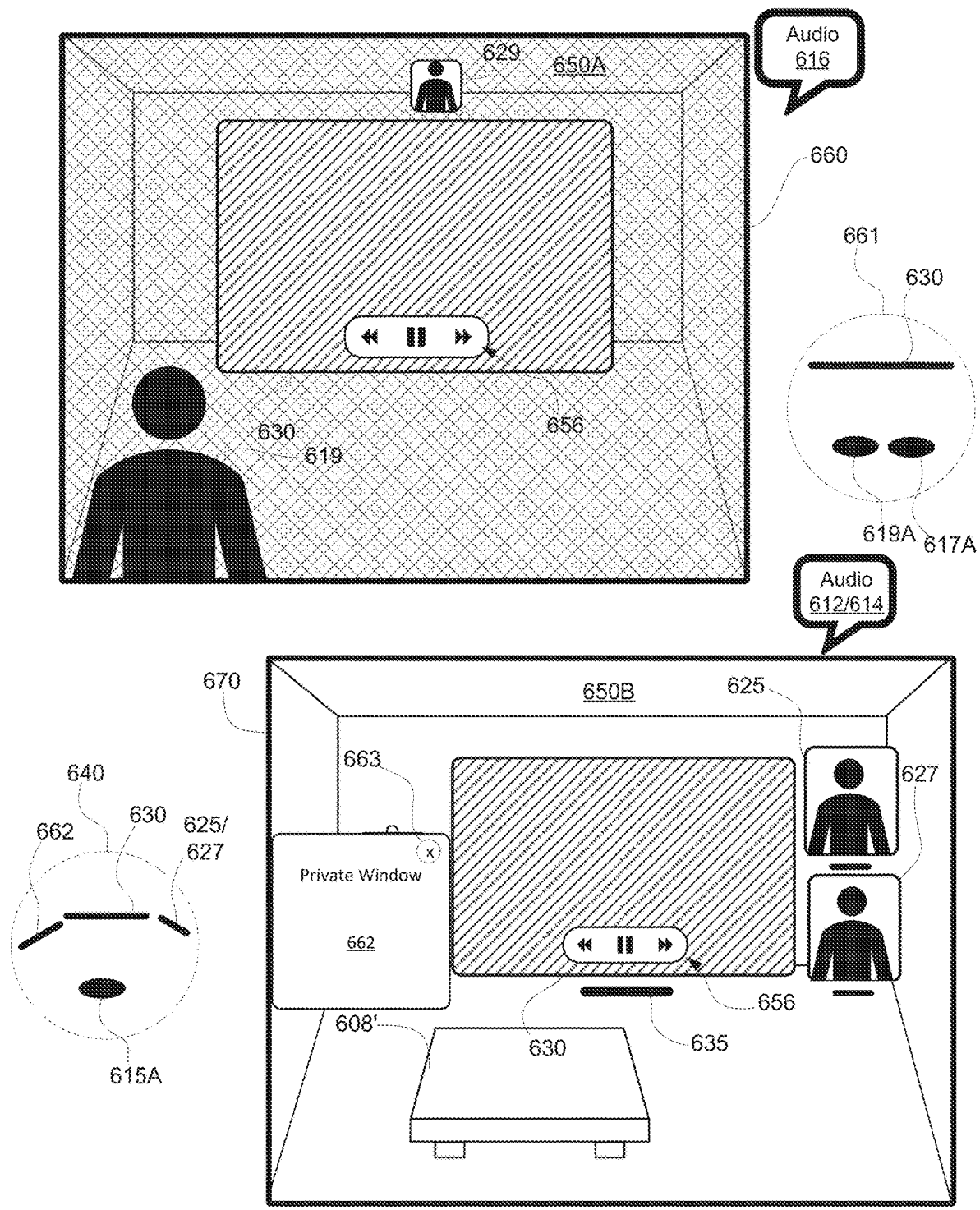

In some examples, the electronic devices within the multi-user communication session may alternatively not implement the auto-follow behavior discussed above. For example, particular content that is displayed in the three-dimensional environment may prevent one or more of the electronic devices from implementing the auto-follow behavior. As an example, in FIG. 6G, when the first electronic device 660 transitions to displaying the video content of the application window 630 in the full-screen mode in response to the selection input 672B of FIG. 6E, the third electronic device auto-follows the first electronic device 660 but the second electronic device 670 does not. In some examples, when the third electronic device auto-follows the first electronic device 660, the user of the third electronic device joins the user of the first electronic device 660 in a second spatial state 661, as shown in FIG. 6G. For example, because both the first electronic device 660 and the third electronic device (not shown) are displaying the video content in the full-screen mode, the first electronic device 660 and the third electronic device are operating in the same spatial state 661 within the multi-user communication session, as previously discussed herein. Additionally, as shown in FIG. 6G, the user of the first electronic device 660 (e.g., represented by the oval 617A in the circle representing spatial state 661) and the user of the third electronic device (e.g., represented by the oval 619A in the circle representing spatial state 661) are arranged in a new spatial arrangement/template while in the second spatial state 661. For example, as shown in the circle representing spatial state 661 in FIG. 6G, the user of the first electronic device 660 (e.g., represented by the oval 617A) and the user of the third electronic device (e.g., represented by the oval 619A) are positioned side-by-side in front of the application window 630 in the full-screen mode.

As mentioned previously above, the second electronic device 670 optionally does not auto-follow the first electronic device 660 to join the view of the video content in the full-screen mode. Particularly, in some examples, the second electronic device 670 does not auto-follow the first electronic device 660 due to the display of private window 662 in the three-dimensional environment 650B. For example, when the user of the first electronic device 660 provides the input to display the video content of the application window 630 in the full-screen mode in FIG. 6E, the user of the second electronic device 670 is viewing the private window 662, as shown in FIG. 6G. In such instances, it may be undesirable to cause the second electronic device 670 to auto-follow the first electronic device 660 because such an operation would cause the private window 662 to cease to be displayed in the three-dimensional environment 650B (e.g., without user consent). Accordingly, in some examples, while the private window 662 remains displayed in the three-dimensional environment 650B, the second electronic device 670 does not auto-follow the first electronic device 660 as previously discussed above. In some examples, because the second electronic device 670 does not auto-follow the first electronic device 660, the second electronic device 670 is operating in a different state from the first electronic device 660 and the third electronic device, which causes the user of the second electronic device 670 (e.g., represented by the oval 615A in the circle representing spatial state 640) to remain in the first spatial state 640. Further, as shown in FIG. 6G, the user of the second electronic device is arranged in a new spatial arrangement/template within the first spatial state 640. For example, as shown in the circle representing spatial state 640 in FIG. 6G, the user of the third electronic device is positioned centrally within the first spatial state 640 relative to the application window 630.

As shown in FIG. 6G, because the user of the second electronic device 670 is no longer in the same spatial state as the user of the first electronic device 660 and the user of the third electronic device (not shown), the three-dimensional environments 650A/650B are no longer a true shared environment. Accordingly, the second electronic device 670 ceases displaying the avatar 617 corresponding to the user of the first electronic device 660 and the avatar 619 corresponding to the user of the third electronic device (not shown). In some examples, as shown in FIG. 6G, because the user of the first electronic device 660 and the user of the third electronic device share the same second spatial state 661, the avatars 617/619 corresponding to the users of the first electronic device 660 and the third electronic device remain displayed. For example, as shown in FIG. 6G, the first electronic device 660 ceases displaying the avatar 615 corresponding to the user of the second electronic device 670 but maintains display of the avatar 619 corresponding to the user of the third electronic device (not shown) in the three-dimensional environment 650A.

In some examples, as shown in FIG. 6G, the second electronic device 670 replaces display of the avatars 617/619 with two-dimensional representations corresponding to the users of the other electronic devices. For example, as shown in FIG. 6G, the second electronic device 670 displays a first two-dimensional representation 625 and a second two-dimensional representation 627 in the three-dimensional environment 650B. In some examples, as similarly discussed above, the two-dimensional representations 625/627 include an image, video, or other rendering that is representative of the user of the first electronic device 660 and the user of the third electronic device. Similarly, the first electronic device 660 replaces display of the avatar 615 corresponding to the user of the second electronic device 670 with a two-dimensional representation corresponding to the user of the second electronic device 670. For example, as shown in FIG. 6G, the first electronic device 660 displays a two-dimensional representation 629 that optionally includes an image, video, or other rendering that is representative of the user of the second electronic device 670. As shown in FIG. 6G, the first electronic device 660 may display the two-dimensional representation 629 in a predetermined region of the display of the first electronic device 660. For example, as shown in FIG. 6G, the first electronic device 660 displays the two-dimensional representation 629 in a top/upper region of the display. In some examples, the second electronic device 670 displays the two-dimensional representations 625/627 corresponding to the users of the first electronic device 660 and the third electronic device relative to the application window 630. For example, as shown in FIG. 6G, the second electronic device 670 displays the two-dimensional representations 625/627 with (e.g., adjacent to) the application window 630 in the three-dimensional environment 650B.

As similarly described above, the display of avatars 615/617/619 in three-dimensional environments 650A/650B is optionally accompanied by the presentation of an audio effect corresponding to a voice of each of the users of the three electronic devices, which, in some examples, may be spatialized such that the audio appears to the users of the three electronic devices to emanate from the locations of avatars 615/617/619 in the three-dimensional environments 650A/650B. In some examples, as shown in FIG. 6G, when the avatar 615 ceases to be displayed in the three-dimensional environment 650A at the first electronic device 660, the first electronic device 660 maintains the presentation of the audio of the user of the second electronic device 670, as indicated by audio bubbles 616. Similarly, when the avatars 617/619 cease to be displayed in the three-dimensional environment 650B at the second electronic device 670, the second electronic device 670 maintains the presentation of the audio of the users of the first electronic device 660 and the third electronic device, as indicated by audio bubbles 612/614. However, in some examples, the audio of the users of the electronic devices may no longer be spatialized and may instead be presented in mono or stereo. Thus, despite the avatars 617/619 no longer being displayed in the three-dimensional environment 650B and the avatar 615 no longer being displayed in the three-dimensional environment 650A, the users of the three electronic devices may continue communicating (e.g., verbally) since the first electronic device 660, the second electronic device 670, and the third electronic device (not shown) are still in the multi-user communication session. In other examples, the audio of the users of the electronic devices may be spatialized such that the audio appears to emanate from their respective two-dimensional representations 625/627/629.

As mentioned previously herein, in some examples, while the users of the three electronic devices are associated with separate spatial states within the multi-user communication session, the users experience spatial truth that is localized based on the spatial state each user is associated with. For example, as previously discussed above, the display of content (and subsequent interactions with the content) in the three-dimensional environment 650A at the first electronic device 660 may be independent of the display of content in the three-dimensional environment 650B at the second electronic device 670, though the content of the application window(s) may still be synchronized (e.g., the same portion of video content (e.g., movie or television show content) is being played back in the application window(s) across the first electronic device 660 and the second electronic device 670).

Figure 6H:
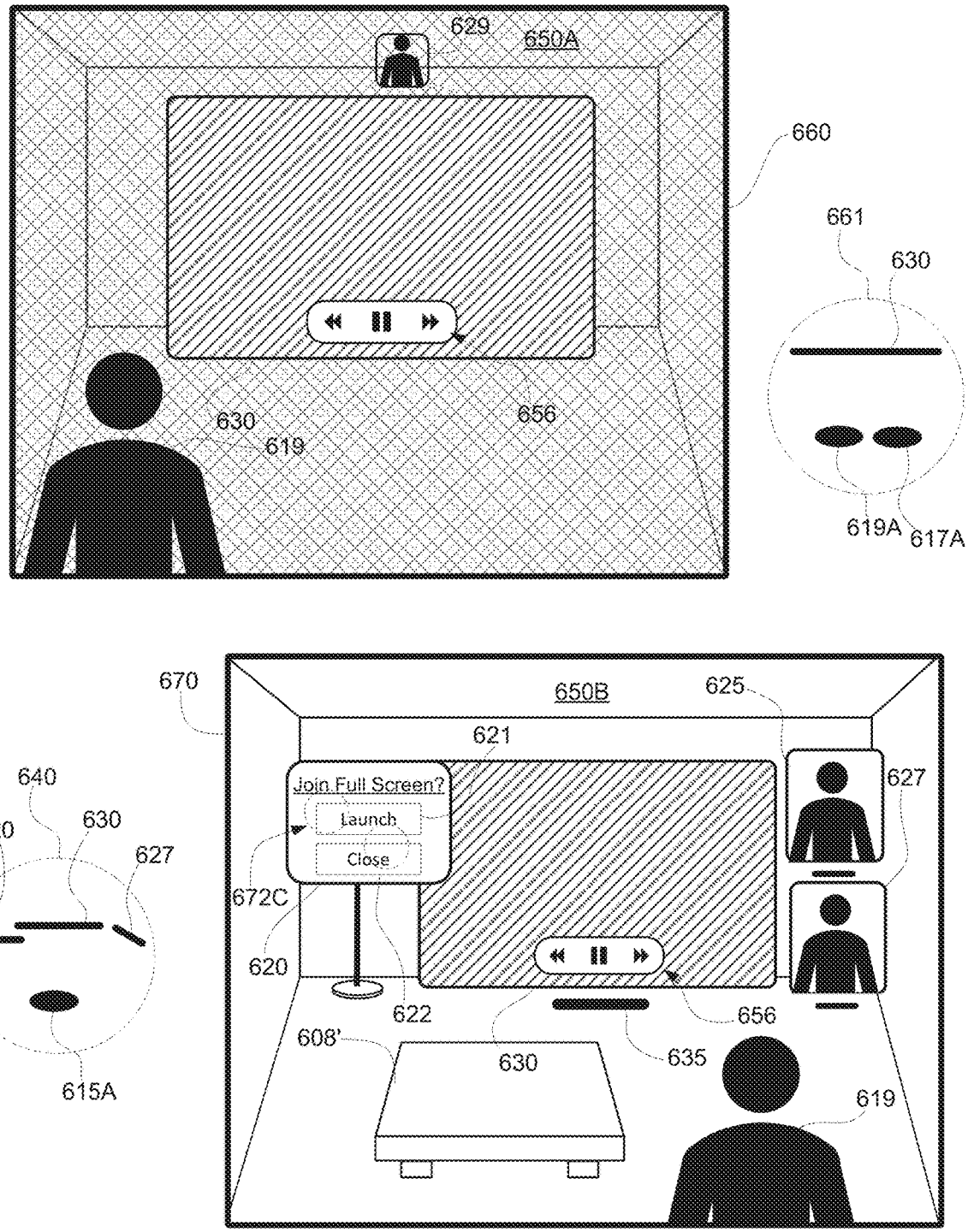

In some examples, as shown in FIG. 6H, the second electronic device 670 may no longer be displaying the private window 662. For example, while the private window 662 is displayed in FIG. 6G and after the user of the third electronic device joined the user of the first electronic device 660 in viewing the video content of the application window 630 in the full-screen mode, the second electronic device 670 detects input for closing the private window 662 (e.g., such as a selection of close option 663 in FIG. 6G). In some examples, in FIG. 6H, because the private window 662 is no longer displayed in the three-dimensional environment 650B, there is no longer a hindrance to joining the first electronic device 660 and the third electronic device in viewing the video content of the application window 630 in the full-screen exclusive mode. In some examples, when the second electronic device 670 determines that the private window 662 is no longer displayed in the three-dimensional environment 650B, the second electronic device 670 acts on the invitation from the first electronic device 660 to join (e.g., auto-follow) the first electronic device 660 in viewing the video content in full-screen. In some examples, such an action includes displaying an indication that prompts user input for synchronizing the display of the shared video content.

As an example, as shown in FIG. 6H, when the private window 662 ceases to be displayed in the three-dimensional environment 650B, the second electronic device 670 displays a notification element 620 in the three-dimensional environment 650B corresponding to an invitation for viewing the video content in the full-screen mode. For example, as shown in FIG. 6H, the notification element 620 includes a first option 621 that is selectable to cause the second electronic device 670 to display the video content of the application window 630 in the full-screen mode, and a second option 622 that is selectable to cause the second electronic device 670 to close the notification element 620 (and continue displaying the application window 630 as shown in FIG. 6H). In some examples, the notification element 620 is displayed in an alternative manner in the three-dimensional environment 650B. For example, the notification element 620 may be displayed over the two-dimensional representation 627 corresponding to the user of the first electronic device 660 and/or may be displayed as a message within the two-dimensional representation 627 (e.g., "Join me in viewing the content in full-screen") that includes the selectable options 621 and 622.

As shown in FIG. 6H, the user of the second electronic device 670 is optionally providing a selection input 672C directed to the first option 621 in the notification element 634 in three-dimensional environment 650B. For example, the second electronic device 670 optionally detects a pinch input, touch or tap input, verbal command, or some other direct or indirect input while the gaze of the user of the second electronic device 670 is directed to the first option 621.

Figure 6I:
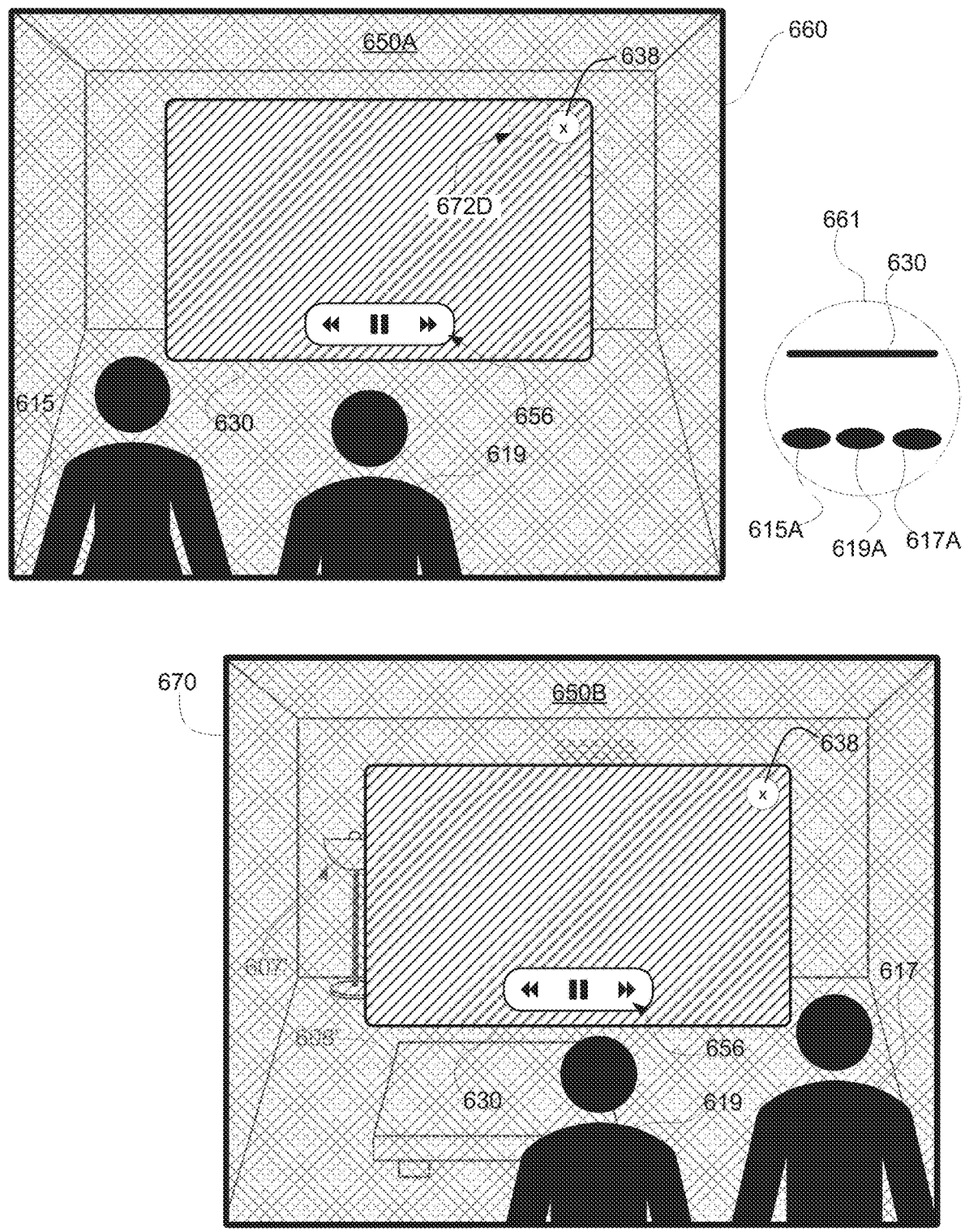

In some examples, in response to detecting the selection input 672C, the second electronic device 670 optionally presents the video content of the application window 630 in the full-screen mode in the three-dimensional environment 650B, as shown in FIG. 6I. For example, as similarly described above, the second electronic device 670 may increase the size of the application window 630 in the three-dimensional environment 650B such that the video content is displayed with a greater degree of visual prominence in the three-dimensional environment 650B. Additionally, as discussed above, the second electronic device 670 may dock the application window 630 (e.g., positions the application window at a fixed location (e.g., a central location)) in the three-dimensional environment 650B (e.g., such that the application window 630 is no longer movable in the three-dimensional environment 650B while the full-screen mode is active). Additionally, in some examples, when presenting the video content in the full-screen mode, the second electronic device 670 may visually deemphasize the representations of the captured portions of the physical environment surrounding the second electronic device 670. For example, as shown in FIG. 6I, the representation of the coffee table 608', the representation of the floor lamp 607' and the representations of the floor, ceiling, and walls surrounding the second electronic device 670 may be visually deemphasized (e.g., faded, darkened, or adjusted to be translucent or transparent) in the three-dimensional environment 650B such that attention is drawn predominantly to the video content of the application window 630 in the full-screen mode.

In some examples, rather than display a notification (e.g., such as notification element 620) corresponding to an invitation from the first electronic device 660 to join in viewing the video content of the application window 630 in the full-screen mode as discussed above with reference to FIG. 6H, the second electronic device 670 may auto-follow the first electronic device 660 (e.g., without user input). For example, in FIG. 6H, when the private window 662 is no longer displayed in the three-dimensional environment 650B, the second electronic device 670 automatically transitions to displaying the video content of the application window 630 in the full-screen mode, optionally after a threshold amount of time (e.g., 0.5, 1, 2, 3, 5, 8, 10, etc. minutes after the private window 662 is no longer displayed). In some examples, if the second electronic device 670 detects user input before the threshold amount of time elapses that prevents the display of the virtual content in the full-screen mode, such as launching another private application in the three-dimensional environment 650B, the second electronic device 670 forgoes joining the first electronic device 660 and the second electronic device 670 in the full-screen display mode.

In some examples, as similarly described above, when the second electronic device 670 joins the first electronic device 660 and the third electronic device (not shown) in viewing the video content in the full-screen mode as shown in FIG. 6I, the users of the three electronic devices become associated with the same spatial state within the multi-user communication session once again. For example, as shown in FIG. 6I, because the first electronic device 660, the second electronic device 670, and the third electronic device (not shown) are displaying the video content in the full-screen mode, the three electronic devices share the same spatial state within the multi-user communication session, as previously discussed herein. Additionally, as shown in FIG. 6I, the user of the first electronic device 660 (e.g., represented by the oval 617A in the circle representing spatial state 661), the user of the second electronic device 670 (e.g., represented by the oval 615A in the circle representing spatial state 661), and the user of the third electronic device (e.g., represented by the oval 619A in the circle representing spatial state 661) are arranged in a new spatial arrangement/template within the second spatial state 661 (e.g., compared to the spatial arrangement/template shown in FIG. 6H). For example, as shown in the circle representing spatial state 661 in FIG. 6I, the user of the first electronic device 660 (e.g., represented by the oval 617A) and the user of the third electronic device (e.g., represented by the oval 619A) are shifted to the right while in the second spatial state 661 to account for the placement of the user of the second electronic device 670 (e.g., represented by the oval 615A).

Additionally, in some examples, as previously described herein, when the user of the second electronic device 670 joins the user of the first electronic device 660 and the user of the third electronic device (not shown) in the second spatial state 661 as shown in FIG. 6I, the three electronic devices redisplay the avatars 615/617/619 in the three-dimensional environments 650A/650B. For example, as shown in FIG. 6I, the first electronic device 660 ceases display of the two-dimensional representation 629 (e.g., from FIG. 6H) and redisplays the avatar 615 corresponding to the user of the second electronic device 670 in the three-dimensional environment 650A based on the defined spatial arrangement/template while in the second spatial state 661 (e.g., the avatars 615/619 are displayed to the left of the viewpoint of the user of the first electronic device 660). Similarly, as shown, the second electronic device 670 ceases display of the two-dimensional representations 625/627 (e.g., from FIG. 6H) and redisplays the avatar 617 corresponding to the user of the first electronic device 660 and the avatar 619 corresponding to the user of the third electronic device in the three-dimensional environment 650B based on the defined spatial arrangement/template while in the second spatial state 661 (e.g., the avatars 617/619 are displayed to the right of the viewpoint of the user of the second electronic device 670). Thus, as one advantage, the disclosed method and API provides for a shared and unobscured viewing experience for multiple users in a communication session that accounts for individual user interactions with shared and private content and individual display states of users in the three-dimensional environment.

In some examples, while the user of the first electronic device 660, the user of the second electronic device 670, and the user of the third electronic device (not shown) are in the second spatial state 661 as shown in FIG. 6I, the users may be caused to leave the second spatial state 661 (e.g., and no longer view the video content in the full-screen mode) if one of the users provides input for ceasing display of the video content in the full-screen mode. For example, as shown in FIG. 6I, the application window 630 includes exit option 638 that is selectable to redisplay the video content in the window mode discussed above and as similarly shown in FIG. 6E (e.g., and cease displaying the video content of the application window 630 in the full-screen mode). In FIG. 6I, while the video content of the application window 630 is displayed in the full-screen mode in the three-dimensional environments 650A/650B, the first electronic device 660 detects a selection input 672D (e.g., an air pinch gesture, an air tap or touch gesture, a gaze dwell, a verbal command, etc.) provided by the user of the first electronic device 660 directed to the exit option 638.

Figure 6J:
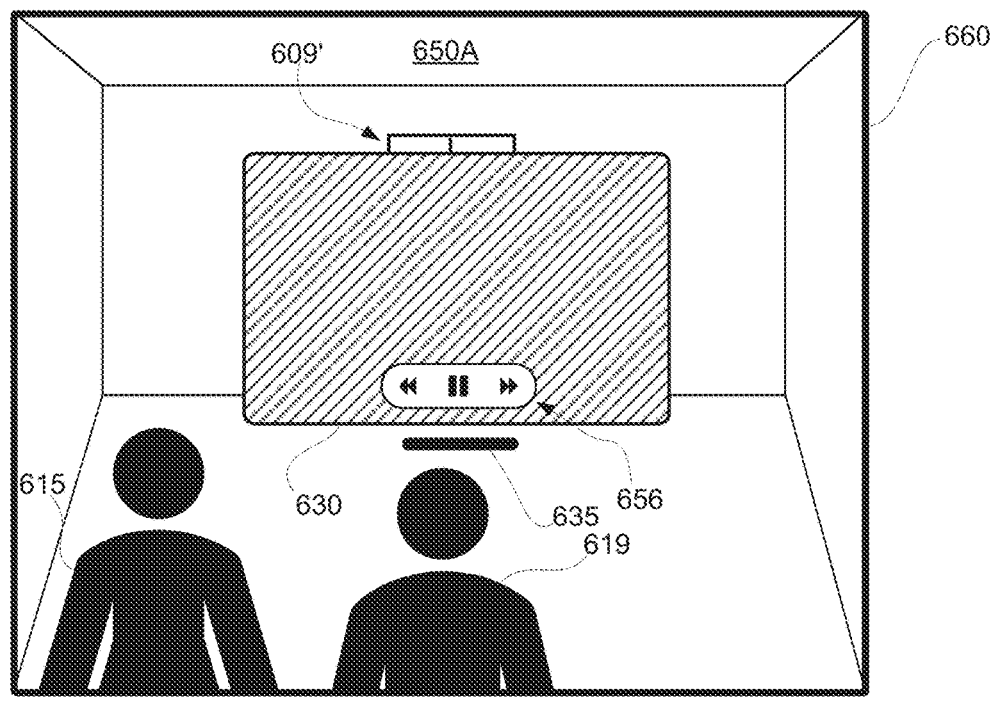
Figure 6J:
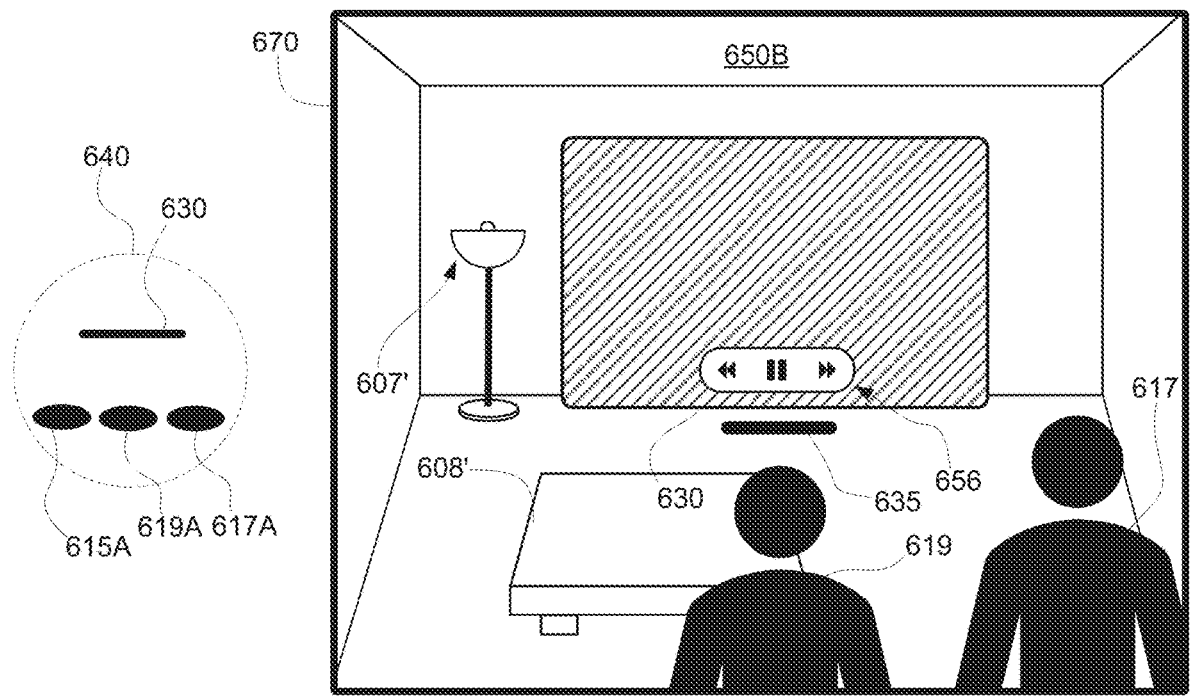

In some examples, in response to detecting the selection of the exit option 638, as shown in FIG. 6J, the first electronic device 660 ceases displaying the video content of the application window 630 in the full-screen mode and redisplays the video content in the window mode as similarly discussed above with reference to FIG. 6E. In some examples, when the first electronic device 660 ceases displaying the video content in the full-screen mode in response to the selection input 672D, the other electronic devices in the multi-user communication session may implement the auto-follow behavior discussed above to maintain the users in the multi-user communication session within the same spatial state (e.g., the first spatial state 640). Accordingly, in some examples, as shown in FIG. 6J and as similarly discussed above, when the first electronic device 660 redisplays the video content of the application window 630 in the window mode, the second electronic device 670 (and the third electronic device (not shown)) also ceases displaying the video content of the application window 630 in the full-screen mode and redisplays the video content in the window mode.

Figure 6K:
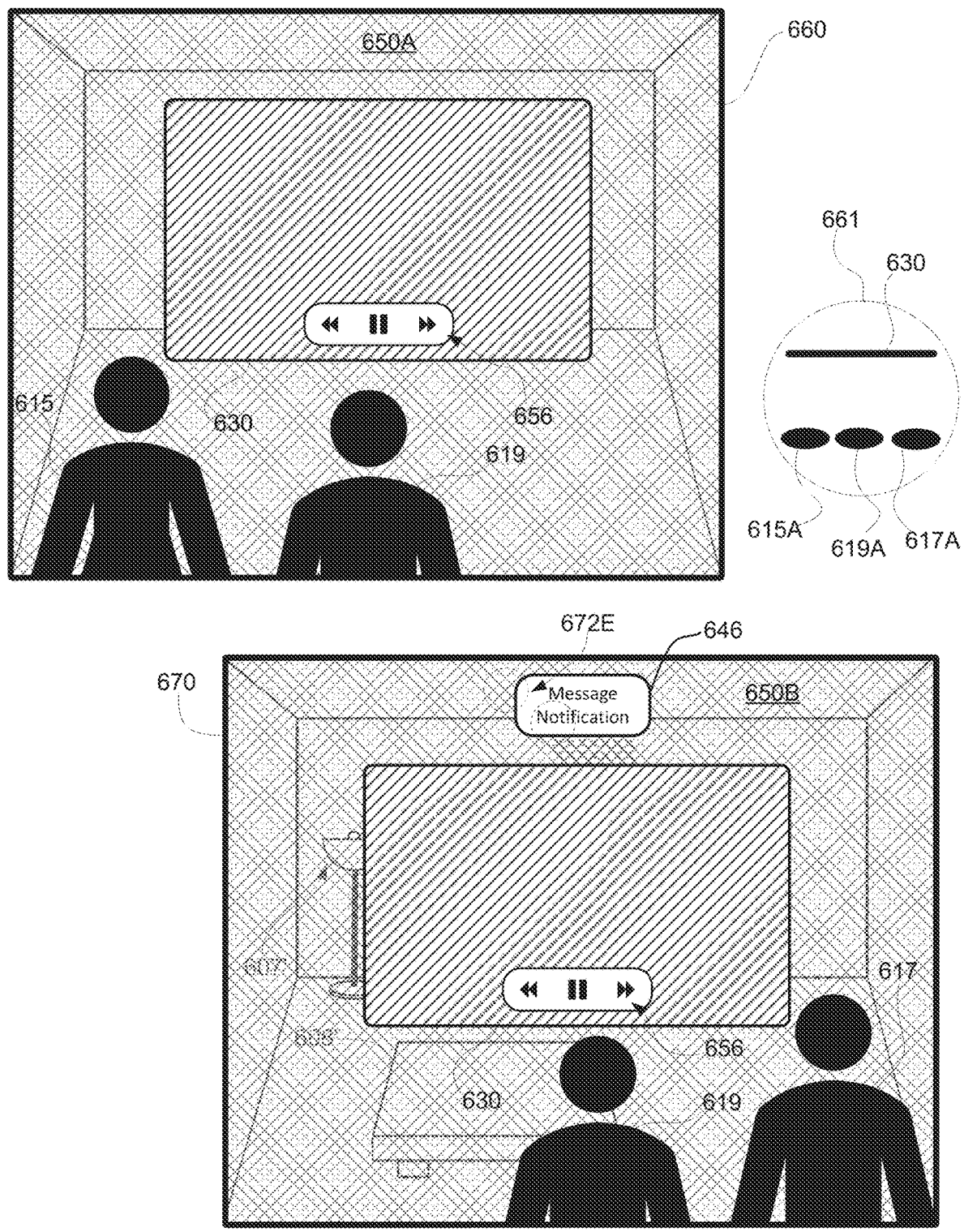

In some examples, while the user of the first electronic device 660, the user of the second electronic device 670, and the user of the third electronic device (not shown) are in the second spatial state 661, one of the users may cause the video content of the application window 630 to (e.g., temporarily) no longer be displayed in the full-screen mode without causing the other users to no longer view the video content in the full-screen mode (e.g., without implementing the auto-follow behavior discussed above). For example, the electronic devices in the multi-user communication session do not implement the auto-follow behavior if one of the electronic devices detects an input corresponding to a request to view private content at the electronic device. In FIG. 6K, the second electronic device 670 optionally receives an indication of an incoming message (e.g., a text message, a voice message, an email, etc.) associated with a messaging application, which causes the second electronic device 670 to display message notification 646 in the three-dimensional environment 650B. As shown in FIG. 6K, when the second electronic device 670 displays the message notification 646 in the three-dimensional environment 650B, the second electronic device 670 does not cease displaying the video content of the application window 630 in the full-screen mode.

Figure 6L:
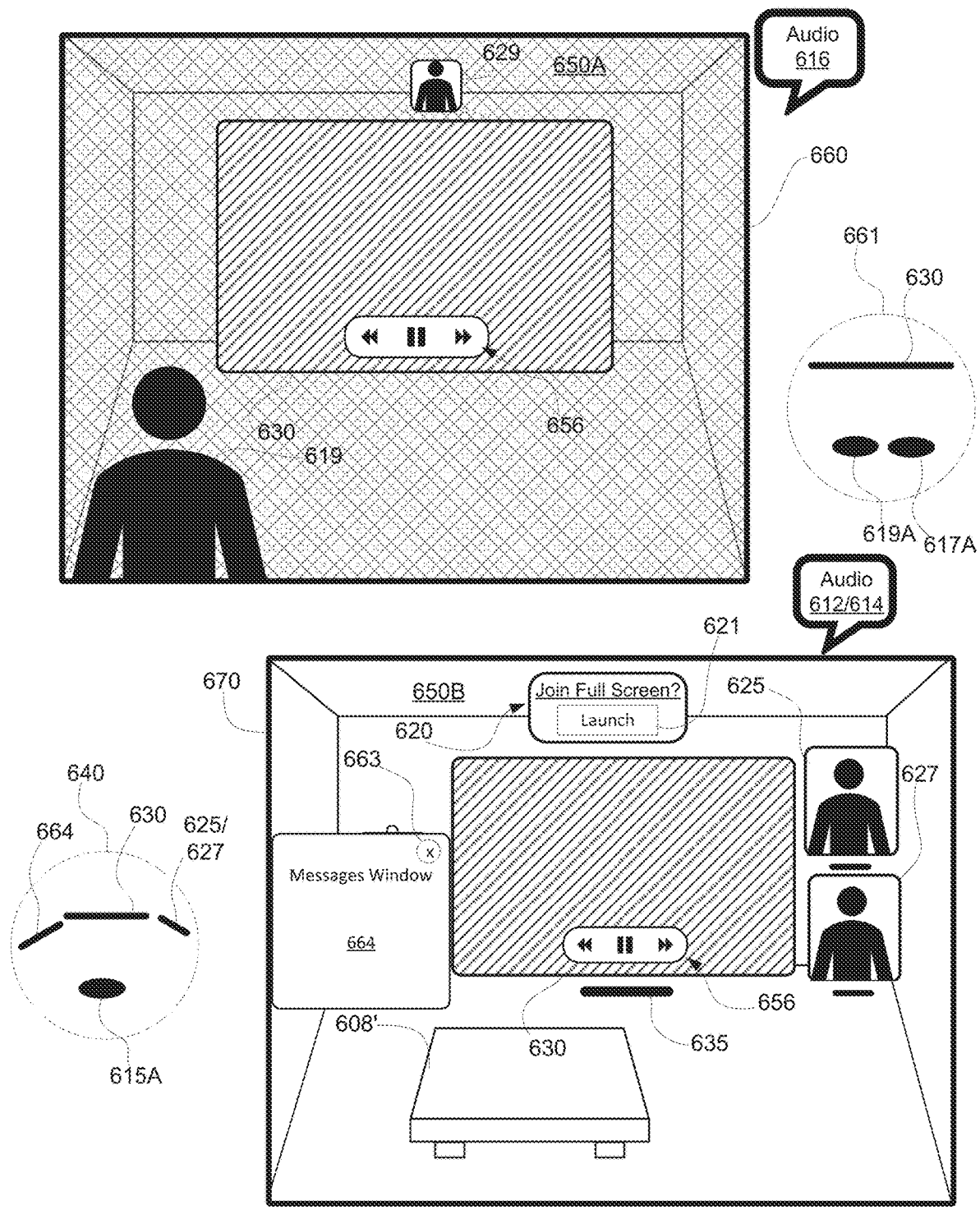

In FIG. 6K, while displaying the message notification 646 in the three-dimensional environment 650B, the second electronic device 670 detects a selection input 672E (e.g., an air pinch gesture, an air tap or touch gesture, a gaze dwell, a verbal command, etc.) proved by the user of the second electronic device 670 directed to the message notification 646. Alternatively, in some examples, the second electronic device 670 detects a selection of a button (e.g., a physical button of the second electronic device 670) or other option in the three-dimensional environment 650B for launching the messaging application associated with the message notification 646. In some examples, as shown in FIG. 6L, in response to detecting the selection of the message notification 646 (or similar input), the second electronic device 670 displays messages window 664 that is associated with the messaging application discussed above. Additionally, in some examples, when the second electronic device 670 displays the messages window 664, which a private application window, the second electronic device 670 ceases displaying the video content of the application window 630 in the full-screen mode and redisplays the video content in the window mode as similarly discussed above. In some examples, because the second electronic device 670 is no longer displaying the video content of the application window 630 in the full-screen mode, the second electronic device 670 is operating in a different state from the first electronic device 660 and the third electronic device, which causes the user of the second electronic device 670 (e.g., represented by the oval 615A in the circle representing spatial state 640) to be placed in the first spatial state 640 discussed previously above.

As shown in FIG. 6L, because the user of the second electronic device 670 is no longer in the same spatial state as the user of the first electronic device 660 and the user of the third electronic device (not shown), the three-dimensional environments 650A/650B are no longer a true shared environment. Accordingly, the second electronic device 670 ceases displaying the avatar 617 corresponding to the user of the first electronic device 660 and the avatar 619 corresponding to the user of the third electronic device (not shown). Additionally, as shown in FIG. 6L, the first electronic device 660 ceases displaying the avatar 615 corresponding to the user of the second electronic device 670 but maintains display of the avatar 619 corresponding to the user of the third electronic device (not shown) in the three-dimensional environment 650A. In some examples, as shown in FIG. 6L, the second electronic device 670 replaces display of the avatars 617/619 with two-dimensional representations corresponding to the users of the other electronic devices. For example, as shown in FIG. 6L, the second electronic device 670 displays the first two-dimensional representation 625 and the second two-dimensional representation 627 in the three-dimensional environment 650B as discussed previously above.

In some examples, as shown in FIG. 6L, the first electronic device 660 and the third electronic device (not shown) forgo implementing the auto-follow behavior discussed above when the second electronic device 670 ceases display of the video content of the application window 630 in the full-screen mode. In some examples, the first electronic device 660 and the third electronic device forgo implementing the auto-follow behavior because the launching of private content (e.g., the message window 664) is not interpreted as an input for actively ceasing display of the video content in the full-screen mode (e.g., such as the selection of the exit option 638 in FIG. 6I). Rather, the launching of the private content is interpreted as a temporary parting from the second spatial state 661 (e.g., temporary interaction with the private content). Accordingly, in FIG. 6L, if the user of the second electronic device 670 provides input for ceasing display of the messages window 664, such as via a selection of close option 663, or if the user of the second electronic device 670 provides a selection of option 621 in the notification element 620, the second electronic device 670 will redisplay the video content of the application window 630 in the full-screen mode, such that the user of the second electronic device 670 is once again in the same spatial state (e.g., the second spatial state 661) as the user of the first electronic device 660 and the user of the third electronic device, as similarly shown in FIG. 6K.

It should be understood that the above-described examples for the exclusive display of the video content in the full-screen mode similarly applies to other exclusive immersive experiences. For example, the above interactions apply for immersive environments, such as virtual environments that occupy the field of view of a particular user and provide the user with six degrees of freedom of movement within a particular virtual environment. It should also be noted that, in some examples, additional and/or alternative factors affect the determination of whether spatial truth is enabled for a particular spatial state within the multi-user communication session. For example, when transitioning users to an exclusive display mode, though the users share the same spatial state, spatial truth may still be disabled (e.g., avatars are no longer displayed) while viewing particular content in the exclusive display mode (e.g., because the content is viewable only with three degrees of freedom of movement (e.g., roll, pitch, and yaw rotation) and/or the provided stage for the content is not large enough to accommodate user movement while the content is displayed in the exclusive display mode).

Additionally, it is understood that the examples shown and described herein are merely exemplary and that additional and/or alternative elements may be provided within the three-dimensional environment for interacting with the illustrative content. It should be understood that the appearance, shape, form and size of each of the various user interface elements and objects shown and described herein are exemplary and that alternative appearances, shapes, forms and/or sizes may be provided. For example, the virtual objects representative of application windows (e.g., windows 330, 530, 662 and 630) may be provided in an alternative shape than a rectangular shape, such as a circular shape, triangular shape, etc. In some examples, the various selectable options (e.g., the option 623A, the option 626, and/or the options 621 and 622), user interface objects (e.g., virtual object 633), control elements (e.g., playback controls 556 or 656), etc. described herein may be selected and/or interacted with verbally via user verbal commands (e.g., "select option" verbal command). Additionally or alternatively, in some examples, the various options, user interface elements, control elements, etc. described herein may be selected and/or manipulated via user input received via one or more separate input devices in communication with the electronic device(s). For example, selection input may be received via physical input devices, such as a mouse, trackpad, keyboard, etc. in communication with the electronic device(s).

Figure 7B:
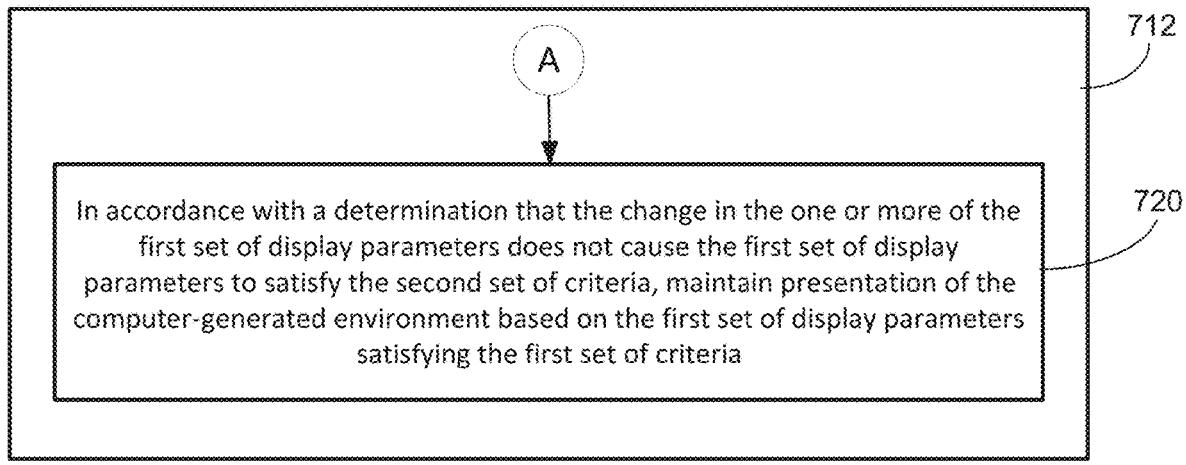

FIGS. 7A-7B illustrate a flow diagram illustrating an example process for displaying content within a multi-user communication session based on one or more display parameters according to some examples of the disclosure. In some examples, process 700 begins at a first electronic device in communication with a display, one or more input devices, and a second electronic device. In some examples, the first electronic device and the second electronic device are optionally a head-mounted display, respectively, similar or corresponding to devices 260/270 of FIG. 2. As shown in FIG. 7A, in some examples, at 702, while in a communication session with the second electronic device, the first electronic device presents, via the display, a computer-generated environment including an avatar corresponding to a user of the second electronic device and a first object, wherein the computer-generated environment is presented based on a first set of display parameters satisfying a first set of criteria. For example, as shown in FIG. 6A, first electronic device 660 displays three-dimensional environment 650A that includes an avatar 615 corresponding to a user of second electronic device 670 and user interface object 636, and the second electronic device 670 displays three-dimensional environment 650B that includes an avatar 617 corresponding to a user of the first electronic device 660 and the user interface object 636.

In some examples, the first set of display parameters includes, at 704, a spatial parameter for the user of the second electronic device, at 706, a spatial parameter for the first object, and, at 708, a display mode parameter for the first object. For example, as described above with reference to FIG. 4, the spatial parameter for the user of the second electronic device defines whether spatial truth is enabled for the communication session, the spatial parameter for the first object defines a spatial template/arrangement for the avatar corresponding to the user of the second electronic device and the first object in the computer-generated environment (e.g., if spatial truth is enabled), and the display mode parameter for the first object defines whether the display of the first object (and/or content associated with the first object) is exclusive or non-exclusive (e.g., and whether a stage is associated with the display of the first object in the computer-generated environment). In some examples, the first set of display parameters satisfies the first set of criteria if spatial truth is enabled (e.g., the spatial parameter for the user of the second electronic device is set to "true" (e.g., or some other indicative value, such as "1")), the spatial parameter for the first object defines the spatial template as being a first spatial template (e.g., a side-by-side spatial template, as shown in FIG. 5A), and/or the first object is displayed in a non-exclusive mode in the computer-generated environment (e.g., no stage is provided in the computer-generated environment, as similarly shown in FIG. 6A) in the communication session.

In some examples, at 710, while displaying the computer-generated environment including the avatar corresponding to the user of the second electronic device and the first object, the first electronic device detects a change in one or more of the first set of display parameters. For example, as shown in FIG. 6A, the second electronic device 670 detects selection input 672A directed to selectable option 623A of user interface object 636 that is selectable to display content associated with the user interface object 636, or as shown in FIG. 5B, detects a change in display state of virtual tray 555 in the three-dimensional environment 550A/550B. In some examples, at 712, in response to detecting the change, at 714, in accordance with a determination that the change in the one or more of the first set of display parameters causes the first set of display parameters to satisfy a second set of criteria, different from the first set of criteria, the first electronic device updates, via the display, presentation of the computer-generated environment in accordance with the one or more changes of the first set of display parameters. In some examples, the first set of display parameters satisfies the second set of criteria if spatial truth is disabled (e.g., the spatial parameter for the user of the second electronic device is set to "false" (e.g., or some other indicative value, such as "0")), the spatial parameter for the first object defines the spatial template as being a second spatial template (e.g., a circular spatial template, as shown in FIG. 5B), and/or the first object is displayed in an exclusive mode in the computer-generated environment (e.g., a stage is provided in the computer-generated environment, as similarly shown in FIG. 6B) in the communication session.

In some examples, at 716, the first electronic device updates display of the first object in the computer-generated environment. For example, as shown in FIG. 5C, the virtual mug 552 is displayed in a windowed state in the three-dimensional environment 550A/550B, or as shown in FIG. 6G, video content of application window 630 is displayed in an exclusive full-screen mode in the three-dimensional environment 650A. In some examples, at 718, the first electronic device updates display of the avatar corresponding to the user of the second electronic device in the computer-generated environment. For example, as shown in FIG. 5C, the avatars 515/517/519 are aligned to a new spatial template (e.g., side-by-side spatial template) in the three-dimensional environment 550A/550B, or as shown in FIG. 6G, the avatars 619/617 cease to be displayed in the three-dimensional environment 650B.

In some examples, as shown in FIG. 7B, at 720, in accordance with a determination that the change in the one or more of the first set of display parameters does not cause the first set of display parameters to satisfy the second set of criteria, the first electronic device maintains presentation of the computer-generated environment based on the first set of display parameters satisfying the first set of criteria. For example, as shown in FIG. 6F, when the first electronic device 660 transitions to displaying the video content of the application window 630 in the full-screen mode in the three-dimensional environment 650A, the second electronic device 670 auto-follows the first electronic device 660, such that the video content of the application window 630 is also displayed in the full-screen mode in the three-dimensional environment 650B, which causes the avatars 615/617/619 to remain being displayed (e.g., because spatial truth is still enabled).

It is understood that process 700 is an example and that more, fewer, or different operations can be performed in the same or in a different order. Additionally, the operations in process 700 described above are, optionally, implemented by running one or more functional modules in an information processing apparatus such as general-purpose processors (e.g., as described with respect to FIG. 2) or application specific chips, and/or by other components of FIG. 2.

Therefore, according to the above, some examples of the disclosure are directed to a method comprising, at a first electronic device in communication with a display, one or more input devices, and a second electronic device: while in a communication session with the second electronic device, presenting, via the display, a computer-generated environment including an avatar corresponding to a user of the second electronic device and a first object, wherein the computer-generated environment is presented based on a first set of display parameters satisfying a first set of criteria, the first set of display parameters including a spatial parameter for the user of the second electronic device, a spatial parameter for the first object, and a display mode parameter for the first object; while displaying the computer-generated environment including the avatar corresponding to the user of the second electronic device and the first object, detecting a change in one or more of the first set of display parameters; and in response to detecting the change in the one or more of the first set of display parameters: in accordance with a determination that the change in the one or more of the first set of display parameters causes the first set of display parameters to satisfy a second set of criteria, different from the first set of criteria, updating, via the display, presentation of the computer-generated environment in accordance with the one or more changes of the first set of display parameters, including updating display of the first object in the computer-generated environment, and updating display of the avatar corresponding to the user of the second electronic device in the computer-generated environment; and in accordance with a determination that the change in the one or more of the first set of display parameters does not cause the first set of display parameters to satisfy the second set of criteria, maintaining presentation of the computer-generated environment based on the first set of display parameters satisfying the first set of criteria.

Additionally or alternatively, in some examples, the spatial parameter for the user of the second electronic device satisfies the first set of criteria in accordance with a determination that spatial truth is enabled for the communication session. Additionally or alternatively, in some examples, the determination that spatial truth is enabled for the communication session is in accordance with a determination that a number of users in the communication session is within a threshold number of users. Additionally or alternatively, in some examples, the spatial parameter for the user of the second electronic device satisfies the second set of criteria in accordance with a determination that spatial truth is disabled for the communication session. Additionally or alternatively, in some examples, the determination that spatial truth is disabled for the communication session is in accordance with a determination that a number of users in the communication session is greater than a threshold number of users. Additionally or alternatively, in some examples, updating display of the avatar corresponding to the user of the second electronic device in the computer-generated environment includes replacing display of the avatar corresponding to the user of the second electronic device with a two-dimensional representation of the user of the second electronic device. Additionally or alternatively, in some examples, the spatial parameter for the first object defines a spatial relationship among the first object, the avatar corresponding to the user of the second electronic device, and a viewpoint of a user of the first electronic device, wherein the avatar corresponding to the user of the second electronic device is displayed at a predetermined location in the computer-generated environment. Additionally or alternatively, in some examples, the spatial parameter for the first object satisfies the first set of criteria in accordance with a determination that the predetermined location is adjacent to the viewpoint of the user of the first electronic device. Additionally or alternatively, in some examples, the display mode parameter for the first object satisfies the first set of criteria in accordance with a determination that the first object is displayed in a non-exclusive mode in the computer-generated environment. Additionally or alternatively, in some examples, the display mode parameter for the first object satisfies the second set of criteria in accordance with a determination that the first object is displayed in an exclusive mode in the computer-generated environment.

Some examples of the disclosure are directed to an electronic device comprising: one or more processors; memory; and one or more programs stored in the memory and configured to be executed by the one or more processors, the one or more programs including instructions for performing any of the above methods.

Some examples of the disclosure are directed to a non-transitory computer readable storage medium storing one or more programs, the one or more programs comprising instructions, which when executed by one or more processors of an electronic device, cause the electronic device to perform any of the above methods.

Some examples of the disclosure are directed to an electronic device, comprising: one or more processors; memory; and means for performing any of the above methods.

Some examples of the disclosure are directed to an information processing apparatus for use in an electronic device, the information processing apparatus comprising means for performing any of the above methods.

The foregoing description, for purpose of explanation, has been described with reference to specific examples. However, the illustrative discussions above are not intended to be exhaustive or to limit the invention to the precise forms disclosed. Many modifications and variations are possible in view of the above teachings. The examples were chosen and described in order to best explain the principles of the invention and its practical applications, to thereby enable others skilled in the art to best use the invention and various described examples with various modifications as are suited to the particular use contemplated.

What is claimed is:

1. A method comprising:
   at a first electronic device in communication with a display, one or more input devices, and a second electronic device:
      while in a communication session with the second electronic device, presenting, via the display, a computer-generated environment including an avatar corresponding to a user of the second electronic device and a first object, wherein the computer-generated environment is presented based on a first set of display parameters satisfying a first set of criteria, the first set of display parameters including:
         a spatial parameter for the user of the second electronic device;
         a spatial parameter for the first object; and
         a display mode parameter for the first object;
      while displaying the computer-generated environment including the avatar corresponding to the user of the second electronic device and the first object, detecting a change in one or more of the first set of display parameters; and
      in response to detecting the change in the one or more of the first set of display parameters:
         in accordance with a determination that the change in the one or more of the first set of display parameters causes the first set of display parameters to satisfy a second set of criteria, different from the first set of criteria, updating, via the display, presentation of the computer-generated environment in accordance with the change in the one or more of the first set of display parameters, including:

updating display of the first object in the computer-generated environment; and
updating display of the avatar corresponding to the user of the second electronic device in the computer-generated environment; and
in accordance with a determination that the change in the one or more of the first set of display parameters does not cause the first set of display parameters to satisfy the second set of criteria, maintaining presentation of the computer-generated environment based on the first set of display parameters satisfying the first set of criteria.

2. The method of claim 1, wherein the spatial parameter for the user of the second electronic device satisfies the first set of criteria in accordance with a determination that spatial truth is enabled for the communication session.

3. The method of claim 2, wherein the determination that spatial truth is enabled for the communication session is in accordance with a determination that a number of users in the communication session is within a threshold number of users.

4. The method of claim 1, wherein the spatial parameter for the user of the second electronic device satisfies the second set of criteria in accordance with a determination that spatial truth is disabled for the communication session.

5. The method of claim 4, wherein the determination that spatial truth is disabled for the communication session is in accordance with a determination that a number of users in the communication session is greater than a threshold number of users.

6. The method of claim 4, wherein updating display of the avatar corresponding to the user of the second electronic device in the computer-generated environment includes replacing display of the avatar corresponding to the user of the second electronic device with a two-dimensional representation of the user of the second electronic device.

7. The method of claim 1, wherein the spatial parameter for the first object defines a spatial relationship among the first object, the avatar corresponding to the user of the second electronic device, and a viewpoint of a user of the first electronic device, wherein the avatar corresponding to the user of the second electronic device is displayed at a predetermined location in the computer-generated environment.

8. The method of claim 7, wherein the spatial parameter for the first object satisfies the first set of criteria in accordance with a determination that the predetermined location is adjacent to the viewpoint of the user of the first electronic device.

9. The method of claim 7, wherein the spatial parameter for the first object satisfies the first set of criteria in accordance with a determination that the predetermined location is along a line across from the viewpoint of the user of the first electronic device, and the first object is positioned at a location on the line that is between the viewpoint and the predetermined location.

10. The method of claim 7, wherein, in accordance with the determination that the change in the one or more of the first set of display parameters causes the first set of display parameters to satisfy the second set of criteria, updating the presentation of the computer-generated environment in accordance with change in the one or more of the first set of display parameters includes:
updating the spatial relationship among the first object, the avatar corresponding to the user of the second electronic device, and the viewpoint of a user of the first electronic device.

11. The method of claim 1, wherein the display mode parameter for the first object satisfies the first set of criteria in accordance with a determination that the first object is displayed in a non-exclusive mode in the computer-generated environment.

12. The method of claim 11, wherein displaying the first object in the non-exclusive mode includes displaying the first object as a shared object that is shared between a user of the first electronic device and the user of the second electronic device in the computer-generated environment.

13. The method of claim 1, wherein the display mode parameter for the first object satisfies the second set of criteria in accordance with a determination that the first object is displayed in an exclusive mode in the computer-generated environment.

14. The method of claim 13, wherein displaying the first object in the exclusive mode includes displaying the first object as a private object that is private to a user of the first electronic device, wherein the first object is displayed in a full-screen mode in the computer-generated environment.

15. The method of claim 13, wherein displaying the first object in the exclusive mode includes displaying the first object as a shared object that is shared between a user of the first electronic device and the user of the second electronic device, wherein the first object is displayed in a full-screen mode in the computer-generated environment.

16. The method of claim 15, further comprising:
in response to detecting the change in the one or more of the first set of display parameters:
in accordance with the determination that the change in the one or more of the first set of display parameters causes the first set of display parameters to satisfy the second set of criteria, transmitting data corresponding to a change in display of the first object by the user of the first electronic device in the computer-generated environment, wherein the data causes the second electronic device to display an option that is selectable to display the first object in the full-screen mode in the computer-generated environment at the second electronic device.

17. The method of claim 13, wherein updating display of the avatar corresponding to the user of the second electronic device in the computer-generated environment includes ceasing display of the avatar in the computer-generated environment.

18. The method of claim 13, wherein:
in accordance with a determination that the change in the one or more of the first set of display parameters that causes the first set of display parameters to satisfy the second set of criteria corresponds to a change in the spatial parameter for the first object:
updating display of the first object in the computer-generated environment includes changing a position of the first object in the computer-generated environment based on the change in the spatial parameter for the first object.

19. The method of claim 18, wherein changing the position of the first object in the computer-generated environment includes moving the first object to a position in the computer-generated environment that is based on a viewpoint of the first electronic device.

20. The method of claim 1, wherein the first electronic device and the second electronic device include a head-mounted display, respectively.

21. A first electronic device comprising:
one or more processors;
memory; and one or more programs stored in the memory and configured to be executed by the one or more processors, the one or more programs including instructions for performing a method comprising:
  while in a communication session with a second electronic device, presenting, via a display, a computer-generated environment including an avatar corresponding to a user of the second electronic device and a first object, wherein the computer-generated environment is presented based on a first set of display parameters satisfying a first set of criteria, the first set of display parameters including:
    a spatial parameter for the user of the second electronic device;
    a spatial parameter for the first object; and
    a display mode parameter for the first object;
  while displaying the computer-generated environment including the avatar corresponding to the user of the second electronic device and the first object, detecting a change in one or more of the first set of display parameters; and
  in response to detecting the change in the one or more of the first set of display parameters:
    in accordance with a determination that the change in the one or more of the first set of display parameters causes the first set of display parameters to satisfy a second set of criteria, different from the first set of criteria, updating, via the display, presentation of the computer-generated environment in accordance with the change in the one or more of the first set of display parameters, including:
      updating display of the first object in the computer-generated environment; and
      updating display of the avatar corresponding to the user of the second electronic device in the computer-generated environment; and
    in accordance with a determination that the change in the one or more of the first set of display parameters does not cause the first set of display parameters to satisfy the second set of criteria, maintaining presentation of the computer-generated environment based on the first set of display parameters satisfying the first set of criteria.

22. The first electronic device of claim 21, wherein the spatial parameter for the user of the second electronic device satisfies the first set of criteria in accordance with a determination that spatial truth is enabled for the communication session.

23. The first electronic device of claim 22, wherein the determination that spatial truth is enabled for the communication session is in accordance with a determination that a number of users in the communication session is within a threshold number of users.

24. The first electronic device of claim 21, wherein the spatial parameter for the user of the second electronic device satisfies the second set of criteria in accordance with a determination that spatial truth is disabled for the communication session.

25. The first electronic device of claim 24, wherein the determination that spatial truth is disabled for the communication session is in accordance with a determination that a number of users in the communication session is greater than a threshold number of users.

26. A non-transitory computer readable storage medium storing one or more programs, the one or more programs comprising instructions, which when executed by one or more processors of a first electronic device, cause the first electronic device to perform a method comprising:
  while in a communication session with a second electronic device, presenting, via a display, a computer-generated environment including an avatar corresponding to a user of the second electronic device and a first object, wherein the computer-generated environment is presented based on a first set of display parameters satisfying a first set of criteria, the first set of display parameters including:
    a spatial parameter for the user of the second electronic device;
    a spatial parameter for the first object; and
    a display mode parameter for the first object;
  while displaying the computer-generated environment including the avatar corresponding to the user of the second electronic device and the first object, detecting a change in one or more of the first set of display parameters; and
  in response to detecting the change in the one or more of the first set of display parameters:
    in accordance with a determination that the change in the one or more of the first set of display parameters causes the first set of display parameters to satisfy a second set of criteria, different from the first set of criteria, updating, via the display, presentation of the computer-generated environment in accordance with the change in the one or more of the first set of display parameters, including:
      updating display of the first object in the computer-generated environment; and
      updating display of the avatar corresponding to the user of the second electronic device in the computer-generated environment; and
    in accordance with a determination that the change in the one or more of the first set of display parameters does not cause the first set of display parameters to satisfy the second set of criteria, maintaining presentation of the computer-generated environment based on the first set of display parameters satisfying the first set of criteria.

27. The non-transitory computer readable storage medium of claim 26, wherein the spatial parameter for the first object defines a spatial relationship among the first object, the avatar corresponding to the user of the second electronic device, and a viewpoint of a user of the first electronic device, wherein the avatar corresponding to the user of the second electronic device is displayed at a predetermined location in the computer-generated environment.

28. The non-transitory computer readable storage medium of claim 27, wherein the spatial parameter for the first object satisfies the first set of criteria in accordance with a determination that the predetermined location is adjacent to the viewpoint of the user of the first electronic device.

29. The non-transitory computer readable storage medium of claim 27, wherein the spatial parameter for the first object satisfies the first set of criteria in accordance with a determination that the predetermined location is along a line across from the viewpoint of the user of the first electronic device, and the first object is positioned at a location on the line that is between the viewpoint and the predetermined location.

30. The non-transitory computer readable storage medium of claim 27, wherein, in accordance with the determination that the change in the one or more of the first set of display parameters causes the first set of display parameters to satisfy the second set of criteria, updating the presentation of the computer-generated environment in accordance with change in the one or more of the first set of display parameters includes:
   updating the spatial relationship among the first object, the avatar corresponding to the user of the second electronic device, and the viewpoint of a user of the first electronic device.

* * * * *